United States Patent [19]

Herd et al.

[11] Patent Number: 5,274,083
[45] Date of Patent: Dec. 28, 1993

[54] POLYFUNCTIONAL FIBRE-REACTIVE DYESTUFFS

[75] Inventors: Karl-Josef Herd, Odenthal-Holz; Hermann Henk, Cologne; Frank-Michael Stöhr, Odenthal-Osenau, all of Fed. Rep. of Germany

[73] Assignee: Bayer Aktiengesellschaft, Leverkusen, Fed. Rep. of Germany

[21] Appl. No.: 724,443

[22] Filed: Jul. 2, 1991

Related U.S. Application Data

[63] Continuation of Ser. No. 511,129, Apr. 19, 1990, abandoned.

[30] Foreign Application Priority Data

May 3, 1989 [DE] Fed. Rep. of Germany ....... 3914628

[51] Int. Cl.$^5$ ............... C09B 62/503; C09B 62/04; D06P 1/38
[52] U.S. Cl. ................... 534/618; 534/617; 534/623; 534/624; 534/628; 534/632; 534/634; 534/633; 540/126; 544/75; 544/76; 544/187; 544/189; 544/208; 544/209
[58] Field of Search ............... 534/617, 618, 623, 624, 534/628, 632, 634, 637, 638; 540/126; 544/75, 76, 187, 189, 208, 209

[56] References Cited

U.S. PATENT DOCUMENTS

| | | | |
|---|---|---|---|
| 4,248,771 | 2/1981 | Scholl et al. | 534/634 X |
| 4,754,023 | 6/1988 | Tzikas et al. | 534/638 X |
| 4,801,693 | 1/1989 | Schaffer et al. | 534/634 X |
| 4,873,320 | 10/1989 | Springer et al. | 534/638 X |
| 4,912,244 | 3/1990 | Tzikas | 534/638 X |
| 4,935,501 | 6/1990 | Tzikas | 534/634 |

FOREIGN PATENT DOCUMENTS 2200131 7/1988 United Kingdom ............... 534/634

OTHER PUBLICATIONS

Abstract of JP 61-062566 (Mar. 31, 1986).

Primary Examiner—Mary C. Lee
Assistant Examiner—Fiona T. Powers
Attorney, Agent, or Firm—Sprung Horn Kramer & Woods

[57] ABSTRACT

Dyestuff of the formula

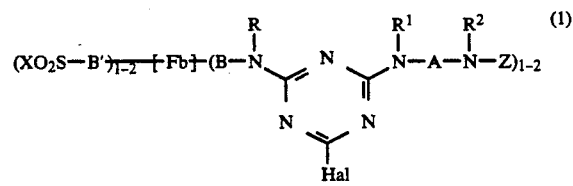

wherein
FB = the radical of a dyestuff
B/B' = a bridge member
X = CH=CH$_2$ or CH$_2$CH$_2$—Y
Y = a radical which can be eliminated under alkaline conditions and
R, R$^1$ and R$^2$ = H or C$_1$–C$_4$-alkyl, which is unsubstituted or substituted by halogen, hydroxyl, cyano, C$_1$–C$_4$-alkoxy, carboxyl, sulpho or sulphato and wherein
R$^1$–R$^2$ can also represent a C$_1$–C$_4$-alkylene unit,
Hal = F, Cl or Br,
A = a direct bond or an aliphatic, cycloaliphatic or mixed aromatic-aliphatic bridge member, which can optionally contain hereto atoms, selected from N, O, S or SO$_2$, and wherein the radical —NR$^1$—A—NR$^2$— can also be

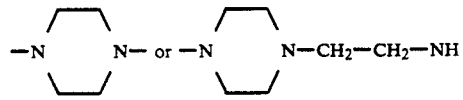

and
Z = a reactive group produce, on naturally occurring and synthetic materials containing OH groups and amide group, dyeings and prints with good general fastness properties, in particular good wet-fastness properties, coupled with a good build-up capacity and a high fixing yield.

11 Claims, No Drawings

POLYFUNCTIONAL FIBRE-REACTIVE DYESTUFFS

This application is a continuation of application Ser. No. 511,129, filed Apr. 19, 1990, now abandoned.

The present invention relates to polyfunctional fibre-reactive dyestuffs of the formula

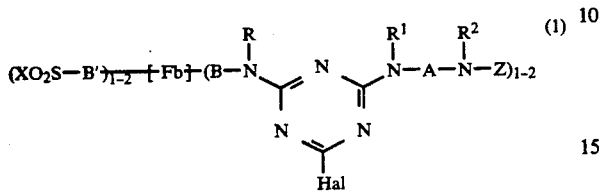

wherein
- Fb = the radical of a dyestuff of the mono- or polyazo, metal complex azo, anthraquinone, phthalocyanine, formazan, azomethine, dioxazine, phenazine, xanthene, thioxanthone, naphthoquinone, stilbene or triphenylmethane series,
- B and B' = a direct bond or bridge member to a ring C atom of an aromatic-carbocyclic or to a ring C or N atom of an aromatic-heterocyclic ring in Fb,
- X = CH=CH$_2$ or CH$_2$CH$_2$—Y, wherein
- Y = a radical which can be eliminated under alkaline conditions, for example OSO$_3$H, SSO$_3$H, OCOCH$_3$, OPO$_3$H$_2$, OSO$_2$CH$_3$, SCN, NHSO$_2$CH$_3$, Cl, Br, F, OCOC$_6$H$_5$, OSO$_2$—C$_6$H$_4$CH$_3$, N(CH$_3$)$_3$]$^+$anion$^-$ or

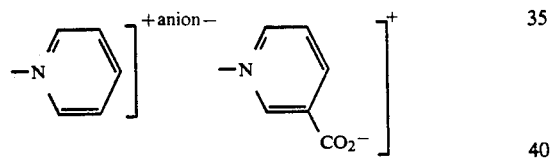

anion$^-$ is, in particular, halide or sulphate, R, R$^1$ and R$^2$ = H or C$_1$-C$_4$-alkyl, which can optionally be substituted, and wherein
R$^1$-R$^2$ can also represent a C$_1$-C$_4$-alkylene unit,
Hal = F, Cl or Br,
- A = a direct bond or an aliphatic, cycloaliphatic or mixed aromatic-aliphatic bridge member, which can optionally contain hetero atoms, such as N, O, S or SO$_2$, and wherein the radical —NR$^1$—A—NR$_2$— can also be part of a saturated heterocyclic system, and
- Z = a fibre-reactive radical which is free from chromophoric substituents.

Examples of the bridge members A are: C$_2$-C$_6$-alkylenes, such as, for example, —CH$_2$CH$_2$—, —CH$_2$CH—(CH$_3$)—, —CH$_2$—CH$_2$—CH$_2$—, —CH$_2$—CH$_2$—CH(CH$_3$)—, —CH$_2$—CH$_2$—CH$_2$—CH$_2$—, —CH(CH$_3$)—CH$_2$—CH(CH$_3$)— or CH$_2$—CH(C$_2$H$_5$)—, di(C$_2$—C$_4$-alkylene) ethers or thioethers, such as, for example,

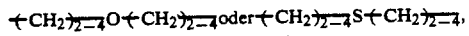

di(C$_2$-C$_4$-alkylene) sulphones, such as, for example, —(CH$_2$)$_2$—SO$_2$—(CH$_2$)$_2$—, di(C$_2$-C$_4$-alkylene)amines, such as, for example,

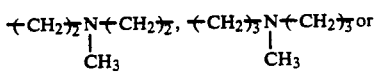

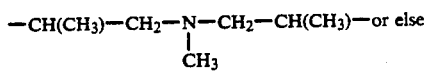

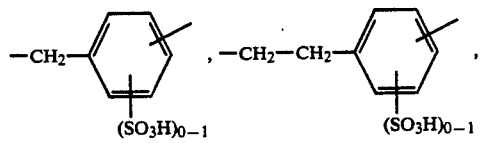

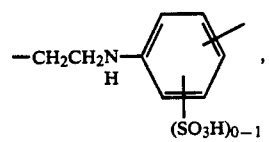

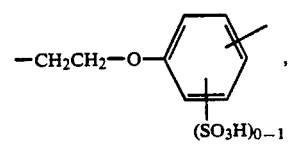

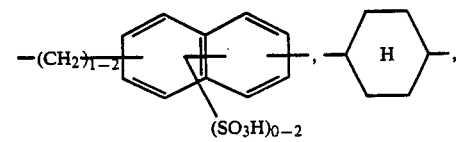

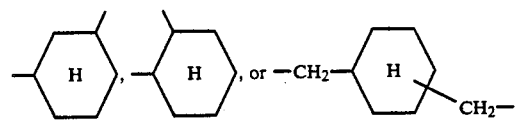

Examples of the radical —NR$^1$—A—NR$_2$— are, inter alia, also:

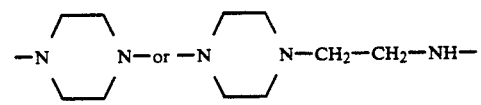

Suitable fibre-reactive radicals, that is to say those which react with the OH or NH groups of the fibres under dyeing conditions to form covalent bonds, are, in particular, those which contain at least one reactive substituent bonded to a 5- or 6-membered aromatic-heterocyclic ring, or to a monoazine, diazine or triazine ring, in particular a pyridine, pyrimidine, pyridazine, pyrazine, thiazine, oxazine or asymmetric or symmetric triazine ring, or to a ring system of this type which contains one or more co-condensed aromatic-carbocyclic rings, for example a quinoline, phthalazine, cinnoline, quinazoline, quinoxaline, acridine, phenazine or phenanthridine ring system.

Examples which may be mentioned of the reactive substituents on the heterocyclic radical are halogen (Cl, Br or F), ammonium, including hydrazinium, pyridinium, picolinium, carboxypyridinium, sulphonium, sulphonyl, azido (N$_3$), thiocyanato, thiol ether, oxyether, sulphinic acid and sulphonic acid.

Specific examples which may be mentioned are: 2,4-difluorotriazin-6-yl, 2,4-dichlorotriazin-6-yl and monohalogeno-sym.-triazinyl radicals, in particular monochloro- and monofluorotriazinyl radicals, which are substituted by alkyl, aryl, amino, monoalkylamino, dialkylamino, aralkylamino, arylamino, morpholino, piperidino, pyrrolidino, piperazino, alkoxy, aryloxy, alkylthio or arylthio, wherein alkyl preferably denotes optionally substituted $C_1$-$C_4$-alkyl, aralkyl preferably denotes optionally substituted phenyl-$C_1$-$C_4$-alkyl and aryl preferably denotes optionally substituted phenyl or naphthyl, and wherein preferred substituents for alkyl are halogen, hydroxyl, cyano, vinylsulphonyl, substituted alkylsulphonyl, dialkylamino, morpholino, $C_1$-$C_4$-alkoxy, vinylsulphonyl-$C_2$-$C_4$-alkoxy, substituted alkylsulphonyl-$C_2$-$C_4$-alkoxy, carboxyl, sulpho or sulphato, and preferred substituents for phenyl and naphthyl are sulpho, $C_1$-$C_4$-alkyl, $C_1$-$C_4$-alkoxy, carboxyl, halogen, acylamino, vinylsulphonyl, substituted alkylsulphonyl, hydroxyl and amino.

The following radicals may be mentioned specifically: 2-amino-4-fluoro-triazin-6-yl, 2-methylamino-4-fluorotriazin-6-yl, 2-ethylamino-4-fluorotriazin-6-yl, 2-isopropylamino-4-fluoro-triazin-6-yl, 2-dimethylamino-4-fluorotriazin-6-yl, 2-diethylamino-4-fluoro-triazin-6-yl, 2-β-methoxy-ethylamino-4-fluorotriazin-6-yl, 2-β-hydroxyethylamino-4-fluorotriazin-6-yl, 2-di-(β-hydroxyethylamino)-4-fluoro-triazin-6-yl, 2-β-sulphoethylamino-4-fluoro-triazin-6-yl, 2-β-sulphoethyl-methylamino-4-fluoro-triazin-6-yl, 2-carboxymethylamino-4-fluorotriazin-6-yl, 2-di-(carboxymethylamino)-4-fluoro-triazin-6-yl, 2-sulphomethyl-methylamino-4-fluoro-triazin-6-yl, 2-β-cyanoethylamino-4-fluoro-triazin-6-yl, 2-benzylamino-4-fluoro-triazin-6-yl, 2-β-phenylethylamino-4-fluorotriazin-6-yl, 2-benzyl-methylamino-4-fluoro-triazin-6-yl, 2-(4'-sulphobenzyl)-amino-4-fluoro-triazin-6-yl, 2-cyclohexylamino-4-fluoro-triazin-6-yl, 2-(o-, m- and p-methylphenyl)-amino-4-fluoro-triazin-6-yl, 2-(o-, m- and p-sulphophenyl)-amino-4-fluoro-triazin-6-yl, 2-(2',5'-disulphophenyl)-amino-4-fluoro-triazin-6-yl, 2-(o-, m- and p-chlorophenyl)-amino-4-fluoro-triazin-6-yl, 2-(o-, m- and p-methoxyphenyl)-amino-4-fluoro-triazin-6-yl, 2-(2'-methyl-4'-sulphophenyl)-amino-4-fluoro-triazin-6-yl, 2-(2'-methyl-5'-sulphophenyl)-amino-4-fluoro-triazin-6-yl, 2-(2'-chloro-4'-sulphophenyl)-amino-4-fluoro-triazin-6-yl, 2-(2'-chloro-5'-sulphophenyl)-amino-4-fluoro-triazin-6-yl, 2-(2'-methoxy-4'-sulphophenyl)-amino-4-fluoro-triazin-6-yl, 2-(o-, m- and p-carboxyphenyl)-amino-4-fluoro-triazin-6-yl, 2-(2',4'-disulphophenyl)-amino-4-fluoro-triazin-6-yl, 2-(3',5'-disulphophenyl)-amino-4-fluoro-triazin-6-yl, 2-(2'-carboxy-4'-sulphophenyl)-amino-4-fluoro-triazin-6-yl, 2-(2'-carboxy-5'-sulphophenyl)-amino-4-fluoro-triazin-6-yl, 2-(6'-sulphonaphth-2'-yl)-amino-4-fluoro-triazin-6-yl, 2-(4',8'-disulphonaphth-2'-yl)-amino-4-fluoro-triazin-6-yl, (6',8'-disulphonaphth-2'-yl)-amino-4-fluoro-triazin-6-yl, 2-(N-methyl-N-phenyl)-amino-4-fluoro-triazin-6-yl, 2-(N-ethyl-N-phenyl)-amino-4-fluoro-triazin-6-yl, 2-(N-β-hydroxyethyl-N-phenyl)-amino-4-fluoro-triazin-6-yl, 2-(N-iso-propyl-N-phenyl)-amino-4-fluoro-triazin-6-yl, 2-morpholino-4-fluoro-triazin-6-yl, 2-piperidino-4-fluorotriazin-6-yl, 2-(4',6',8'-trisulfonaphth-2'-yl)-amino-4-fluoro-triazin-6-yl, 2-(3',6',8'-trisulfonaphth-2'-yl)-amino-4-fluoro-triazin-6-yl, 2-(3',6'-disulfonaphth-1'-yl)-amino-4-fluoro-triazin-6-yl, N-methyl-N-(2,4-dichlorotriazin-6-yl)-carbamyl , N-methyl-N-(2-methylamino-4-chlorotriazin-6-yl)-carbamyl , N-methyl-N-(2-dimethylamino-4-chlorotriazin-6-yl)-carbamyl , N-methyl- or N-ethyl-N-(2,4-dichlorotriazin-6-yl)-aminoacetyl, 2-methoxy-4-fluoro-triazin-6-yl, 2-ethoxy-4-fluoro-triazin-6-yl, 2-phenoxy-4-fluoro-triazin-6-yl, 2-(o-, m- or p-sulphophenoxy)-4-fluoro-triazin-6-yl, 2-(o-, m- or p-methyl- or -methoxy-phenoxy)-4-fluoro-triazin-6-yl, 2-β-hydroxyethylmercapto-4-fluoro-triazin-6-yl, 2-phenylmercapto-4-fluoro-triazin-6-yl, 2-(4'-methylphenyl)mercapto-4-fluorotriazinyl, 2-(2',4'-dinitrophenyl)mercapto-4-fluoro-triazin-6-yl, 2-methyl-4-fluoro-triazin-6-yl, 2-phenyl-4-fluoro-triazin-6-yl and the corresponding 4-chloro- and 4-bromo-triazinyl radicals, and the corresponding radicals obtainable by replacement of halogen by tertiary bases, such as trimethylamine, triethylamine, dimethyl-p-hydroxyethylamine, triethanolamine, N,N-dimethylhydrazine, pyridine, or picoline, nicotinic acid or isonicotinic acid, sulphinates, in particular benzenesulphinic acid, or hydrogen sulphiate.

The halogenotrioazinyl radicals can also be linked to a second halogenotriazinyl radical or a halogenodiazinyl radical or one or more vinylsulphonyl or sulphatoethylsulphonyl radicals, for example via a bridge member

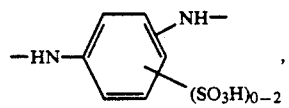

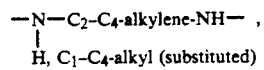

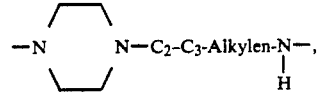

or in the case of the sulphatoethylsulphonyl or vinylsulphonyl group, via a bridge member

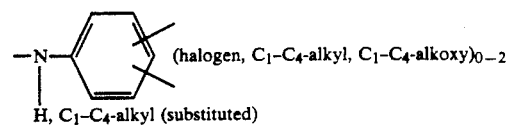

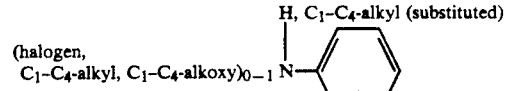

Mono-, di- or trihalogenopyrimidinyl radicals, such as 2,4-dichloropyrimidin-6-yl-, 2,4,5-trichloropyrimidin-6-yl-, 2,4-dichloro-5-nitro- or -5-methyl- or -5-carboxymethyl- or -5-carboxy- or -5-cyano- or -5-vinyl- or -5-sulpho- or -5-mono-, -di- or -trichloromethyl- or -5-carbalkoxy-pyrimidin-6-yl-, 2,6-dichloropyrimidine-4-carbonyl, 2,4-dichloropyrimidine-5-carbonyl, 2-chloro-4-methyl-pyrimidine-5-carbonyl, 2-methyl-4-chloropyrimidine-5-carbonyl, 2-methylthio-4- fluoropyrimidine-5-carbonyl, 6-methyl-2,4-dichloropyrimidine-5-carbonyl, 2,4,6-trichloropyrimidine-5-carbonyl, 2,4-dichloropyrimidine-5-sulphonyl, 2-chloro-quinoxaline-3-carbonyl, 2- or 3-monochloroquinoxaline-6-carbonyl, 2- or 3-monochloroquinoxaline-6-sulphonyl, 2,3-dichloroquinoxaline-5- or -6-carbonyl, 2,3-dichloroquinoxaline-5- or -6-sulphonyl, 1,4-dichlorophthalazine-6-sulphonyl or -6-carbonyl, 2,4-dichloroquinazoline-7- or -6-sulphonyl or -carbonyl, 2- or 3- or 4-(4',5'-dichloro-6'-pyridazon-1'-yl)-phenylsulfonyl or -carbonyl, $\beta$- (4',5'-dichloro-6'-pyridazon-1'-yl)-ethylcarbonyl, N-methyl-N-(2,3-dichloroquinoxaline-6-sulphonyl)-aminoacetyl, N-methyl-N-(2,3-dichloroquinoxaline-6-carbonyl)-aminoacetyl and the corresponding bromine and fluorine derivatives of the abovementioned chlorine-substituted heterocyclic radicals, and amongst these, for example, 2-fluoro-4-pyrimidinyl-, 2,6-difluoro-4-pyrimidinyl-, 2,6-difluoro-5-chloro-4-pyrimidinyl-, 2-fluoro-5,6-dichloro-4-pyrimidinyl-, 2,6-difluoro-5-methyl-4-pyrimidinyl-, 2-fluoro-5-methyl-6-chloro-4-pyrimidinyl-, 2-fluoro-5-nitro-6-chloro-4-pyrimidinyl-, 5-bromo-2-fluoro-4-pyrimidinyl-, 2-fluoro-5-cyano-4-pyrimidinyl-, 2-fluoro-5-methyl-4-pyrimidinyl-, 2,5,6-trifluoro-4-pyrimidinyl-, 5-chloro-6-chloromethyl-2-fluoro-4-pyrimidinyl-, 5-chloro-6-dichloromethyl-2-fluoro-4-pyrimidinyl-, 5-chloro-6-trichloromethyl-2-fluoro-4-pyrimidinyl-, 5-chloro-2-chloromethyl-6-fluoro-4-pyrimidinyl-, 5-chloro-2-dichloromethyl-6-fluoro-4-pyrimidinyl-, 5-chloro-2-trichloromethyl-6-fluoro-4-pyrimidinyl-, 5-chloro-2-fluoro-dichloromethyl-6-fluoro-4-pyrimidinyl-, 2,6-difluoro-5-bromo-4-pyrimidinyl-, 2-fluoro-5-bromo-6-methyl-4-pyrimidinyl-, 2-fluoro-5-bromo-6-chloromethyl-4-pyrimidinyl-, 2,6-difluoro-5-chloromethyl-4-pyrimidinyl-, 2,6-difluoro-5-nitro-4-pyrimidinyl-, 2-fluoro-6-methyl-4-pyrimidinyl-, 2-fluoro-5-chloro-6-methyl-4-pyrimidinyl-, 2-fluoro-5-chloro-4-pyrimidinyl-, 2-fluoro-6-chloro-4-pyrimidinyl-, 6-trifluoromethyl-5-chloro-2-fluoro-4-pyrimidinyl-, 6-trifluoromethyl-2-fluoro-4-pyrimidinyl-, 2-fluoro-5-nitro-4-pyrimidinyl-, 2-fluoro-5-trifluoromethyl-4-pyrimidinyl-, 2-fluoro-5-phenyl- or -5-methylsulphonyl-4-pyrimidinyl-, 2-fluoro-5-carboxamido-4-pyrimidinyl-, 2-fluoro-5-carbomethoxy-4-pyrimidinyl-, 2-fluoro-5-bromo-6-trifluoromethyl-4-pyrimidinyl-, 2-fluoro-6-carboxamido-4-pyrimidinyl-, 2-fluoro-6-carbomethoxy-4-pyrimidinyl-, 2-fluoro-6-phenyl-4-pyrimidinyl-, 2-fluoro-6-cyano-4-pyrimidinyl-, 5-chloro-6-fluoro-2-methyl-4-pyrimidinyl-, 5,5-difluoro-2-trifluoromethyl-4-pyrimidinyl-, 5-chloro-6-fluoro-2-dichloro-fluoromethyl-4-pyrimidinyl-, 2-fluoro-5-chloropyrimidin-4-yl, 2-methyl-4-fluoro-5-methylsulphonylpyrimidin-6-yl, 2,6-difluoro-5-methylsulphonyl-4-pyrimidinyl-, 2,6-dichloro-5-methylsulphonyl-4-pyrimidinyl, 2-fluoro-5-sulphonamido-4-pyrimidinyl-, 2-fluoro-5-chloro-6-carbomethoxy-4-pyrimidinyl and 2,6-difluoro-5-trifluoromethyl-4-pyrimidinyl; triazine radicals containing sulphonyl groups, such as 2,4-bis-(phenylsulphonyl)triazin-6-yl-, 2-(3'-carboxyphenyl)-sulphonyl-4-chlorotriazin-6-yl-, 2-(3'-sulphophenyl)-sulphonyl-4-chlorotriazin-6-yl- and 2,4-bis-(3'-carboxyphenylsulphonyl)triazin-6-yl; pyrimidine rings containing sulphonyl groups, such as 2-carboxymethylsulphonyl-pyrimidin-4-yl-, 2-methylsulphonyl-6-methyl-pyrimidin-4-yl-, 2-methylsulphonyl-6-ethyl-pyrimidin-4-yl-, .2-phenylsulphonyl-5-chloro-6-methyl-pyrimidin-4-yl-, 2,6-bis-methylsulphonylpyrimidin-4-yl-, 2,6-bis-methylsulphonyl-5-chloro-pyrimidin-4-yl-, 2,4-bis-methylsulphonyl-pyrimidine-5-sulphonyl-, 2-methylsulphonyl-pyrimidin-4-yl-, 2-phenylsulphonyl-pyrimidin-4-yl-, 2-trichloromethylsulphonyl-6-methyl-pyrimidin-4-yl-, 2-methylsulphonyl-5-chloro-6-methyl-pyrimidin-4-yl-, 2-methylsulphonyl-5-bromo-6-methyl-pyrimidin-4-yl-, 2-methylsulphonyl-5-chloro-6-ethyl-pyrimidin-4-yl-, 2-methylsulphonyl-5-chloro-6-chloromethyl-pyrimidin-4-yl-, 2-methylsulphonyl-4-chloro-6-methylpyrimidine-5-sulphonyl-, 2-methylsulphonyl-5-nitro-6-methylpyrimidin-4-yl-, 2,5,6-tris-methylsulphonyl-pyrimidin-4-yl-, 2-methylsulphonyl-5,6-dimethylpyrimidin-4-yl-, 2-ethylsulphonyl-5-chloro-6-methylpyrimidin-4-yl-, 2-methylsulphonyl-6-chloro-pyrimidin-4-yl-, 2,6-bis-methylsulphonyl-5-chloro-pyrimidin-4-yl-, 2-methylsulphonyl-6-carboxypyrimidin-4-yl-, 2-methylsulphonyl-5-sulpho-pyrimidin-4-yl-, 2-methylsulphonyl-6-carbomethoxy-pyrimidin-4-yl-, 2-methylsulphonyl-5-carboxy-pyrimidin-4-yl-, 2-methylsulphonyl-5-cyano-6-methoxy-pyrimidin-4-yl-, 2-methylsulphonyl-5-chloro-pyrimidin-4-yl-, 2-p-sulphoethylsulphonyl-6-methyl-pyrimidin-4-yl-, 2-methylsulphonyl-5-bromo-pyrimidin-4-yl-, 2-phenylsulphonyl-5-chloro-pyrimidin-4-yl-, 2-carboxymethylsulphonyl-5-chloro-6-methyl-pyrimidin-4-yl-, 2-methylsulphonyl-6-chloropyrimidine-4- and -5-carbonyl-, 2,6-bis-(methylsulphonyl)-pyrimidine-4- or -5-carbonyl-, 2-ethylsulphonyl-6-chloropyrimidine-5-carbonyl-, 2,4-bis(methylsulphonyl)-pyrimidine-5-sulphonyl- and 2-methylsulphonyl-4-chloro-6-methylpyrimidine-5-sulphonyl- or carbonyl; 2-chlorobenzothiazole-5- or -6-carbonyl- or -5- or -6-sulphonyl-, 2-arylsulphonyl- or-alkylsulphonylbenzothiazole-5- or -6-carbonyl- or -5- or -6-sulphonyl- such as 2-methylsulphonyl- or 2-ethylsulphonyl-benzothiazole-5- or -6-sulphonyl- or -carbonyl-, 2-phenylsulphonylbenzothiazole-5- or -6-sulphonyl- or -carbonyl- and the corresponding 2-sulphonylbenzothiazole-5- or -6-carbonyl- or -sulphonyl- derivatives containing sulpho groups in the fused-on benzene ring, 2-chlorobenzoxazole-5- or -6-carbonyl- or -sulphonyl-, 2-chlorobenzimidazol-5- or -6-carbonyl- or -sulphonyl-, 2-chloro-1-methylbenzimidazole-5- or -6-carbonyl- or -sulphonyl-, 2-chloro-4-methyl-1,3-thiazole-5-carbonyl- or -4- or -5-sulphonyl- and the N-oxide of 4-chloro- or 4-nitroquinoline-5-carbonyl.

Reactive groups of the aliphatic series may furthermore be mentioned, such as acryloyl- and mono-, di- or trichloroacryloyl-, such as —CO—CH=CH—Cl, —CO—CCl=CH$_2$ or —CO—CCl=CH—CH$_3$, and furthermore —CO—CCl=CH—COOH, —CO—CH=CCl—COOH, $\beta$-chloropropionyl, 3-phenylsulphonylpropionyl, 3-methylsulphonylpropionyl, 2-fluoro-2-chloro-3,3-difluorocyclobutane-1-carbonyl, 2,2,3,3-tetrafluorocyclobutane-1-carbonyl or -1-sulphonyl, $\beta$-(2,2,3,3-tetrafluorocyclobut-1-yl)-acryloyl, $\alpha$- or $\beta$-bromoacryloyl, an $\alpha$- or $\beta$-alkyl- or -arylsulphonylacryloyl group, such as $\alpha$- or $\beta$-methylsulphonylacryloyl, chloroacetyl, vinylsulphonyl or —SO$_2$CH$_2$CH$_2$Y, in which Y=a group which can be split off under alkaline conditions, in particular —O—SO$_3$H, —OCOCH$_3$, Cl, Br, F, —SSO$_3$H, —OPO$_3$H$_2$, —OCOC$_6$H$_5$, di—C$_1$-C$_4$-alkylamino, quaternary ammonium, in particular N$^\oplus$(C$_1$-C$_4$-alkyl)$_3$anion$^\ominus$, —O—SO$_2$CH$_3$, —SCN, —NH—SO$_2$CH$_3$, —OSO$_2$—C$_6$H$_4$—CH$_3$, —OSO$_2$—C$_6$H$_5$, —OCN,

[structure: —N⁺(pyridinium) anion⁻ or —N⁺(pyridinium)-COO⁻ with (CH₃)₀₋₂ substituents] where anion⁻ = for example, —OSO₃H, —SSO₃H, —OPO₃H₂, —Cl, —Br, —F, —SCN, —OCN, —OSO₂CH₃, —OSO₂C₆H₅, OCOCH₃, —I, —OSO₂OCH₃, —OSO₂C₆H₄CH₃ or —OCOC₆H₅.

Examples of the bridge members B are:

*—COCH₂—, —CH₂—, —CH₂—CH₂—,

—CH₂—CH₂—CH₂—, *—SO₂—CH₂—CH₂—,

*—CONHCH₂CH₂—, *—SO₂NH—CH₂CH₂—,

*—NH—CH₂CH₂—, *—O—CH₂CH₂—, or

[triazine-based bridge structure with —N(R')—(CH₂)₁ or ₂—SO₃H]

wherein R' = H or CH₃

The radical $$-B-N(R)-$$

can also have, for example, the following meaning:

[triazine-piperazine bridge structure with —N(R')—(CH₂)₁ or ₂—SO₃H]

*—SO₂N(piperazine)N— wherein R' = H or CH₃.

The asterisk in each case marks the linkage point of the bridge member to the dyestuff radical Fb.

Examples of bridge members B' are:

—N(R)—, *—N(V)—(CH₂)₂—, *—CO—N(V)—(CH₂)₂—,

*—NH—CH₂—CH₂CH₂—, *—SO₂N(V)—(CH₂)₂—,

*—N(R')—CH(CH₃)—CH₂—, *—NHCH₂CH₂O—CH₂CH₂—,

*—O—CH₂CH₂—, *—NHCO—CH₂CH₂—,

*—NH—CO—CH₂CH₂CH₂—, *—CO—NH—(phenyl)—,

*—SO₂—NH—(phenyl)—,

*—CO—NH—(naphthyl)—, (SO₃H) 0 or 1

*—SO₂—NH—(naphthyl)—, (SO₃H) 0 or 1

[triazine structure with —N(R)— and —N(V)—(phenyl)— and P] or

[triazine structure with —N(R)— and —N(V)—(CH₂)₂, and P]

wherein
P = F, Cl or optionally substituted amino, preferably

—N(R')—(CH₂)₁₋₃SO₃H

V = H, CH₃ or —CH₂CH₂SO₂—X,
R' = H or CH₃ and
R and X have the abovementioned meaning.

The bridge members B and B' can in each case have the same or a different meaning.

The radical Fb in formula (1) can be substituted in the customary manner. An example which may be mentioned of further substituents on the radicals Fb are: alkyl groups having 1 to 4 carbon atoms such as methyl, ethyl, propyl, isopropyl or butyl, alkoxy groups having 1 to 4 carbon atoms, such as methoxy, ethoxy, propoxy, isopropoxy or butoxy, acylamino groups having 1 to 8 carbon atoms, such as acetylamino, propionylamino or benzoylamino, amino group4 alkylamino groups having 1 to 4 carbon atoms, such as methylamino, ethylamino, propylamino, isopropylamino or butylamino, phenyl-amino, N,N-di-β-hydroxyethylamino, N,N-di-β-sulphatoethylamino, sulphobenzylamino, N,N-disulphobenzylamino, alkoxycarbonyl having 1 to 4 carbon atoms in the alkoxy radical, such as methoxycarbonyl or ethoxycarbonyl, alkylsulphonyl having 1 to 4 carbon atoms, such as methylsulphonyl or ethylsulphonyl, trifluoromethyl, nitro, cyano, halogen, such as fluorine, chlorine or bromine, carbamoyl, N-alkylcarbamoyl having 1 to 4 carbon atoms in the alkyl radical, such as N-methylcarbamoyl or N-ethylcarbamoyl, sulphamoyl, N-alkylsulphamoyl having 1 to 4 carbon atoms, such as N-methylsulphamoyl, N-propylsulphamoyl, N-isopropylsulphamoyl or N-butylsulphamoyl, N-(4-hydroxyethyl)sulphamoyl, N,N-di-(β-hydroxyethyl) -sulphamoyl, N-phenylsulphamoyl, ureido, hydroxyl, carboxyl, sulphomethyl or sulpho. The radicals Fb preferably contain one or more sulphonic acid groups.

Reactive dyestuffs of the formula (1) wherein Fb is the radical of an azo dyestuff contain as substituents, above all, methyl, ethyl, methoxy, ethoxy, acetylamino, benzoylamino, amino, chlorine, bromine, ureido, hydroxyl, carboxyl, sulphomethyl or sulpho.

The radical R, $R^1$ or $R^2$ is, if it is an alkyl radical, straight-chain or branched; it can be further substituted, for example by halogen, hydroxyl, -cyano, $C_1$-$C_4$-alkoxy, carboxyl, sulpho or sulphato. The following radicals may be mentioned as examples of R: methyl, ethyl, propyl, isopropyl, butyl, isobutyl, sec.-butyl, tert.-butyl, carboxymethyl, β-carboxyethyl, β-carboxypropyl, methoxycarbonylmethyl, ethoxycarbonylmethyl, methoxyethyl, β-ethoxyethyl, β-methoxypropyl, β-chloroethyl, γ-bromopropyl, β-hydroxyethyl, β-hydroxybutyl, β-cyanoethyl, sulphomethyl, β-sulphoethyl, aminosulphonylmethyl and β-sulphatoethyl. R and/or $R^1$ or $R^2$ is preferably hydrogen, methyl or ethyl.

Preferred dyestuffs (1) are those in which B and B' represent a direct bond, and furthermore those in which —$SO_2X$ represents —$SO_2CH=CH_2$ or —$SO_2CH_2CH_2OSO_3H$.

Particularly preferred dyestuffs are trifunctional fibre-reactive dyestuffs on the structure (2)

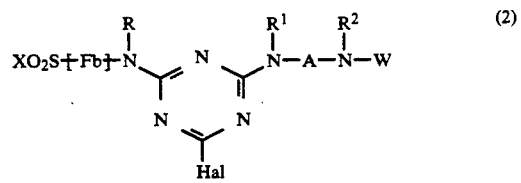

(2)

wherein Fb, X, Hal, R, $R^1$, $R^2$ and A have the meanings given under formula (1) and W represents a fibre-reactive pyrimidinyl, methylpyrimidinyl, dichlorotriazinyl, monochlorotriazinyl or monofluorotriazinyl radical.

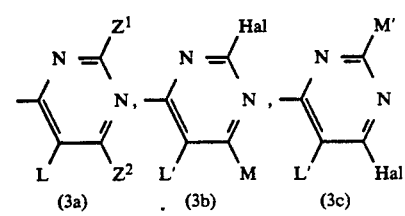

(3a)  (3b)  (3c)

-continued

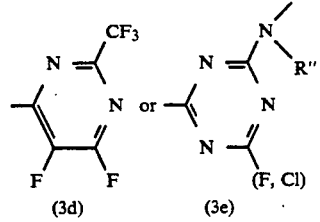

(3d)  (3e)

wherein
Hal = F, Cl or Br
L = H, Cl, Br, CN or $C_1$-$C_4$-alkylsulphonyl,
L' = H, Cl or Br
$Z^1$ and $Z^2$ = independently of one another, H, Cl, Br, F or $C_1$-$C_4$-alkylsulphonyl, wherein $Z^1$ and $Z^2$ do not simultaneously represent H or $C_1$-$C_4$-alkylsulphohyl,
M = $CH_3$, $CH_2Cl$, $CHCl_2$, $CCl_3$, $CH_2F$, $CF_3$, $CHClF$, $CCl_2F$, $CHBrF$ or $CBr_2F$,
M' = $CH_3$, $CH_2Cl$, $CHCl_2$, $CCl_3$, $CHClF$, $CCl_2F$, $CClF$, or $CF_3$,
R' = H or an optionally substituted $C_1$-$C_4$-alkyl or cycloaliphatic radical and
R" = R' or an optionally substituted phenyl, benzyl, naphthyl or hetaryl radical or an optionally substituted amino group, and
R' and R", together with the N atom, can form a 5- or 6-membered heterocyclic radical.

Substituents for the radicals R' and R" are, in particular, OH, Cl, Br, F, CN, $CO_2H$, $SO_3H$, $OSO_3H$, $C_1$-$C_4$-alkoxy, $C_1$-$C_4$-alkyl, $N(CH_3)_2$, $NHCOCH_3$, $SO_2X$ and $C_1$-$C_4$-alkylsulphonyl, or, together with the N atom:

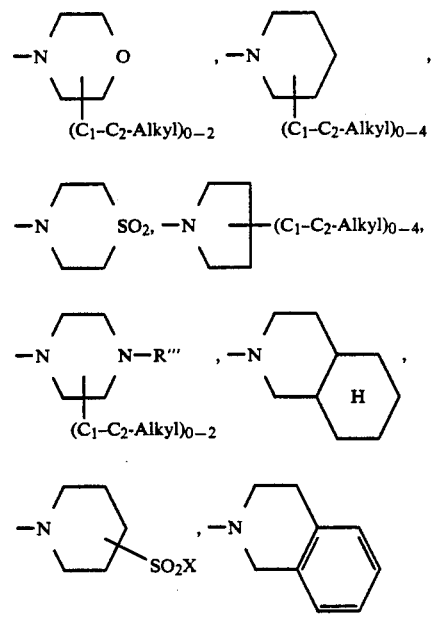

wherein X has the abovementioned meaning and R'" = H or optionally substituted $C_1$-$C_4$-alkyl (substituents are, in particular, OH, $OSO_3H$ or $SO_2X$).

Preferred dyestuffs (1) are monoazo and polyazo dyestuffs of the formula (4) and metal complexes thereof

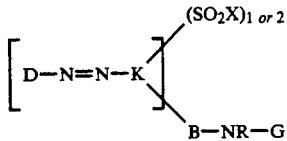

(4)

wherein

D = the radical of a diazo component of the benzene or naphthalene series,

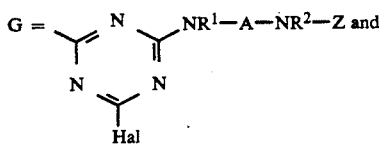

K = the radical of a coupling component of the benzene, naphthalene, acetoacetic acid arylide or heterocyclic series; and in the heterocyclic series, preferably a pyrazolone or pyridone radical.

The radicals D and K here can be substituted with further azo groups or with radicals containing azo groups, and also as is mentioned above for the radical Fb in the formula (1).

Particularly preferred dyestuffs here are those of the formulae (5a) and (5b)

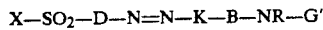

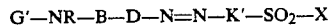

wherein

X = —CH=CH$_2$ or —CH$_2$CHOSO$_3$H,

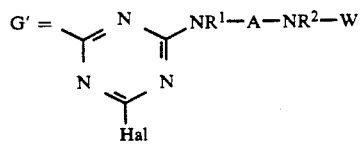

W = a radical of the formulae (3a) to (3e) and

K' = the radical of a coupling component from the pyrazolone, pyridone or acetoacetic acid arylide series, and D, K, R and B have the meaning already mentioned above.

Examples of D are, preferably, phenyl or phenylene which is optionally substituted by SO$_3$H, chlorine, C$_1$-C$_4$-alkoxyl C$_1$-C$_4$-alkyl, carbalkoxy or sulphonamido, naphthyl or naphthylene which is optionally substituted by SO$_3$H, chlorine, C$_1$-C$_4$-alkoxy or C$_1$-C$_4$-alkyl, 4-(phenylazo)phenyl which is optionally substituted by SO$_3$H and biphenylene which is optionally substituted by SO$_3$H.

K represents, for example, the radical of a coupling component from the hydroxybenzene, hydroxynaphthalene, aminobenzene, aminonaphthalene or aminohydroxynaphthalene series, or represents a 5-hydroxy-3-methyl(or carboxy)-pyrazolone or a 6-hydroxy-2-pyridone radical or an acetoacetic acid arylide radical which is optionally ring-substituted by C$_1$-C$_4$-alkyl or C$_1$-C$_4$-alkoxy. The last three radicals mentioned are also suitable examples of K'. K and K' can contain the customary substituents, in particular sulphonic acid groups.

The following dyestuffs of the formulae (6) to (43) are preferred:

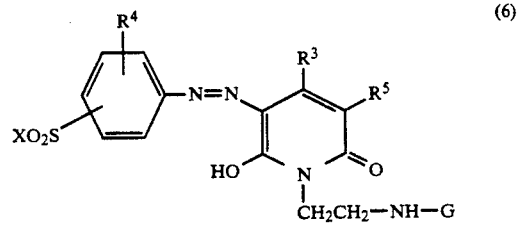

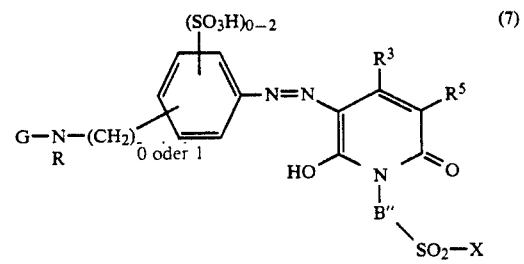

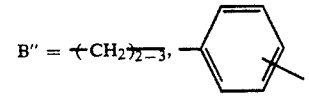

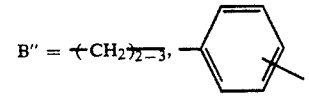

wherein

R$^3$ = H, C$_1$-C$_4$-alkyl, in particular CH$_3$, CH$_2$SO$_3$H or COOH,

R$^4$ = H, C$_1$-C$_4$-alkyl, C$_1$-C$_4$-alkoxy, Cl, Br, COOH or SO$_3$H and

R$^5$ = H, SO$_3$H, CH$_2$SO$_3$H, Cl, C$_1$-C$_4$-alkylsulphonyl, carboxyamide, in particular CONH$_2$, or carboxylic acid mono- or di-C$_1$-C$_4$-alkylamide.

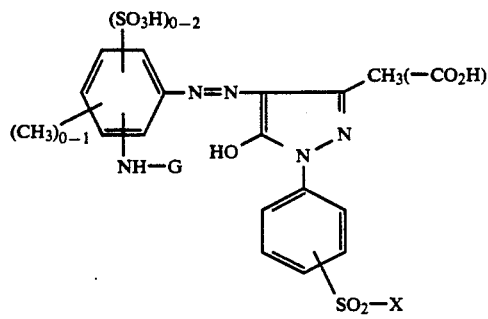
(9)
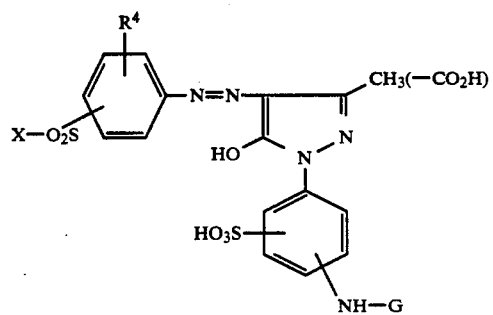
(10)
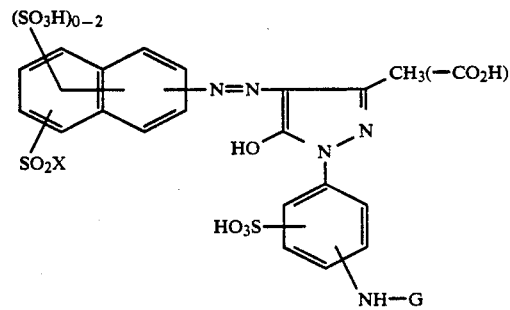
(11)
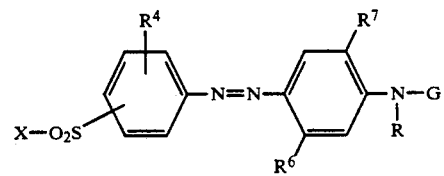
(12)
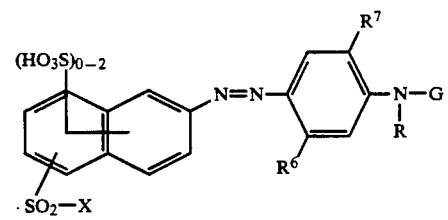
(13)
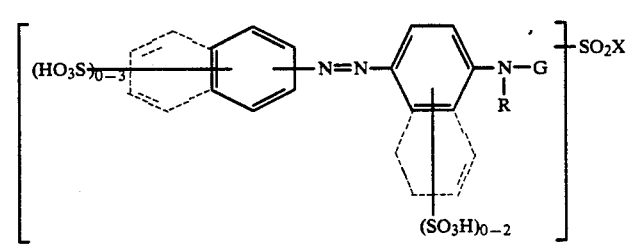
(14)
wherein
$R^6$ = H, $C_1$-$C_4$-alkyl, $C_1$-$C_4$-alkoxy, acylamino, in particular $C_1$-$C_4$-alkylcarbonylamino or arylcarbonylamino, such as optionally substituted phenylcarbonylamino, $C_1$-$C_4$-alkylsulphonylamino, Cl, Br, aminocarbonylamino, $C_1$-$C_4$-alkylsulphonylamino or arylsulphonylamino, and
in particular the Cr and Co complexes, which contain two dyestuffs (21) or one dyestuff (21) and any other desired dyestuff which forms metal complexes, in particular an azo or azomethine dyestuff.
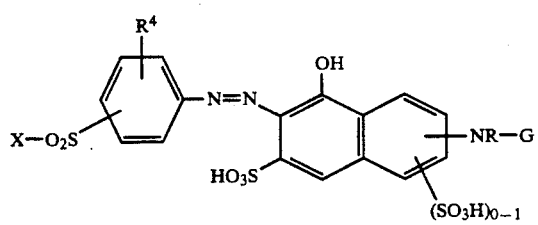
(15)
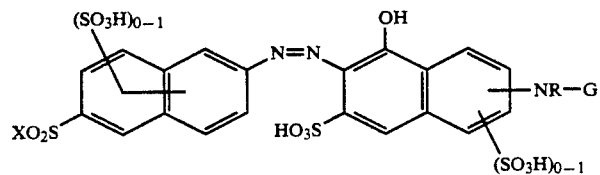
(16)
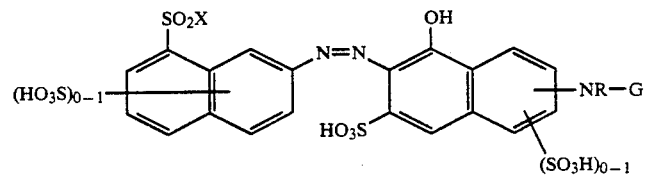
(17)
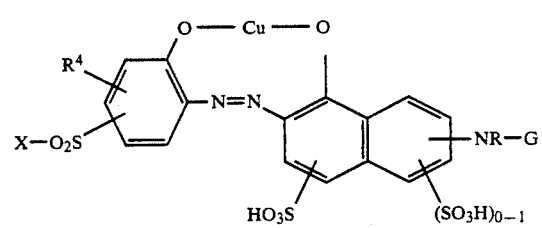
(18)
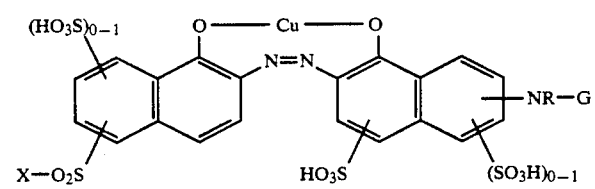
(19)
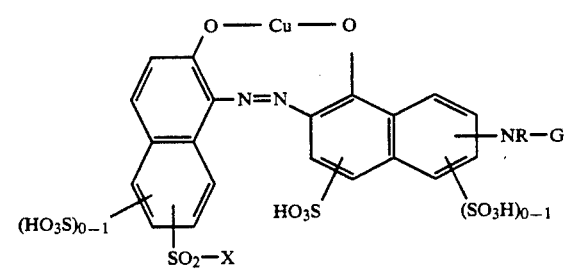
(20)
1:2-metal complexes of dyestuffs
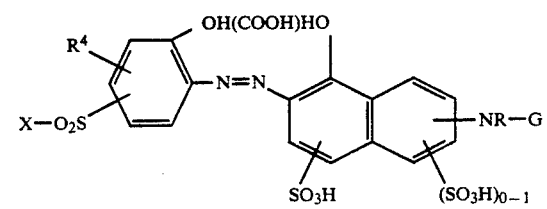
(21)

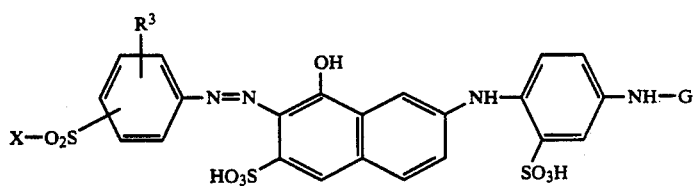
(22)
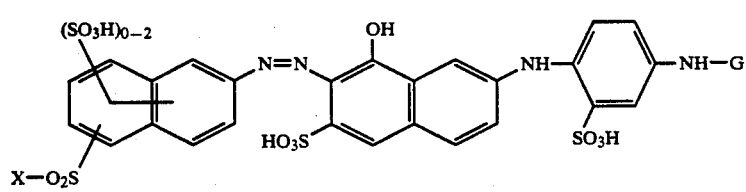
(23)
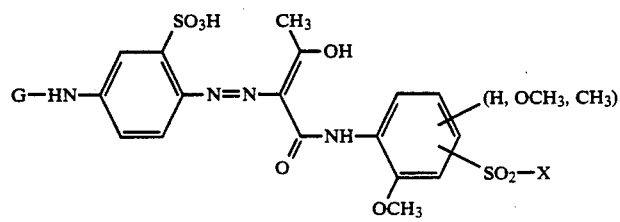
(24)
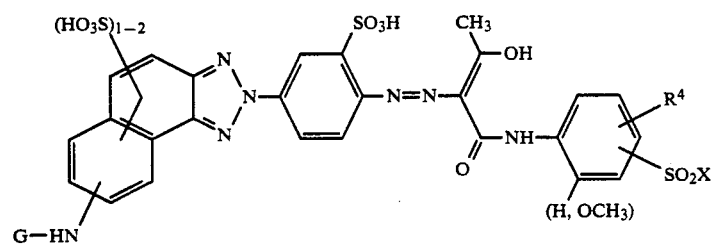
(25)
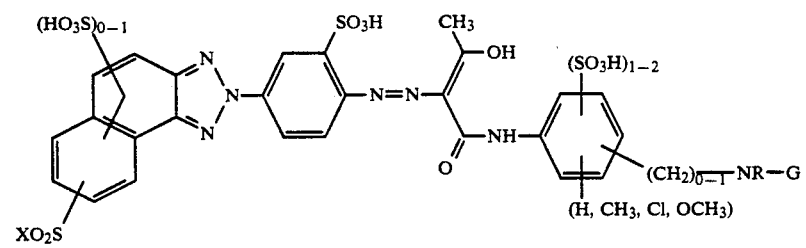
(26)
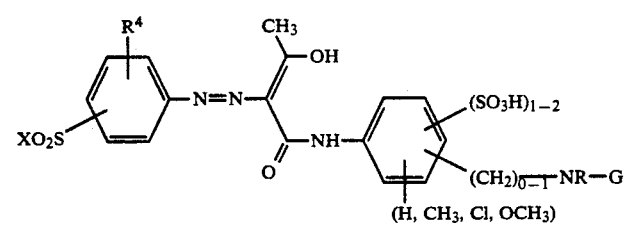
(27)
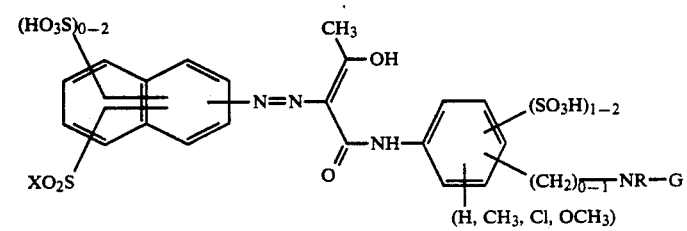
(28)

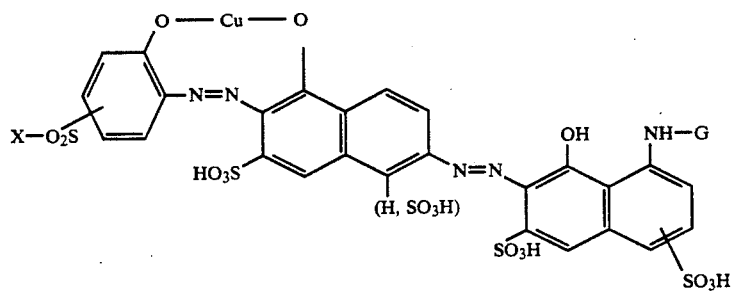
(29)
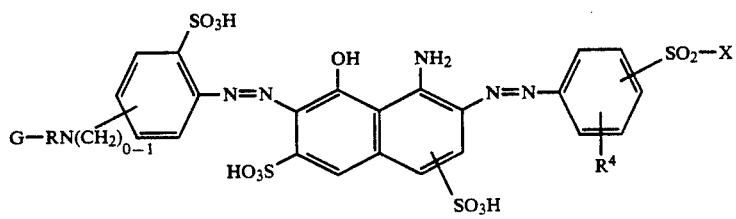
(30)
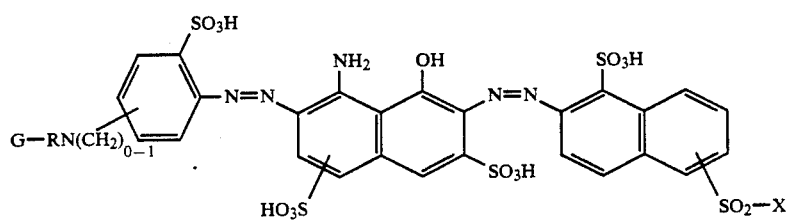
(31)
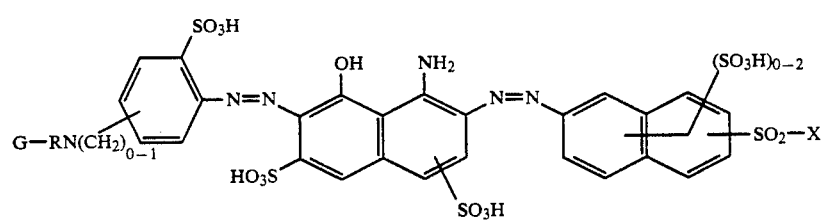
(32)
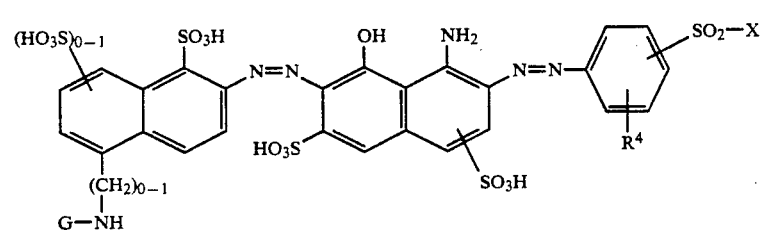
(33)
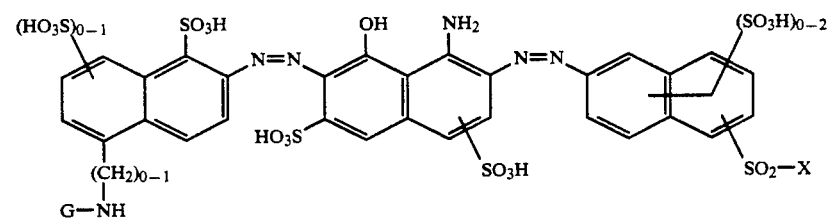
(34)
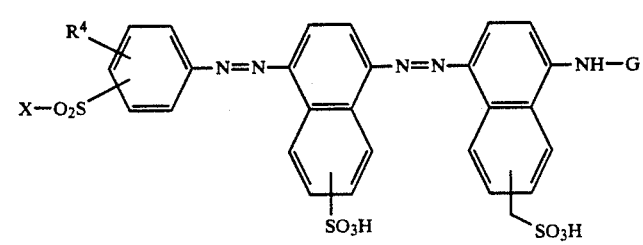
(35)

-continued
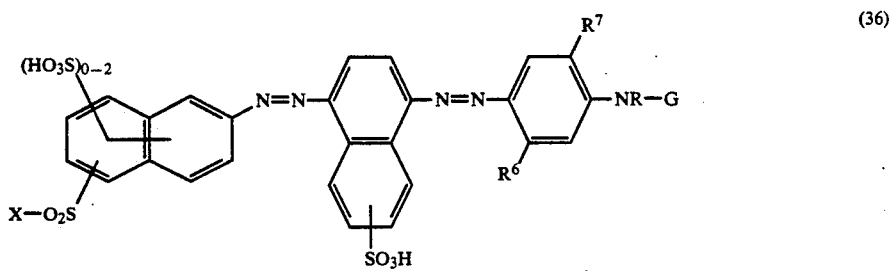
(36)
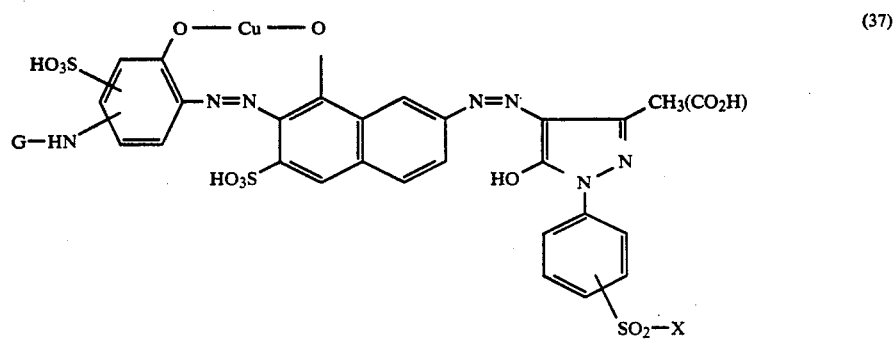
(37)
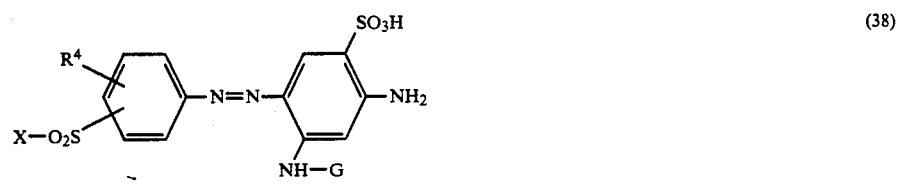
(38)
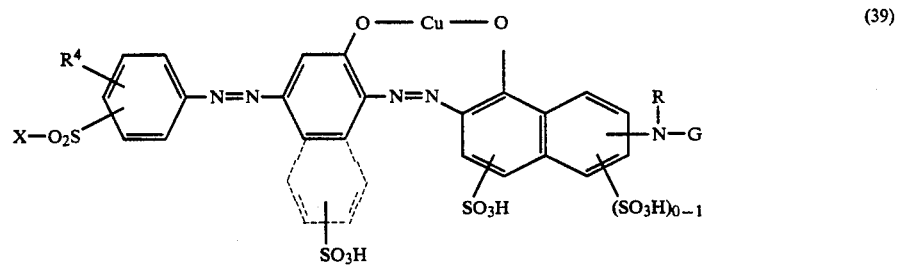
(39)
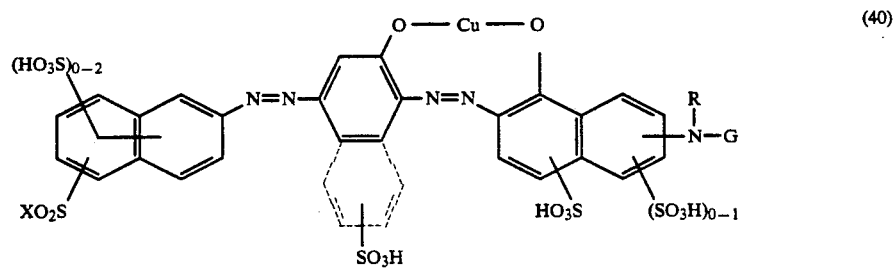
(40)

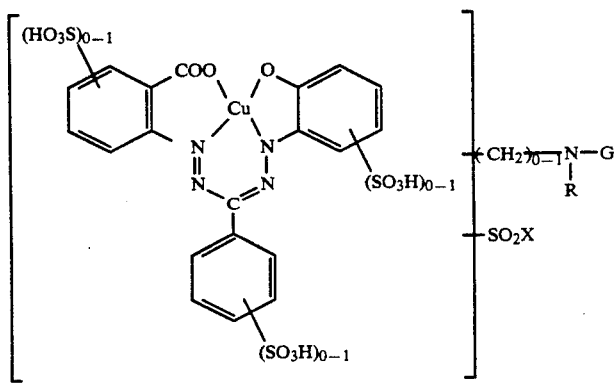 (41)

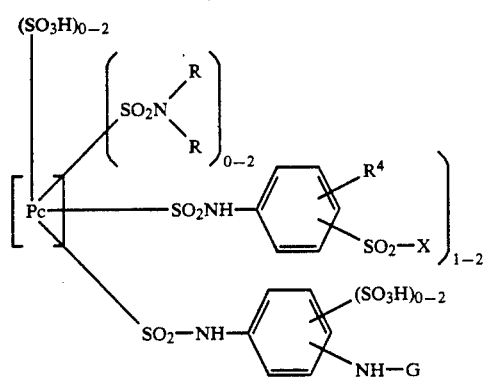 (42)

wherein Pc represents a Cu or Ni phthalocyanine radical and the total number of substituents on the Pc structure is not more than 4.

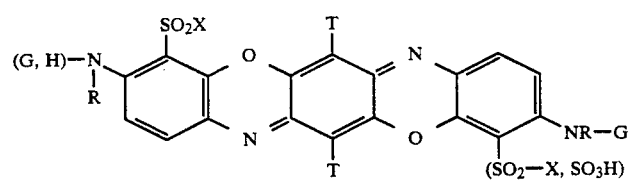

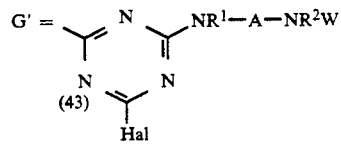 (43)

wherein T=Cl, Br or OCH₃

Particularly preferred dyestuffs (1) are those where X=CH₂CH₂OXO₃H or CH=CH₂ and wherein W=a radical of the formulae (3a) to (3e), and here in particular those having 1-6 groups which confer water-solubility, preferably sulpho groups, in particular the following dyestuffs of the formulae (44) to (74):

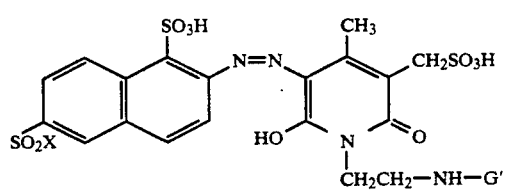 (44)

-continued
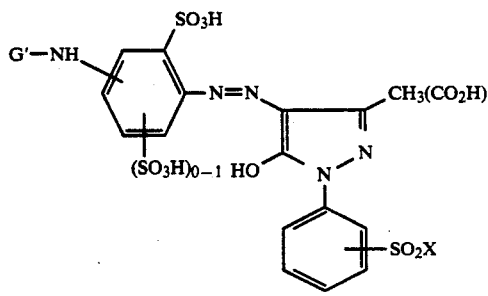 (45)
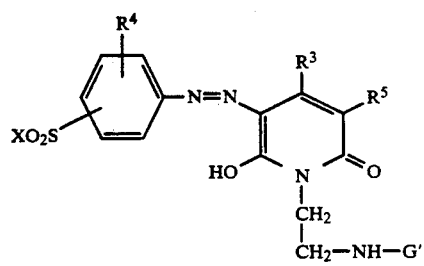 (46)
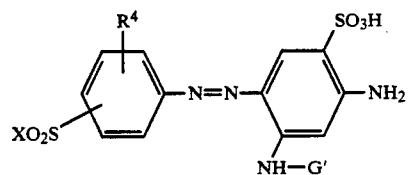 (47)
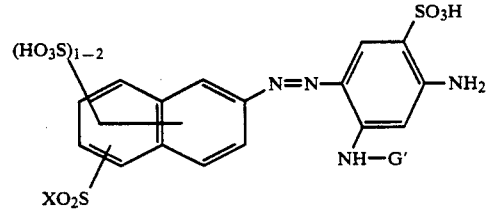 (48)
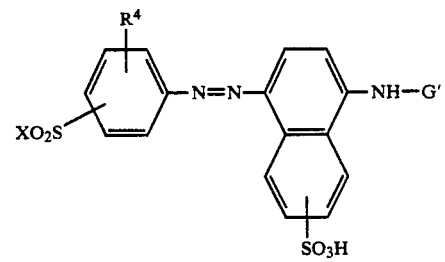 (49)
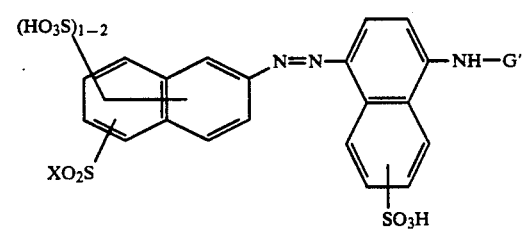 (50)
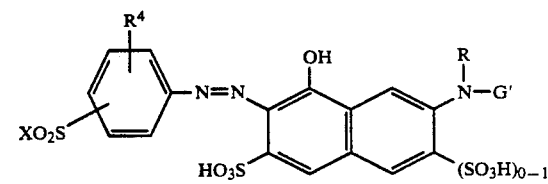 (51)

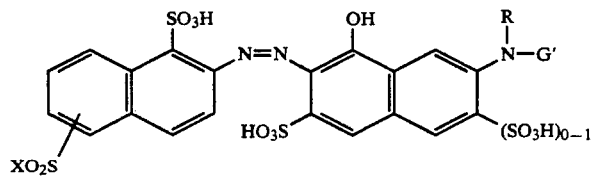
(52)
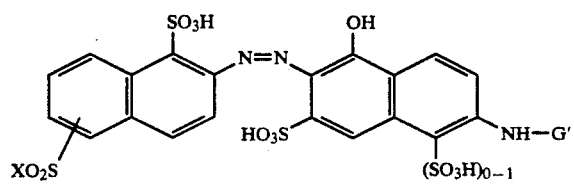
(53)
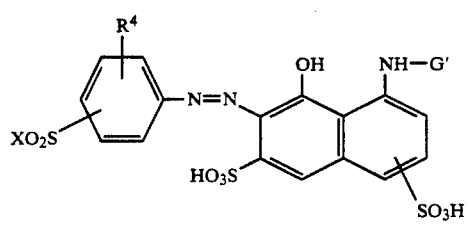
(54)
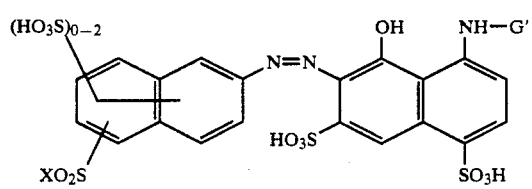
(55)
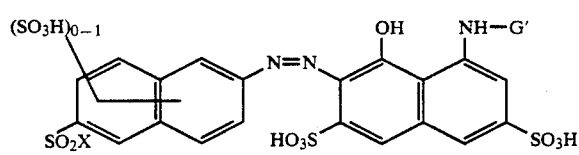
(56)
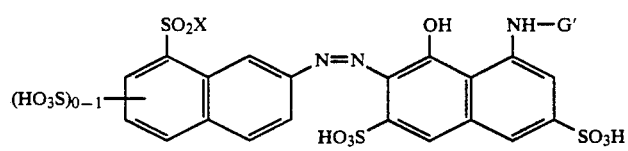
(57)
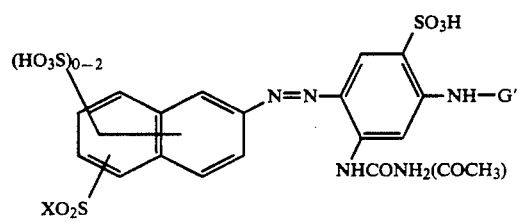
(58)
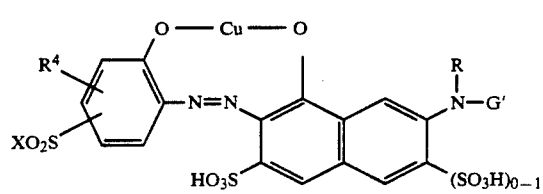
(59)

-continued
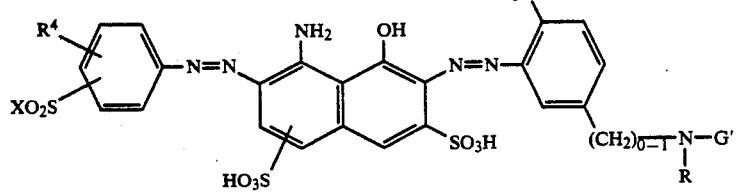
(60)
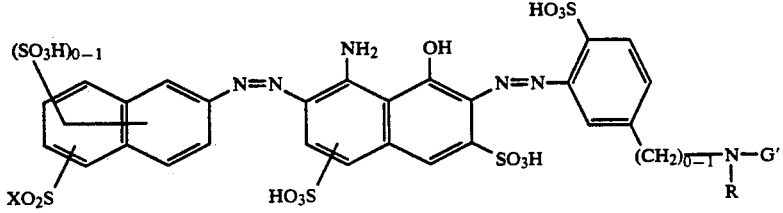
(61)
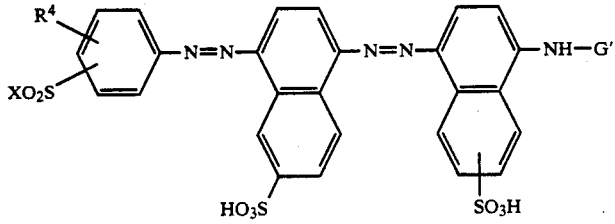
(62)
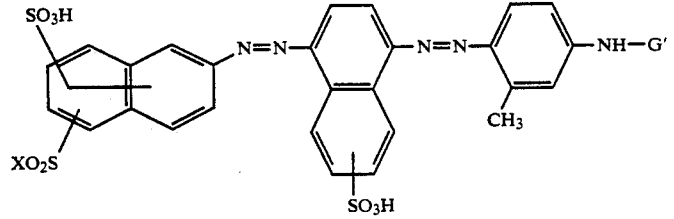
(63)
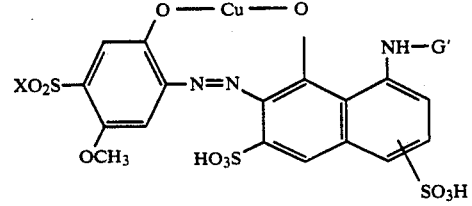
(64)
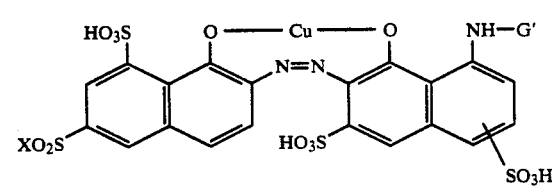
(65)
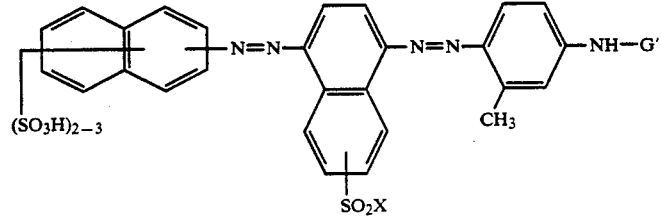
(66)

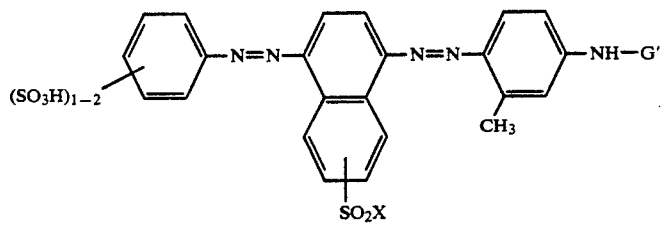
(67)

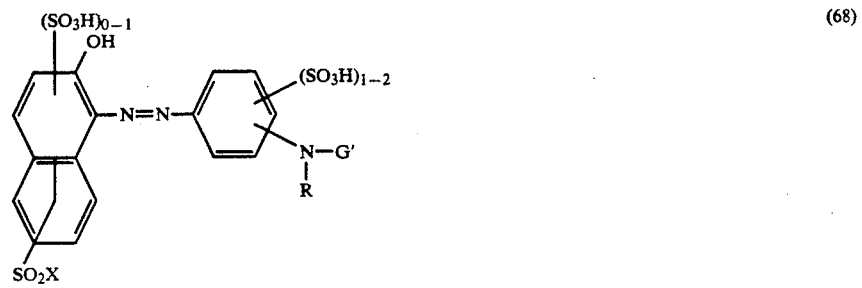
(68)

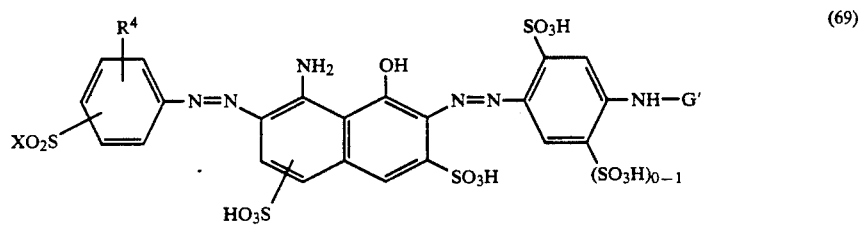
(69)

Preferred dyestuffs are furthermore those in which Fb represents a dyestuff radical from the phthalocyanine, formazan and in particular the triphendioxazine series.

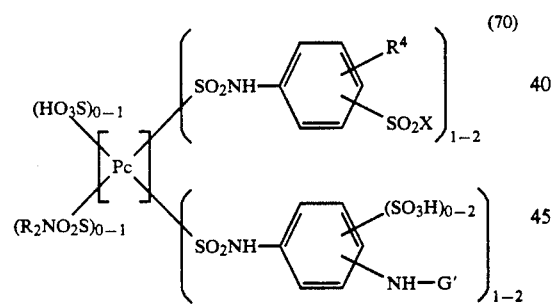
(70)

-continued

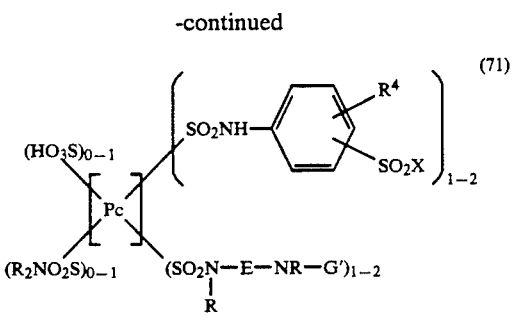
(71)

wherein Pc represents a Cu or Ni phthalocyanine radical and the total number of substituents on the Pc structure is not more than 4; E=an aliphatic bridge member, in particular $C_2$-$C_4$-alkylene, and R has the abovementioned meaning.

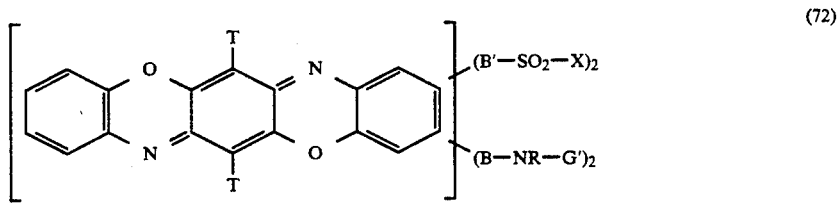
(72)

preferably

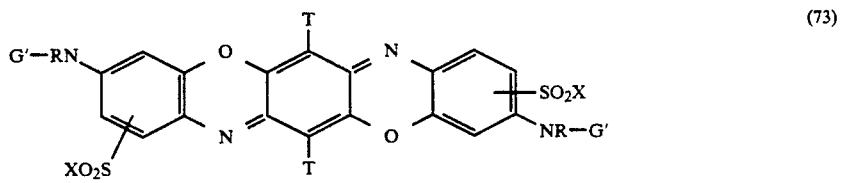
(73)

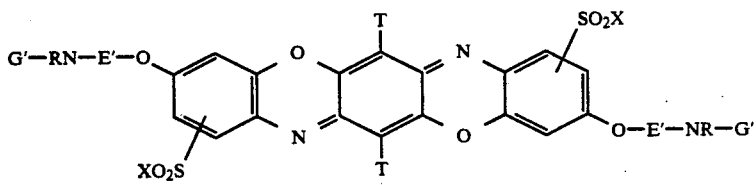
(74)

wherein E' = an aliphatic or aromatic bridge member, in particular optionally substituted $C_2$-$C_4$-alkylene or optionally substituted phenylene, and T, R, B, B', G' and X have the abovementioned meaning.

Especially preferred dyestuffs of the formula (2) are those in which

Hal = Cl or F,

R, $R^1$ and $R^2$ = H or $CH_3$,

A = —$CH_2CH_2$—, —$CH_2CH(CH_3)$—, —$CH_2$—$CH_2$—$CH_2$—,

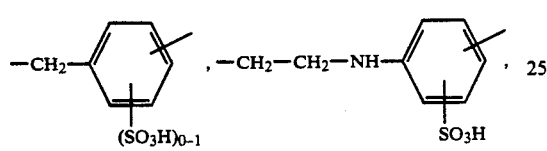

or the radical $NR^1$—A—$NR^3$— represents

W =
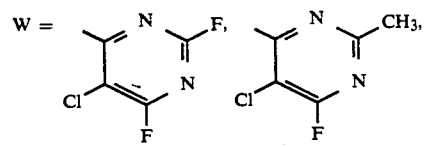
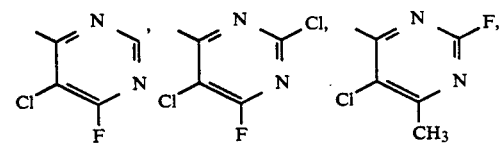
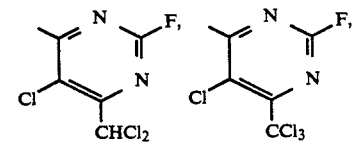
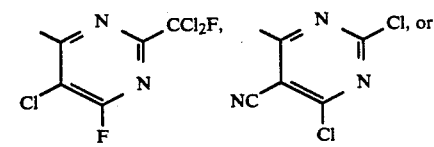
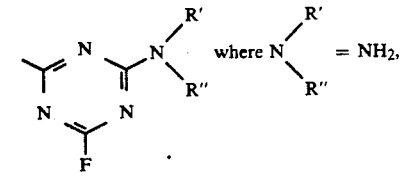

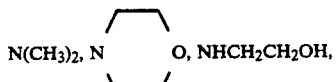

$NHCH_2CH_2SO_3H$, $N(CH_3)CH_2SO_3H$.

The new dyestuffs can be obtained by the most diverse preparation processes customary in dyestuff chemistry. The following may be mentioned as examples:

1) Dyestuffs of the formulae

(75)

are reacted in a known manner with 1 or 2 equivalents of cyanuric fluoride, cyanuric chloride or cyanuric bromide, H-Hal being split off, to give compounds of the formula

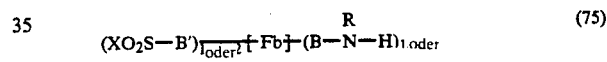
(76)

which is subsequently subjected to a condensation reaction with a diamine or hydrazine derivative $HNR^1$—A—$NR^2H$ at pH 6–8 to give colour bases of the formula

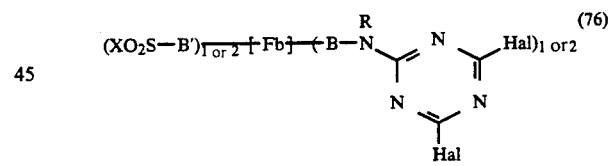
(77)

Renewed condensation with a reactive component, such as, for example, Hal-Z, gives dyestuffs of the formula (1), H-Hal being split off.

2) Dyestuffs of the formula (75) are subjected to a condensation reaction analogous to that under 1) (pH 6–8) with compounds of the formula

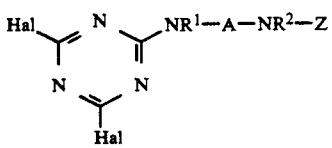

to give the dyestuffs (1) according to the invention. The compound (78) is in turn obtained by reaction of cyanuric halide with dismines of the formula HNR$^1$—A—NHR$^2$ and subsequent reaction with reactive components Hal-Z.

3) Dyestuffs of the formula (76) are reacted in an appropriate molar ratio with compounds HNR$^1$—A—NR$^2$—Z, which result from condensation of the dismines with Hal-Z, to give polyfunctional dyestuffs (1).

4) Dyestuffs of the formula (77) where B=a direct bond are accessible by subjecting dyestuffs of the bond are accessible by subjecting dyestuffs of the formula (75), where B=a direct bond, to a condensation reaction with compounds of the formula

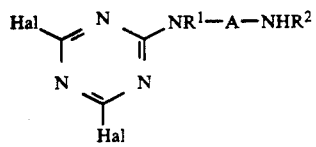

at pH values of 4 to 5.5, H-Hal being split off.

Dyestuffs of the formulae (1) and (2) where the radical —SO$_2$X=SO$_2$CH$_2$CH$_2$OH are sulphated in a known manner to give the dyestuffs of the formulae (1) and (2) where the radical —SO$_2$X=SO$_2$CH$_2$CH$_2$OSO$_3$H.

6) Precursors of Fb with 1 or 2 radicals —SO$_2$X or 1 or 2 radicals of the formula

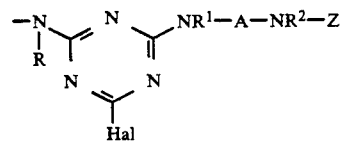

are reacted with one another, for example by condensation or, in the case of diazo or coupling components, by azo coupling, and the products are then metallized if appropriate.

Examples of such precursors are known diazo components, coupling components, 1-amino-4-bromoanthraquinone-2-sulphonic acid compounds, aromatic or aliphatic primary or secondary amines, phthalocyaninesulphochlorides, aminophenol compounds and aminobenzoic acid compounds. Such starting compounds and their modes of reaction are described in a large number of cases in the literature for the preparation of known dyestuffs.

Diazo components which may be mentioned which contain 1 to 2 —SO$_2$X groups are: aniline-4-$\beta$-sulphatoethyl-sulphone, aniline-4-$\beta$-thiosulphatoethyl-sulphone, aniline-4-vinyl-sulphone, aniline-4-$\beta$-chloroethyl-sulphone, aniline-3-$\beta$-sulphatoethylsulphone, aniline-3-vinyl-sulphone, 2-methoxy-aniline-5-$\beta$-sulphatoethyl-sulphone, 2-methoxy-aniline-5-$\beta$-thiosulphatoethyl-sulphone, 2-methoxy-aniline-5-vinyl-sulphone, 4-methoxy-aniline-3-$\beta$-sulphatoethyl-sulphone, 4-methoxy-aniline-3-$\beta$-vinyl-sulphone, 2,5-dimethoxy-aniline-4-$\beta$-sulphatoethyl-sulphone, 2,5-dimethoxy-aniline-4-vinyl-sulphone, 2,5-dimethoxy-aniline-4-$\beta$-sulphatoethyl-sulphone, 2-methoxy-5-methyl-aniline-4-$\beta$-sulphatoethyl-sulphone, aniline-2-$\beta$-sulphatoethyl-sulphone, 2-chloroaniline-5-$\beta$-sulphatoethyl-sulphone, 4-chloroaniline-3-$\beta$-sulphatoethyl-sulphone, 3-(3- or 4-aminobenzoyl)-aminophenyl-$\beta$-sulphatoethyl-sulphone, 2-methoxy-5-methyl-aniline-4-vinyl-sulphone, 6-carboxyaniline-3-$\beta$-sulphatoethyl-sulphone, 6-carboxy-aniline-3-vinyl-sulphone, 2-sulphoaniline-4-$\beta$-sulphatoethyl-sulphone, 2-sulphoaniline-4-vinyl-sulphone, 2,4-disulphoaniline-5-vinyl-sulphone, 2-hydroxyaniline-5-$\beta$-sulphatoethyl-sulphone, 2-hydroxy-aniline-4-$\beta$-sulphatoethylsulphone, 3-sulpho-2-hydroxy-aniline-5-,6-sulphatoethylsulphone, 2-naphthylamine-8-$\beta$-sulphatoethyl-sulphone, 2-naphthylamine-6-$\beta$-sulphatoethylsulynne, 1-sulpho-2-naphthylamine-6-$\beta$-sulphatoethyl-sulphone, 1-naphthylamine-4-$\beta$-sulphatoethyl-sulphone, 1-sulpho-2-naphthylamine-5-$\beta$-sulphatoethyl-sulphone, 6-sulpho-2-naphthylamine-8-$\beta$-sulphatoethyl-sulphone, 2-amino-3-sulphonaphthalene-6,8-bis-($\beta$-sulphatoethyl-sulphone), 2-bromo-1-aminobenzene-4-$\beta$-sulphatoethyl-sulphone, 2,6-dichloro-1-aminobenzene-4-$\beta$-sulphatoethyl-sulphone, 1-naphthylamine-5-$\beta$-sulphatoethyl-sulphone, 2-naphthylamine-5-$\beta$-sulphatoethyl-sulphone, 2-naphthylamine-8-$\beta$-sulphatoethylsulphone and 8-sulpho-2-naphthylamine-6-$\beta$-sulphatoethylsulphone.

Examples of suitable diazo components containing the radical

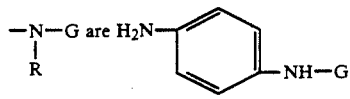

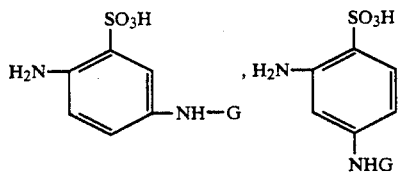

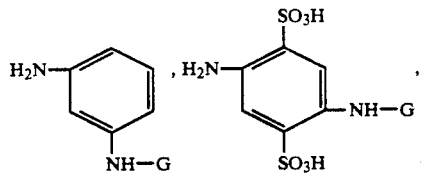

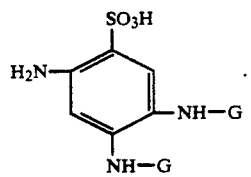

Examples of aromatic monoamines and dismines which can be used either as diazo components or as coupling components in the preparation of disazo compounds according to the invention are: aniline, 3-methylaniline, 3-chloroaniline, 2,5-dimethyl-aniline, 2,5-dimethoxyaniline, 3-methoxyaniline, 3-amino-6-methylaniline, 2-amino-4-acetylaminobenzene-1-sulphonic acid, 1-naphthylamine-6-$\beta$-sulphatoethyl-sulphone, 1-naphthylamine-7-β-sulphatoethyl-sulphone, 1,3-diaminobenzene, 1,3-diamino-4-methyl- or -methoxy-benzene, 1,3-diaminobenzene-4-sulphonic acid, 1-aminonaphthalene, 1-aminonaphthalene-6- or -7-sulphonic acid, 3-acetylamino-aniline, 2-amino-8-naphthol-6-sulphonic acid, 2-amino-8-naphthol-4,6-disulphonic acid, 2-amino-5-naphthol-7-sulphonic acid, 3-amino-5-naphthol-7-sulphonic acid, 1-amino-5-naphthol-7-sulphonic acid, 1-N-acetoacetylamino-4-N-methyl-aminobenzene, 1-N-acetoacetylamino-3-methyl-4-aminobenzene, 1-N-aceto-acetylamino-3-methoxy-4-aminobenzene, 4-amino-3-sulpho-acetoacetylanilide, 1-(3'-aminophenyl)-3-methyl-pyrazol-5-one, 1-(4'-aminophenyl)-3-methyl-pyrazol-5-one, 1-(3'- or -4'-aminophenyl)-3-carboxy-pyrazol-5-one, 1-(3'-sulpho-4'-aminophenyl)-3-carbethoxy-pyrazol-5-one, 1-(3'-amino-4'-sulphophenyl)-3-carboxy-pyrazol-5-one, 1-(2',4',6'-trimethyl-3'-amino-5'-sulphophenyl)-3-carbethoxy-pyrazol-5-one, 1-(4'-amino-phenyl)-3-methyl-pyrazol-5-one and 1-(3'-amino-6'-methyl-phenyl)-3-carboxy-pyrazol-5-one.

Examples which may be mentioned of aromatic dismines which can be used as tetrazo components for the preparation of disazo compounds according to the invention are: 1,3-diaminobenzene, 1,3-diaminobenzene-4-sulphonic acid, 1,4-diaminobenzene, 1,4-diaminobenzene-2-sulphonic acid, 1,4-diamino-2-methyl-benzene, 1,4-diamino-2-methoxybenzene, 1,3-diamino-4-methylbenzene, 1,3-diaminobenzene-5-sulphonic acid, 1,3-diamino-5-methyl-benzene, 1,6-benzene, 1,3-diamino-4-methyl-benzene, 1,3-diaminobenzene-5-sulphonic acid, 1,3-diamino-5-methyl-benzene, 1,6-diamino-naphthalene-4-sulphonic acid, 2,5-diamino-4,8-disulpho-naphthalene, 3,3'-diamino-diphenyl-sulphone, 4,4'-diamino-diphenyl-sulphone, 3,3'-diamino-diphenylsulphone-disulphonic acid, 4,4'-diamino-stilbene-2,2'-disulphonic acid, 4,4'-diamino-diphenyl-sulphone, 2,7-diamino-diphenylene-sulphone-4,5-disulphonic acid, 4,4'-diamino-benzophenone, 4,4'-diamino-3,3'-dinitro-benzophenone, 3,3'-diamino-4,4'-dichloro-benzophenone, 4,4'- or 3,3'-diamino-diphenyl, 4,4'-diamino-3,3'-dichlorodiphenyl, 4,4'-diamino-3'-dimethoxy- or -3,3'-dimethyl- or -2,2'-dimethyl- or -2,2'-dichloro- or -3,3'-diethoxydiphenyl, 4,4'-diamino-3,3'-dimethyl-6,6'-dinitro-diphenyl, 4,4'-diamino-2,2'- or 3,3'-disulpho-diphenyl, 4,4'-diamino-3,3'-dimethyl- or -3,3'-dimethoxy- or -2,2'-dimethoxy-6,6'-disulpho-diphenyl, 4,4'-diamino-2,2',5,5'-tetrachloro-diphenyl, 4,4'-diamino-3,3'-dinitro-diphenyl, 4,4'-diamino-2,2'-dichloro-5,5'-dimethoxy-diphenyl, 4,4'-diamino-2,2'-diamine-2,2'- or -3,3'-dicarboxylic acid, 4,4'-diamino-3,3'-dimethyl-diphenyl-5,5'-disulphonic acid, 4,4'-diamino-2-nitro-diphenyl, 4,4'-diamino-3-ethoxy- or -3-sulpho-diphenyl, 4,4'-diamino-3,3'-dimethyl-5-sulpho-diphenyl, 4,4'-diaminodiphenylmethane, 4,4'-diamino-3,3'-dimethyl-diphenylmethane, 4,4'-diamino-2,2',3,3'-tetramethyl-diphenylmethane, 4,4'-diamino-diphenylethane, 4,4'-diaminostilbene, 4,4'-diamino-diphenylmethane-3,3'-dicarboxylic acid and 1,2-di-(4'-amino-phenoxy)-ethane.

Examples of coupling components which can be contained in the mono- or disazo dyestuffs according to the invention or are used for their preparation are, in particular, the compounds of the formulae:

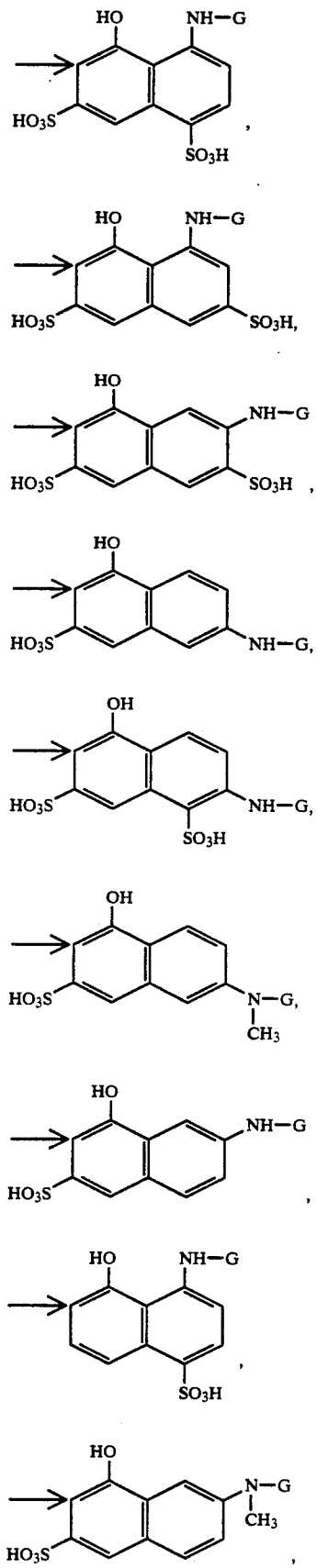

-continued

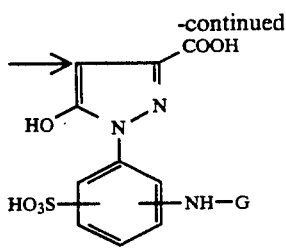

The customary procedure can be followed for preparation of the mono- and disazo compounds according to the invention and also metal complex dyestuffs thereof, for example by carrying out the reaction of the diazotized aromatic amines with the coupling components analogously to the known diazotization and coupling methods and if appropriate converting these azo compounds into the corresponding heavy metal complex compounds, such as the copper, cobalt or chromium complex compounds, by subsequent metallization analogously to known procedures (see Houben-Weyl, "Methoden der Organischen Chemie [Methods of organic Chemistry]", 4th edition (1965), Volume 10/3, page 452 et seq.; Angewandte Chemie 70, 232-238 (1958); Angewandte Chemie 64, 397 (1952)).

Other conversion reactions of the dyestuffs or precursors thereof, such as metallization reactions, sulphation reactions, triazolations or introduction of acylamino or triazinyl groupings, can in general be carried out in any desired stages of the dyestuff synthesis. Details can be found in the examples described below.

The formulae shown are those of the free acids. The salts, in particular the alkali metal salts, such as sodium, potassium or lithium salts, are in general obtained in the preparation. However, the dyestuffs can also be employed as concentrated solutions.

The dyestuffs according to the invention are outstandingly suitable for dyeing and printing naturally occurring and synthetic materials containing OH groups or amide groups, in particular those of cellulose and polyamides. They are particularly suitable for dyeing cellulose materials by the exhaustion and cold pad-batch process, and for printing cotton and viscose staple.

Dyeings with good general fastness properties, in particular wet-fastness properties, are obtained, coupled with a good build-up capacity and high fixing yields.

EXAMPLE 1

0.1 mol of 1-aminoethyl-3-sulphomethyl-4-methyl-6-hydroxy-2-pyridone are dissolved in water and reacted with 0.105 mol of 2,4,6-trichlorotriazine at 0° to 5° C. and pH 7.5. During the reaction, the pH is kept constant with sodium carbonate solution. When the 1st condensation has ended, 0.1 mol of ethylenediamine is added and the temperature is increased to 50° C., the pH being kept at 7.5 with sodium carbonate solution. When the 2nd condensation has also ended, the batch is cooled to 0° C. and 0.103 mol of 5-chloro-2,4,6-trifluoropyrimidine is added. The pH is also kept at 7.5 during the 3rd condensation. When the condensation has ended, the condensation product of the formula

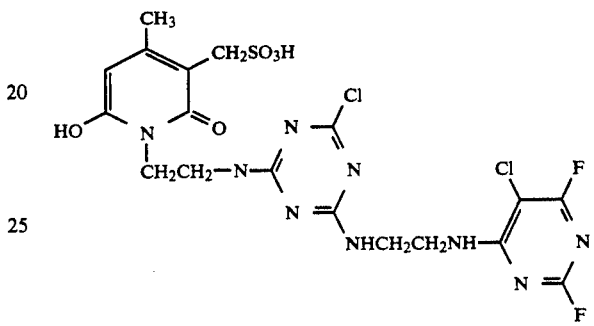

is obtained.

0.095 mol of 2-amino-6-β-sulphatoethylsulphonyl-naphthalene-1-sulphonic acid is dissolve in 300 ml of water and diazothized with sodium nitrite solution in the presence of hydrochloric acid. When the excess nitrite has been removed with amidosulphonic acid, the diazotiaztion mixture is added to the coupling component and the pH is brought to 5-6 with sodium carbonate solution.

When the coupling has ended, the dyestuff is salted out, filtered off with suction, dried and ground. A yellow dyestuff powder which is readily soluble in water and contains the dyestuff of the formula

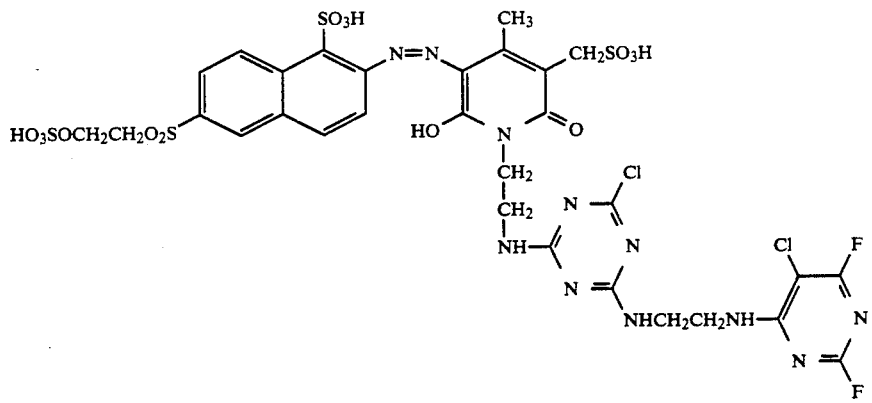

results. The dyestuff dyes cotton a deep greenish-tinged yellow.

EXAMPLE 2

If the diazo component in Example 1 is replaced by the equivalent amount of 1-amino-4-β-sulphatoethylsulphonylbenzene and the procedure is otherwise as described in Example 1, the dyestuff of the formula

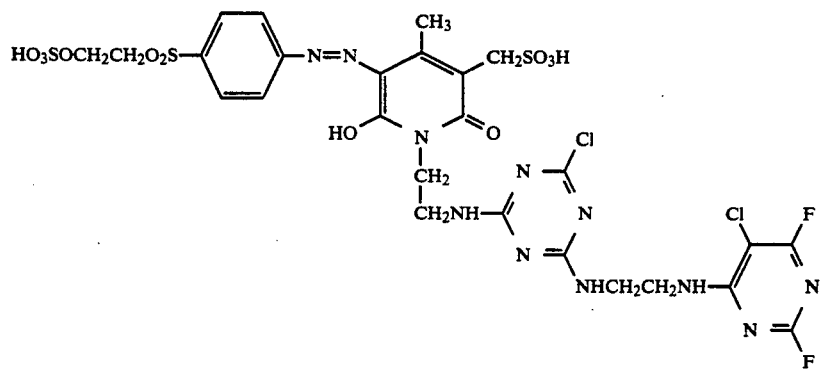

is obtained. The dyestuff dyes cotton a deep greenish-tinged yellow.

The greenish-tinged yellow dyestuffs of the formula

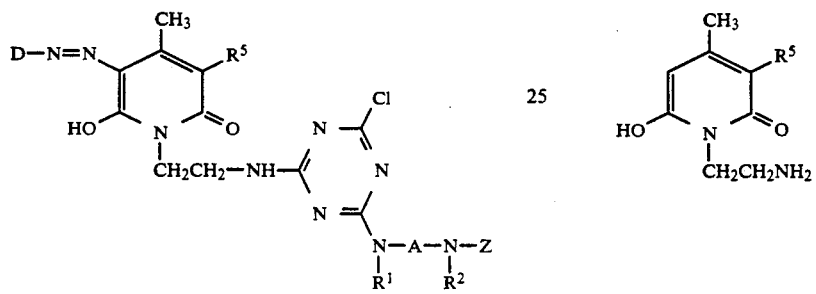

in the following table are obtained analogously to Example 1 by using the corresponding starting compounds D-NH$_2$, NHR$^1$-A-NHR$^2$, Z-F and

| Example | D | R$^5$ | —NH$^1$—A—NR$^2$ | Z |
|---|---|---|---|---|
| 3 | 3-SO$_2$CH$_2$CH$_2$OSO$_3$H-phenyl | —CH$_2$SO$_3$H | $\overset{*}{-}$NHCH(CH$_3$)CH$_2$NH— | 5-chloro-6-fluoro-2-fluoropyrimidinyl |
| 4 | 4-SO$_2$CH$_2$CH$_2$OSO$_3$H-phenyl | " | " | " |
| 5 | " | " | $-\overset{*}{N}$(piperazine)N—CH$_2$CH$_2$NH— | " |
| 6 | 2-OCH$_3$-5-SO$_2$CH$_2$CH$_2$OSO$_3$H-phenyl | —CONH$_2$ | " | 5-chloro-6-methyl-2-fluoropyrimidinyl |
| 7 | 2-SO$_3$H-5-SO$_2$CH$_2$CH$_2$OSO$_3$H-phenyl | " | " | " |

-continued
| Example | D | $R^5$ | $-NH^1-A-NR^2$ | Z |
|---|---|---|---|---|
| 8 | " | $-SO_3H$ | 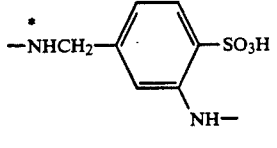 | 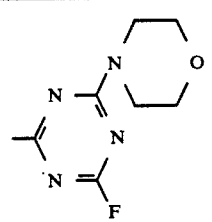 |
| 9 | 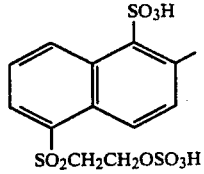 | $-CH_2SO_3H$ | 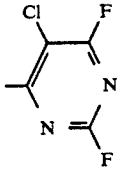 | 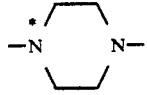 |
| 10 | " | " | 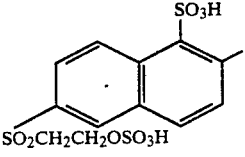 | " |
| 11 | 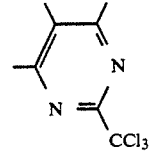 | " | " | 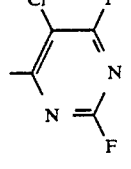 |
| 12 | " | $-CONH_2$ | 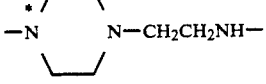 | 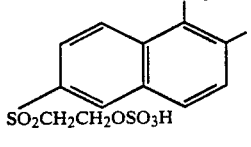 |
| 13 | " | " | 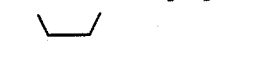 | " |
| 14 | 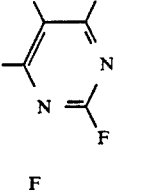 | $-SO_3H$ | 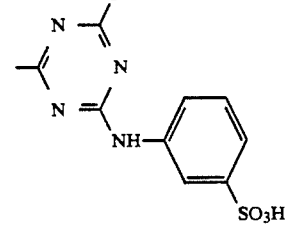 |  |
| 15 | " | $-CH_2SO_3H$ | " |  |
| 16 | " | " | " |  " |
| 17 | " | " | $-NHCH_3$<br>$-NH(CH_2)_2N(CH_2)_2NH-$ | " |

-continued

| Example | D | R⁵ | —NH¹—A—NR² | Z |
|---|---|---|---|---|
| 18 | 2-methyl-6-(vinylsulphonyl)naphthalene-1-sulphonic acid (SO₃H, SO₂CH=CH₂) | " | —NHCHCH₂NH— with CH₃ on the starred carbon | " |
| 19 | 2-methyl-6-(vinylsulphonyl)naphthalene-1-sulphonic acid (SO₃H, SO₂CH=CH₂) | —CH₂SO₃H | *—N(piperazine)N—CH₂CH₂NH— | 5-chloro-2,4,6-trifluoropyrimidinyl (Cl, F, N, N, H) |
| 20 | " | " | *—NHCH₂—C₆H₃(SO₃H)(NH—) | 4-fluoro-6-morpholino-1,3,5-triazin-2-yl |

EXAMPLE 21

0.1 mol of 2,4-diaminobenzenesulphonic acid is dissolved in 400 ml of water, with sodium hydroxide solution, under neutral conditions. After addition of 0.105 mol of a 2,4,6-trichlorotriazine suspension in water, ice and emulsifier, the pH is allowed to fall to 4 at 0° to 5° C. and is kept at this value with sodium carbonate solution. As soon as the condensation is complete, 0.1 mol of N-2-amino-ethyl-piperazine is added and the pH is increased to 5.5 to 6.5. When the condensation is complete again, 0.1 mol of 5-chloro-2,4,6-trifluoro-pyrimidine is added at 0° to 5° C. and condensation is carried out at pH 6.5, the hydrofluoric acid formed being neutralized with sodium carbonate solution. When the reaction has ended, diazotization is carried out with sodium nitrite solution and HCl under pH control at pH 2.8. When the excess nitrite has been removed with amidosulphonic acid, the diazotization mixture is added to a solution of 6-hydroxy-4-methyl-1-(3'-β-sulphatoethyl-sulphophenyl)-3-sulphomethyl-pyrid-2-one and coupling is carried out at pH 5 to 6 (sodium carbonate). The dyestuff is salted out, filtered off with suction, dried and ground. A yellow powder which is readily soluble in water and gives deep greenish-tinged yellow dyeings on cotton results.

The dyestuff corresponds to the formula

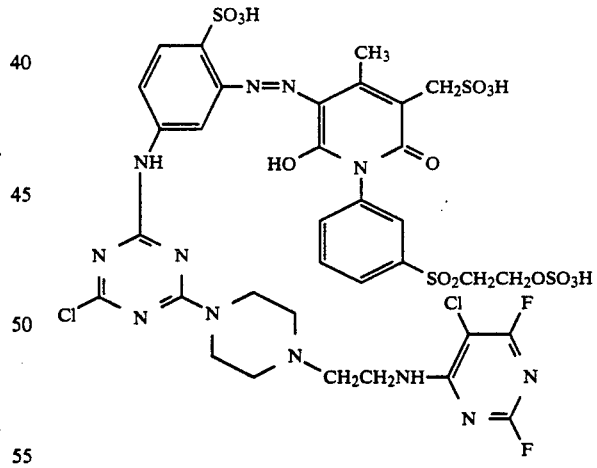

EXAMPLE 22

If the coupling component in Example 21 is replaced by 1-(4'-β-sulphatoethylsulphophenyl)-pyrazol-5-one-3-carboxylic acid and the procedure is otherwise as described in Example 21, the dyestuff of the formula

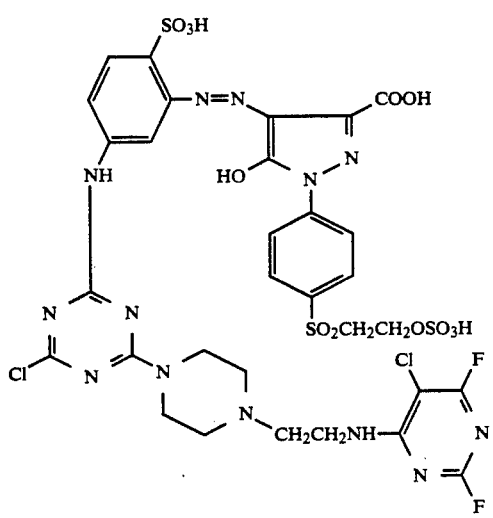

which dyes cotton in green-tinged yellow shades, is obtained.

EXAMPLE 23

If the 2,4-diaminobenzenesulphonic acid in Example 21 is replaced by 2,5-diaminobenzenesulphonic acid, the diazo component of the formula

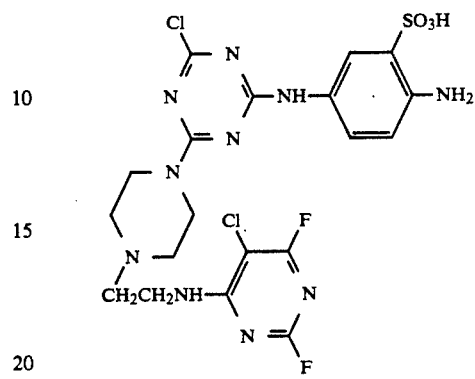

is obtained.

Diazotization and coupling with the coupling component mentioned in Example 22 gives the dyestuff of the formula

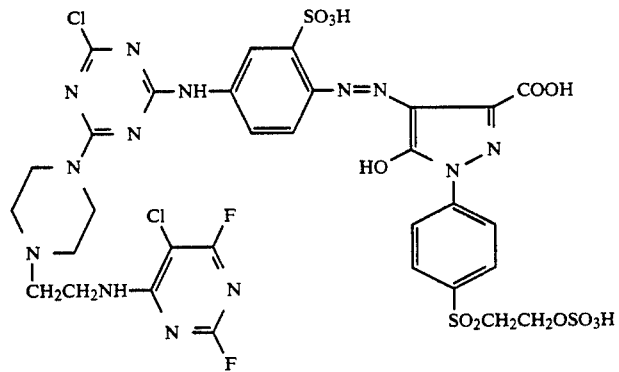

This dyestuff dyes cotton is golden yellow shades. The dyestuffs listed in the following table, which dye cotton in the color shade shown, can also be prepared analogously to the dyestuffs described.

| Example | Dyestuff/Colour shade |
|---|---|
| 24 |  greenish-tinged yellow |

-continued
| Example | Dyestuff/Colour shade |
|---|---|
| 25 | 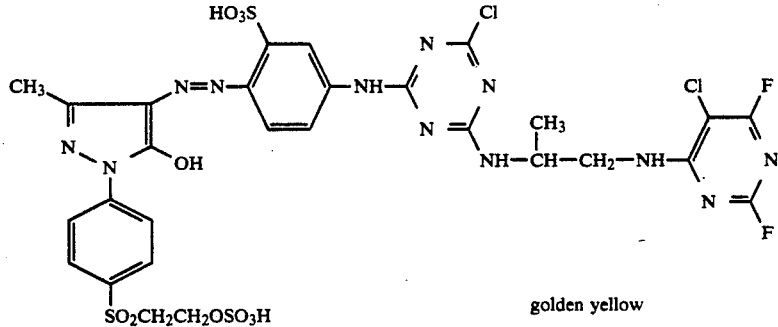 golden yellow |
| 26 | 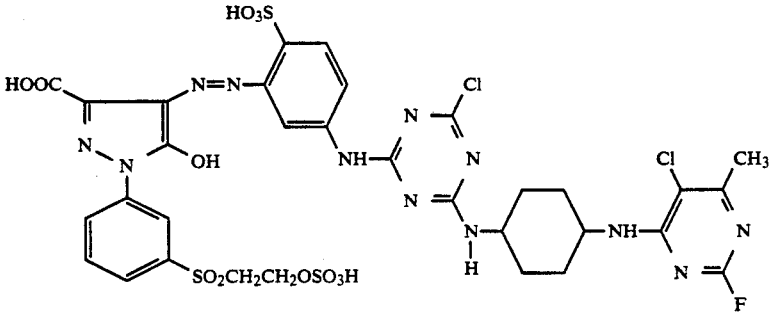 greenish-tinged yellow |
| 27 | 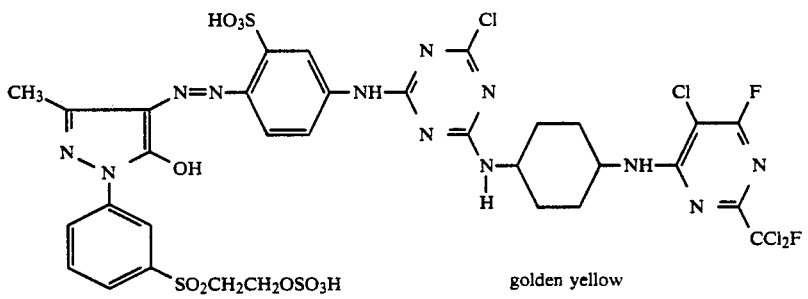 golden yellow |
| 28 | 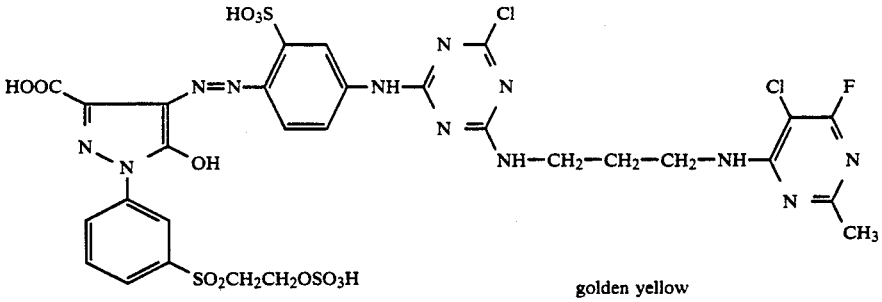 golden yellow |
| 29 | 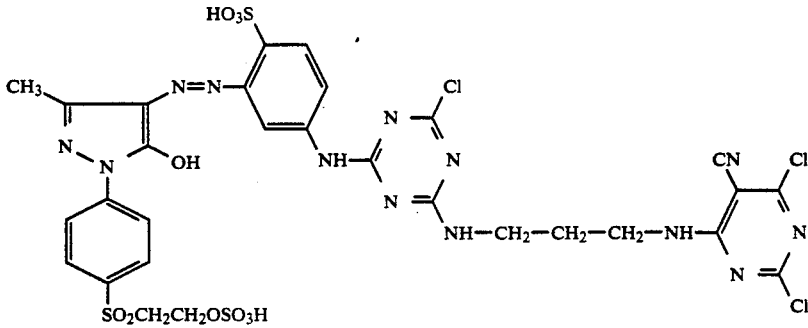 greenish-tinged yellow |

| Example | Dyestuff/Colour shade |
|---|---|
| 30 | 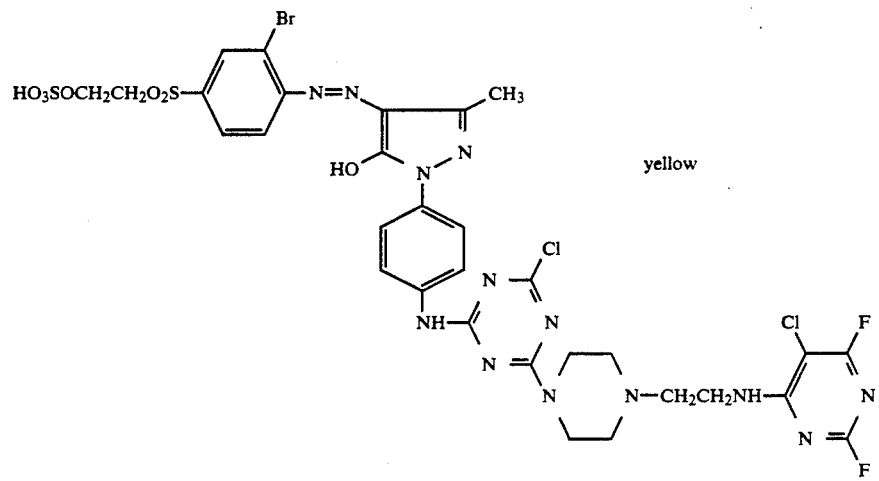 yellow |
| 31 | 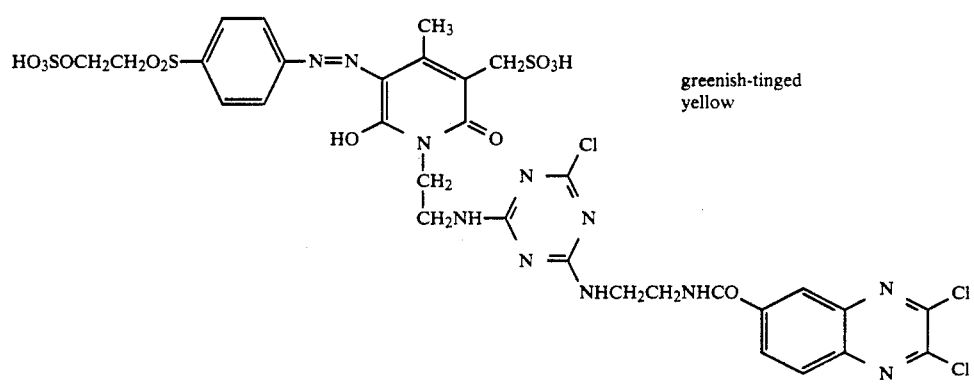 greenish-tinged yellow |
| 32 | 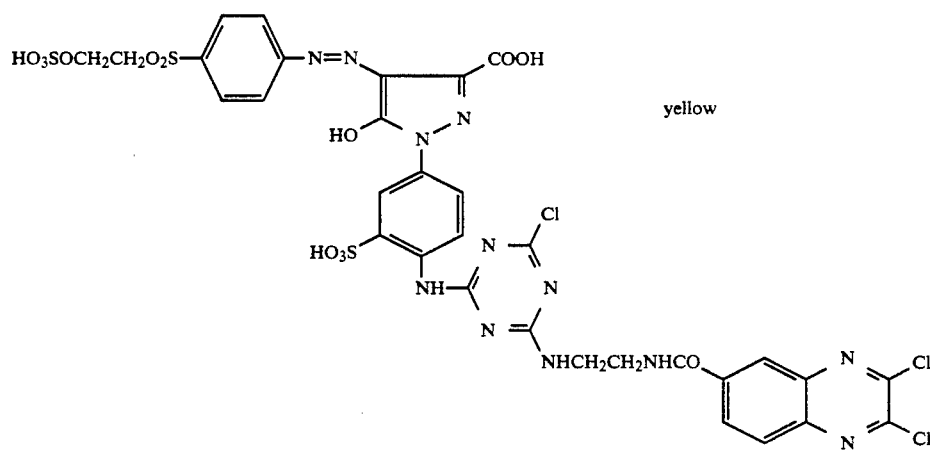 yellow |

| Example | Dyestuff/Colour shade | |
|---|---|---|
| 33 | 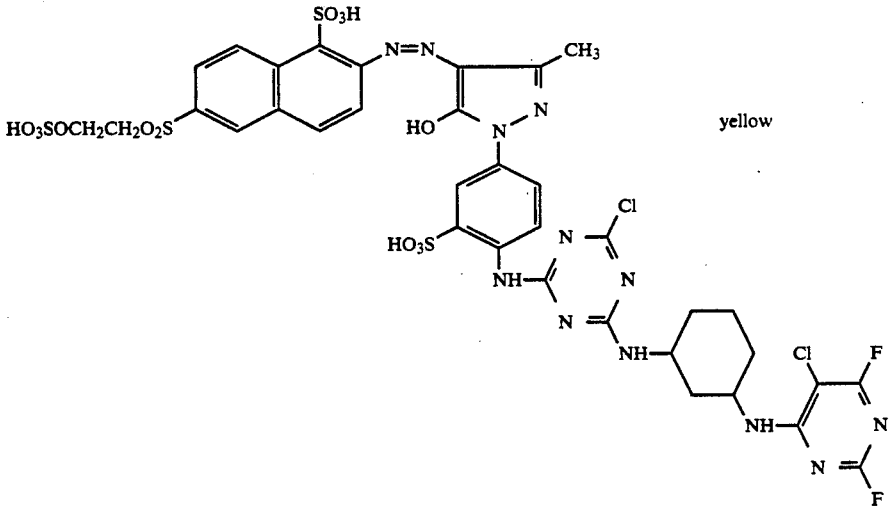 | yellow |
| 34 | 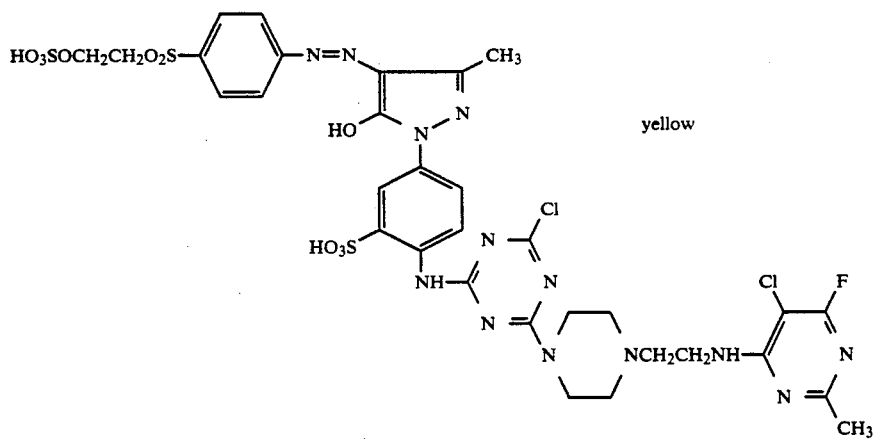 | yellow |
| 35 | 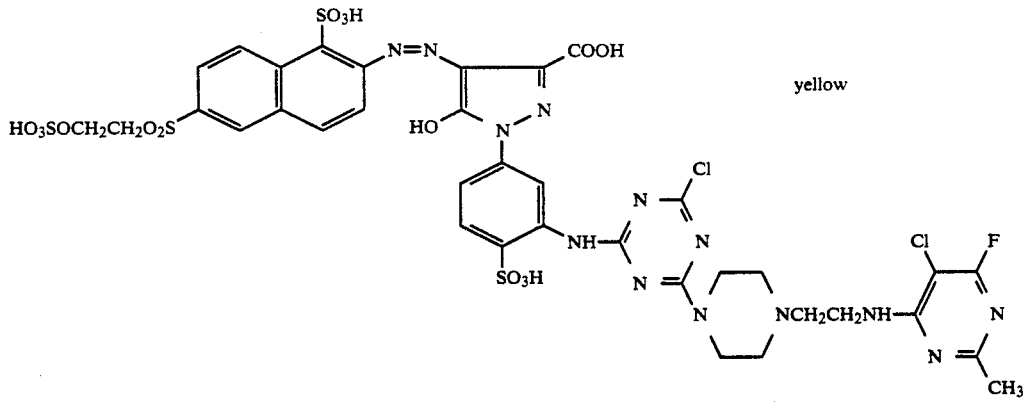 | yellow |

EXAMPLE 36

4-Acetylamino-2-amino-benzene-1-sulphonic acid is added to the diazotization mixture, prepared analogously to Example 2, of 1-amino-4-sulphatoethylsulphonylbenzene, and the pH is raised to pH 2 and kept at this value with sodium acetate solution. When the coupling has ended, acylation is carried out with 2,4,6-trichlorotriazine at pH 4 and 0° C., the hydrochloric acid formed being neutralized with sodium carbonate solution. When the condensation has ended, the product is reacted with p-aminoethylpiperazine at pH 5.5 and 5° C. and then with 5-chloro-2,4,6-trifluoropyrimidine at pH 6.5, the pH in each case being kept constant by dropwise addition of sodium bicarbonate solution. When the condensation has ended, the dyestuff is salted out, isolated, dried and ground. The dyestuff of the formula

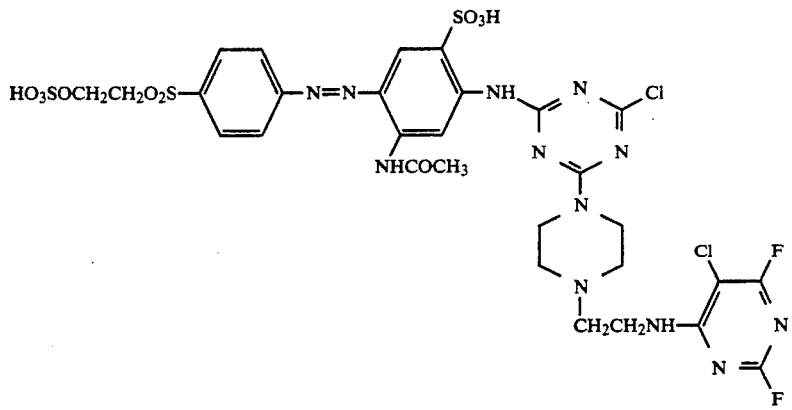
dyes cotton in yellow shades.
EXAMPLE 37
The dyestuff of the formula
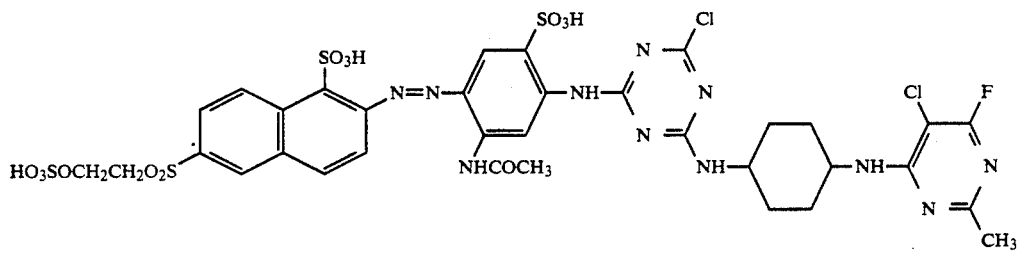
which dyes cotton in yellow shades, can be prepared analogously to Example 36 using the corresponding components.
The following dyestuffs, which dye cotton in yellow shades, can also be prepared analogously to Examples 36 and 37:
Example
38
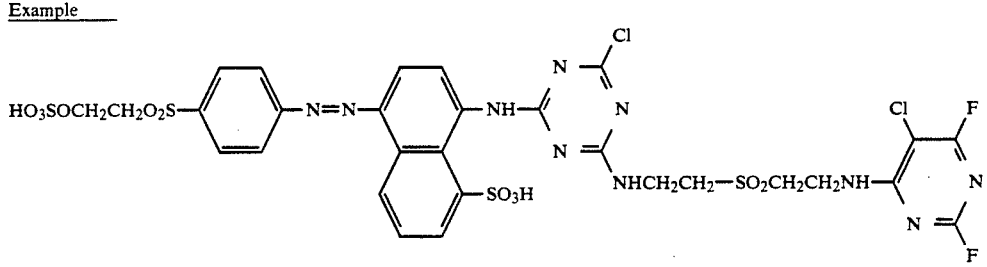
39
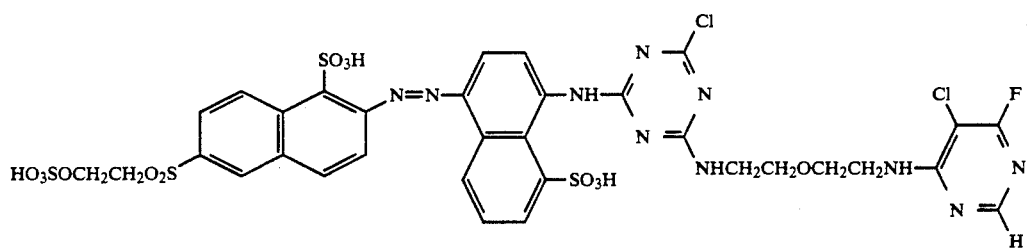
40
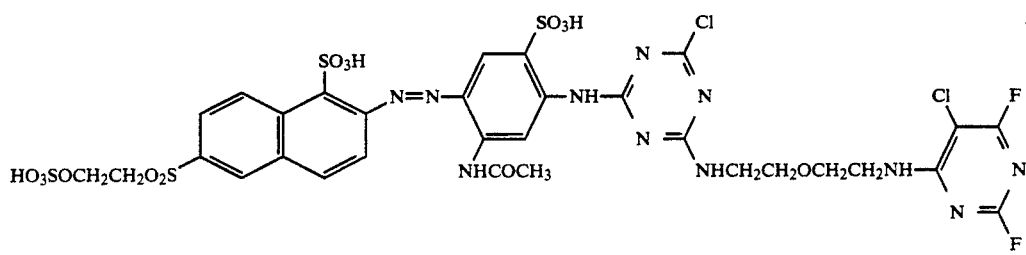

| Example | |
|---|---|
| 41 | 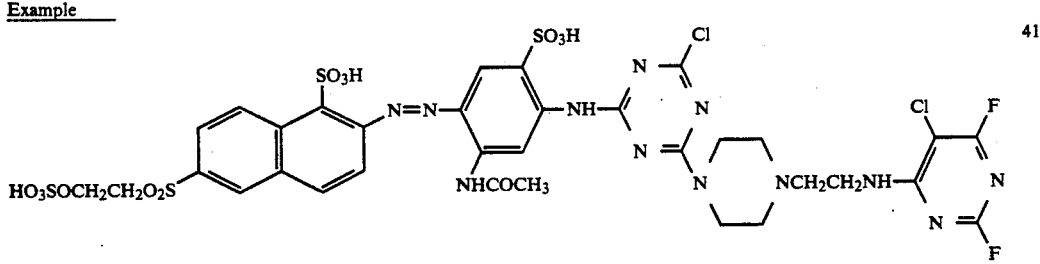 |
| 42 | 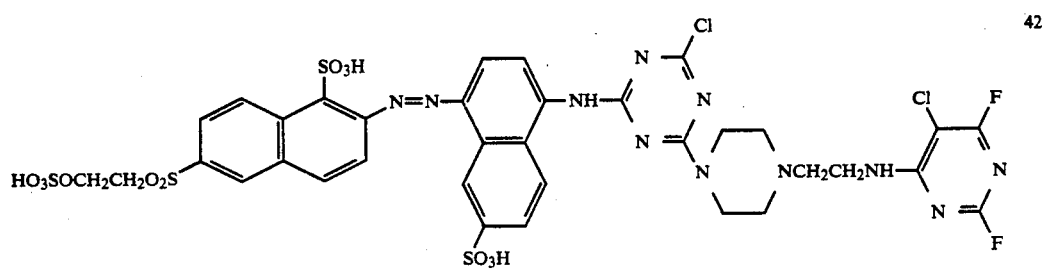 |
| 43 | 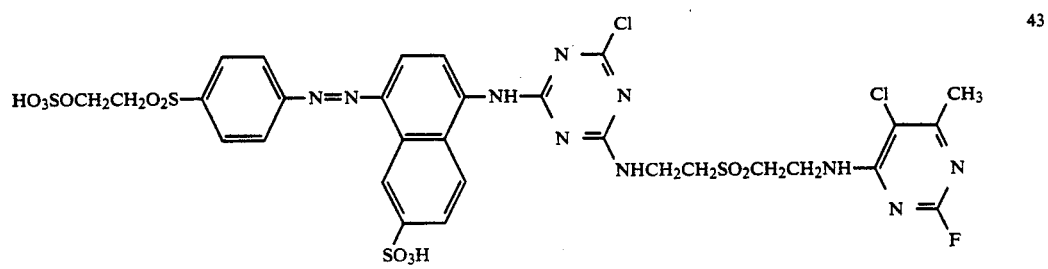 |

EXAMPLE 44

0.1 mol of H-acid is dissolved in 350 ml of water under alkaline conditions, the pH is brought to 4 with hydrochloric acid and acylation is carried out with 0.105 mol of 2,4,6-trichlorotriazine at 0° C., the pH being kept at 4 with sodium carbonate. When the condensation has ended, the reaction product is in solution and the solution is clarified. Condensation is then carried out with 1,4-cyclohexylenediamine at pH 7.5 and 30° C. The condensation product of 2-aminobenzenesulphonic acid and 2,4,6-trifluorotriazine is added to this product and condensation is carried out again at pH 7.5° and 10° C. During both condensations, the pH is maintained with sodium carbonate solution. 0.095 mol of 2-amino-6-sulphatoethylsulphonyl-naphthalene-1-sulphonic acid is now dissolved in 300 ml of water and diazotized with sodium nitrite solution in the presence of hydrochloric acid. After removal of excess nitrite with amidosulphonic acid, the diazotization mixture is added to the coupling component and the pH is brought to 6.5 to 7 and maintained at this value with sodium carbonate solution. When the coupling has ended, the dyestuff is salted out, isolated, dried and ground. The dyestuff thus obtained, of the formula

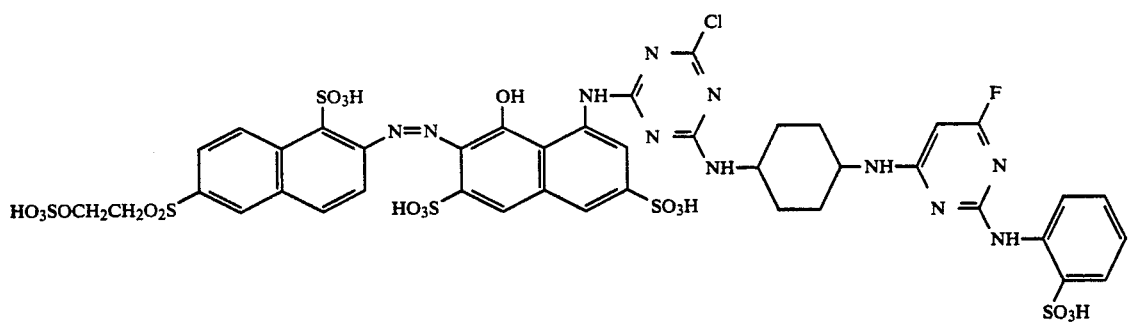

dyes cotton in bluish-tinged red shades.

EXAMPLE 45

0. 095 mol of 1-amino-4-sulphatoethylsulphonylbenzene is beaten in water and diazotized with sodium nitrite solution. The mixture is subsequently stirred for 30 minutes and excess nitrite is then removed with amidosulphonic acid. The diazotization mixture is added to the coupling component prepared in Example 44 and the pH is brought to 6 to 7 with sodium carbonate solution. When the coupling has ended, the dyestuff is salted out, isolated, dried and ground.

The dyestuff of the formula

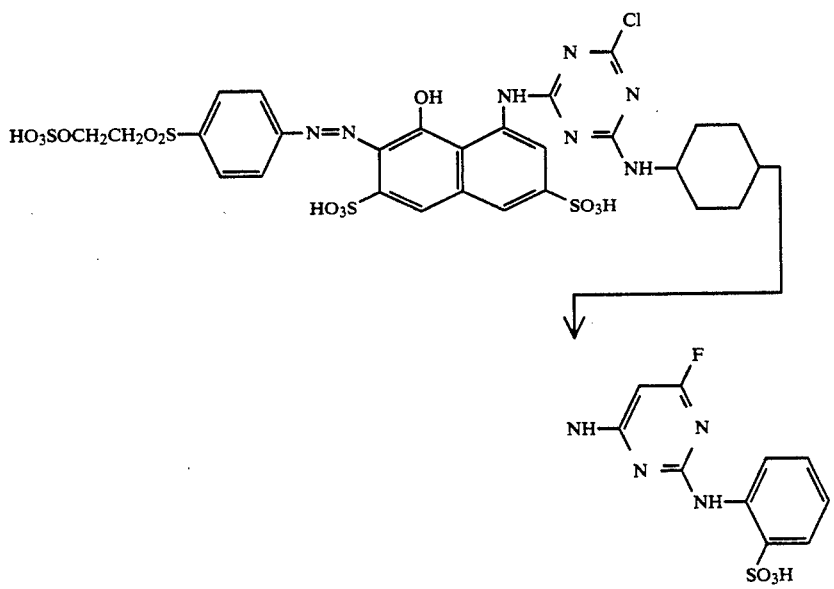

dyes cotton in clear red shades.

EXAMPLE 46

If the procedure is as according to Example 44 and the H acid is replaced by K acid, the dyestuff of the formula with which cotton is printed in clear red shades, is obtained.

EXAMPLE 47

If the procedure is as according to Example 45 and the H acid is replaced by K acid, the dyestuff of the formula with which cotton can be dyed or printed in clear yellowish-tinged red shades, is obtained.

The dyestuffs of the formula

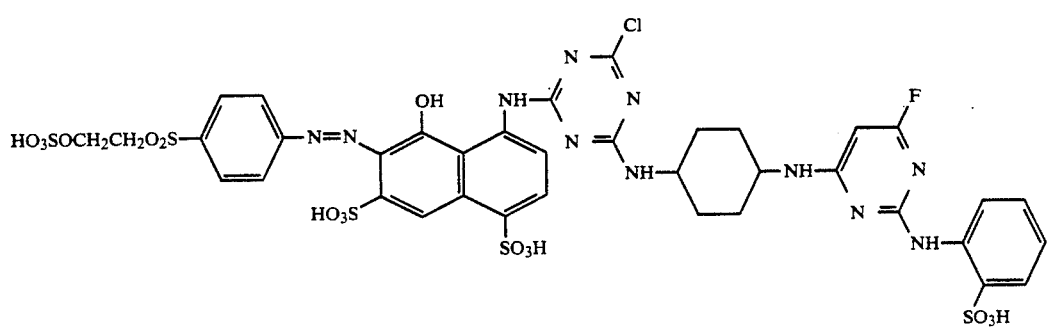

of Examples 48 to 100 can be obtained analogously to the processes described in the preceding examples, using the corresponding starting compound D-NH$_2$,
K-H$_2$,
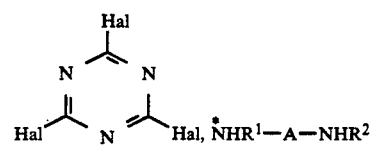
and Z-F.

| Example | D— | —K— | Hal | —N—A—N(R1)(R2) | —Z | Colour shade |
|---|---|---|---|---|---|---|
| 48 | naphthalene with SO₃H, CH₃, SO₂CH₂CH₂OSO₃H | 8-amino-1-hydroxy-naphthalene-3,6-disulfonic acid (NH—, OH, HO₃S, SO₃H) | Cl | piperazinyl-NCH₂CH₂—NH— | 5-chloro-6-fluoro-2-fluoro-4-methylpyrimidinyl | bluish-tinged red |
| 49 | " | " | Cl | —N(H)—CH₂CH₂N(CH₃)CH₂CH₂—N(H)— | " | bluish-tinged red |
| 50 | " | " | Cl | —N(H)—CH₂CH₂OCH₂CH₂—N(H)— | " | bluish-tinged red |
| 51 | " | " | Cl | —N(H)—CH₂CH₂—N(H)— | " | bluish-tinged red |
| 52 | " | " | Cl | " | 5-chloro-6-methyl-2-fluoro-4-methylpyrimidinyl | bluish-tinged red |
| 53 | " | " | Cl | piperazinyl-NCH₂CH₂—NH— | " | bluish-tinged red |
| 54 | " | " | F | piperazinyl-NCH₂CH₂—NH— | 5-chloro-6-fluoro-4-methylpyrimidinyl (H on N) | bluish-tinged red |
| 54a | naphthalene with SO₃H, CH₃, SO₂CH₂CH₂OSO₃H | 8-amino-1-hydroxy-naphthalene-3,6-disulfonic acid | Cl | " | " | bluish-tinged red |

-continued

| Example | D— | —K— | Hal | —N—A—N— R¹ R² | —Z | Colour shade |
|---|---|---|---|---|---|---|
| 55 | | | Cl | | F, Cl, N, CH₃ pyrimidine | bluish-tinged red |
| 56 | " | " | Cl | " | " | red |
| 57 | " | " | Cl | " | " | " |
| 58 | " | " | F | morpholine-NCH₂CH₂—NH— | F, Cl, N, H pyrimidine | red |
| 58a | " | " | Cl | " | " | " |
| 59 | " | " | Cl | —N—CH₂CH₂OCH₂CH₂—N— H H | " | " |
| 60 | " | " | Cl | piperazine | " | " |

-continued

| Example | D— | —K— | Hal | —N—A—N—R¹/R² | —Z | Colour shade |
|---|---|---|---|---|---|---|
| 61 | HO₃SOCH₂CH₂O₂S—⟨C₆H₄⟩— | 8-amino-1-hydroxy-3,6-disulfo-naphthyl (NH at 8, OH at 1, SO₃H at 3 and 6) | Cl | piperazin-1,4-diyl | 5-chloro-6-fluoro-2-fluoro-4-methyl-pyrimidin-yl | yellowish-tinged red |
| 62 | " | " | Cl | 4-(2-aminoethyl)piperazin-1-yl (—N(piperazine)—CH₂CH₂—NH—) | " | yellowish-tinged red |
| 63 | " | " | Cl | " | 5-chloro-6-fluoro-2-fluoro-4-methyl-pyrimidin-yl | yellowish-tinged red |
| 64 | " | " | Cl | —NH—CH₂CH₂SO₂CH₂CH₂—NH— | 5-chloro-6-fluoro-2-fluoro-4-methyl-pyrimidin-yl | yellowish-tinged red |
| 65 | " | " | Cl | —NH—CH₂CH₂CH₂—NH— | " | yellowish-tinged red |
| 67 | " | " | Cl | —NH—CH₂CH₂OCH₂CH₂—NH— | " | yellowish-tinged red |
| 67 | HO₃SOCH₂CH₂O₂S—⟨C₆H₄⟩— | 8-amino-1-hydroxy-3,6-disulfo-naphthyl | F | " | " | yellowish-tinged red |

-continued

| Example | D— | —K— | Hal | —N(R¹)—A—N(R²)— | —Z | Colour shade |
|---|---|---|---|---|---|---|
| 68 | " | 8-amino-1-hydroxy-2-methyl-naphthalene-3,6-disulfonic acid residue | Cl | | " | yellowish-tinged red |
| 69 | " | " | Cl | piperazinyl-N-CH₂CH₂NH— | " | yellowish-tinged red |
| 70 | " | " | Cl | 4-amino-3-sulfo-benzyl-N(H)— | 2-fluoro-4-morpholino-6-methyl-triazinyl | yellowish-tinged red |
| 71 | HO₃SOCH₂CH₂O₂S—(p-phenylene)— | 8-(4-ureido-phenylamino)-1-hydroxy-2-methyl-naphthalene-3,6-disulfonic acid residue | Cl | piperazinyl-NCH₂CH₂—NH— | 5-chloro-2,6-difluoro-pyrimidinyl | yellowish-tinged red |
| 72 | " | 8-amino-1-hydroxy-2-methyl-naphthalene-3,6-disulfonic acid residue | Cl | " | " | yellowish-tinged red |

-continued

| Example | D— | —K— | Hal | —N(R¹)—A—N(R²)— * | —Z | Colour shade |
|---|---|---|---|---|---|---|
| 73 | HO₃SOCH₂CH₂O₂S–C₆H₄– | " | Cl | " | " | yellowish-tinged red |
| 74 | ClCH₂CH₂O₂S–C₆H₄– | " | Cl | " | " | yellowish-tinged red |
| 75 | CH₃COCH₂CH₂O₂S–C₆H₄– (O=) | " | Cl | " | " | yellowish-tinged red |
| 76 | CH₂=CH–O₂S–C₆H₄– | 4-NH–, 5-OH, 3,7-(SO₃H)₂-naphthyl | Cl | piperazinyl-NCH₂CH₂–NH– | chloro-fluoro-methyl-pyrimidinyl (with F) | yellowish-tinged red |
| 77 | 2-methyl-6-(CH₂=CHO₂S)-1-SO₃H-naphthyl | " | Cl | " | " | bluish-tinged red |
| 78 | HO₃SSCH₂CH₂O₂S–C₆H₄– | 4-NH–, 5-OH, 3-CH₃, 6-SO₃H, 8-SO₃H-naphthyl | Cl | –N(H)–CH₂CH₂CH₂–N(H)– | chloro-(CHCl₂)-methyl-pyrimidinyl (with F) | yellowish-tinged red |

-continued
| Example | D— | —K— | Hal | —N—A—N—<br>  \|      \|<br>  R¹    R² | —Z | Colour shade |
|---|---|---|---|---|---|---|
| 79 | 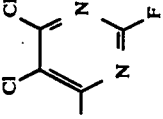 | 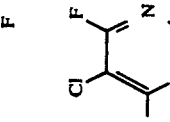 | Cl | —N—CH₂CH₂CH₂—N—<br>  \|                        \|<br>  H                        H | 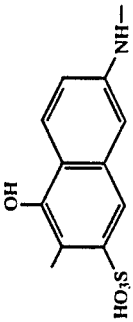 | yellowish-tinged red |
| 80 | " | " | Cl | " | 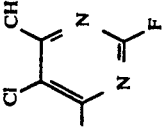 | scarlet |
| 81 | " | " | Cl | " | 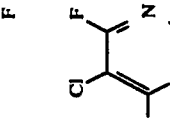 | " |
| 82 | " | " | Cl | " | 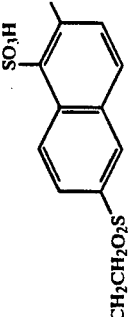 | " |
| 83 | " | " | Cl | 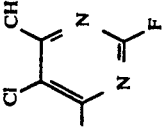 | " | " |

-continued

| Example | D— | —K— | Hal | —N-A-N-<br>R¹  R² | —Z | Colour shade |
|---|---|---|---|---|---|---|
| 84 | | | Cl | | | " |
| 85 | | | Cl | | | Scarlet |
| 86 | | | Cl | | | " |
| 87 | | | Cl | | | " |
| 89 | | | F | | | " |
| 90 | | | Cl | | | " |
| 91 | | | Cl | | | orange |

-continued
| Example | D— | —K— | Hal | —N—A—N—<br>\|   \|<br>R¹  R² | —Z | Colour shade |
|---|---|---|---|---|---|---|
| 92 | " | 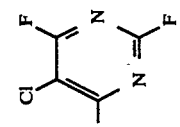 | Cl | —N—CH₂CH₂—N—H<br>\|              \|<br>H | 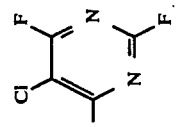 | " |
| 93 | " | " | Cl | " | " | " |
| 94 | " | " | Cl | 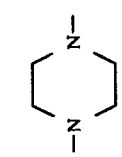 | 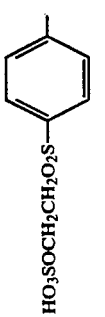 | " |
| 95 | HO₃SOCH₂CH₂O₂S—⟨phenyl⟩— | 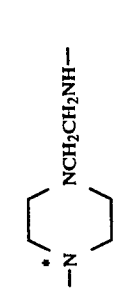 | Cl | 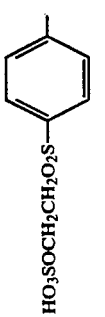NCH₂CH₂NH— | 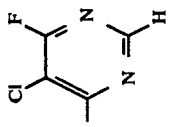 | orange |
| 96 | " | " | Cl | " | " | " |

-continued

| Example | D— | —K— | Hal | —N(R¹)—A—N(R²)— * | —Z | Colour shade |
|---|---|---|---|---|---|---|
| 97 | " | 7-(N-CH₂CH₂OSO₃H)amino-2-methyl-3-sulfo-8-hydroxynaphthalene | Cl | | pyrimidinyl (Cl, F, N, N, F, methyl) | " |
| 98 | 2-methyl-5-(HO₃SOCH₂CH₂O₂S)-benzene-1-sulfo | " | Cl | trans-1,4-diaminocyclohexane (N—H, N—H) | " | orange |
| 99 | " | 6-amino-2-methyl-3-sulfo-8-hydroxynaphthalene | Cl | trans-1,4-diaminocyclohexane (N—H, N—H) | " | " |
| 100 | " | " | Cl | —N(piperazinyl)—CH₂CH₂NH— | pyrimidinyl (Cl, F, N, N, F, methyl) | scarlet |
| 101 | " | " | Cl | " | " | " |
| 102 | " | " | Cl | —NCH₂CH₂OCH₂CH₂N(H)— H | " | " |
| 103 | 4-(HO₃SOCH₂CH₂O₂S)-benzene | " | Cl | —NCH₂CH₂CH₂N(H)— H | " | " |

-continued

| Example | D— | —K— | Hal | —N—A—N— / \ R¹ R² | —Z— | Colour shade |
|---|---|---|---|---|---|---|
| 104 | HO₃SOCH₂CH₂O₂S—(p-tolyl) | 2-methyl-3-sulfo-6-(N-CH₂CH₂OSO₃H)amino-8-hydroxynaphthalene | Cl | —NCH₂CH₂N— / \ H H | 5-chloro-4-fluoro-6-methyl-pyrimidinyl | scarlet |
| 105 | 1-sulfo-2-methyl-6-(HO₃SOCH₂CH₂O₂S)naphthalene | " | Cl | " | " | " |
| 106 | " | 2-methyl-3-sulfo-6-amino-8-hydroxynaphthalene | Cl | " | 2-(3-sulfoanilino)-4,6-difluoro-triazinyl | " |
| 107 | " | 2-methyl-3-sulfo-6-amino-7-sulfo-8-hydroxynaphthalene | Cl | " | 5-chloro-4-fluoro-6-methyl-pyrimidinyl | " |
| 108 | " | " | Cl | piperazinyl | " | " |

-continued

| Example | D— | —K— | Hal | —N-A-N(R¹)(R²) | —Z | Colour shade |
|---|---|---|---|---|---|---|
| 109 | HO₃SOCH₂CH₂O₂S–⟨phenyl⟩– | HO₃S–/OH/–(naphthalene)–/NH–/SO₃H (with CH₃) | Cl | piperazine (N–⟨ring⟩–N) | ⟨pyrimidine with Cl, F, F⟩ | scarlet |
| 110 | " | " | Cl | —NCH₂CH₂CH₂N(H)— with H | " | " |

EXAMPLE 111

0.1 mol of the azo dyestuff of the formula

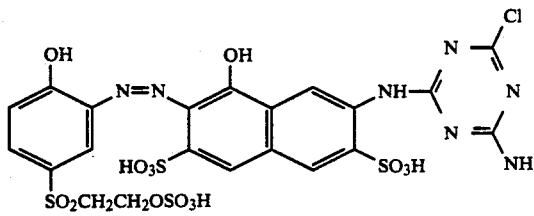

are dissolved in 1 l of water under neutral conditions. 28 g of copper sulphate (CUSO$_4$, 5H$_2$O) are sprinkled in at room temperature and the pH is kept between 5.5 and 6.5 by simultaneous dropwise addition of sodium carbonate solution. When the coppering has ended, the dyestuff is salted out with sodium chloride, filtered off with suction, dried and ground.

A dark powder which readily dissolves in water and dyes cotton ruby by one of the dyeing processes customary for reactive dyestuffs is obtained. The dyestuff corresponds to the formula

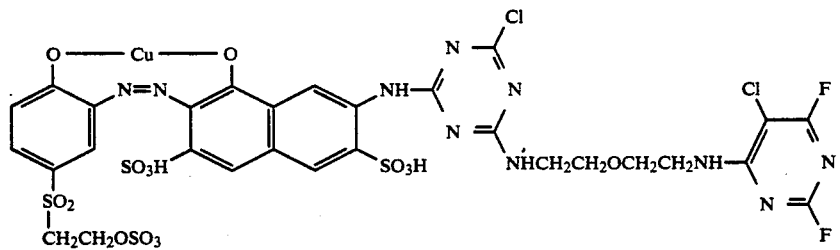

The azo dyestuff used in this example is obtained by diazotizing 2-amino-4-sulphatoethylsulphonylphenol and coupling the diazotization product, at pH 5.5 to 6.5, to the condensation product obtained by acylation of 2-amino-8-hydroxy-naphthalene-3,6-disulphonic acid with 2,4,6-trichlorotriazine, condensation of the acylation product with diamino ether and acylation of the condensation product with 5-chloro-2,4,6-trifluoropyrimidine.

EXAMPLE 112

The condensation product, prepared at pH 4 and 40° C., of 1-hydroxy-3-sulpho-7-(2l-sulpho-4'-aminophenylamino)-naphthalene, 2,4,6-trichlorotriazine, β-aminoethylpiperazine and 5-chloro-2,4,6-trifluoropyrimidine is introduced into the diazotization mixture, prepared analogously to Example 2, of 1-amino-4-sulphatoethylsulphonylbenzene. The dyestuff of the formula

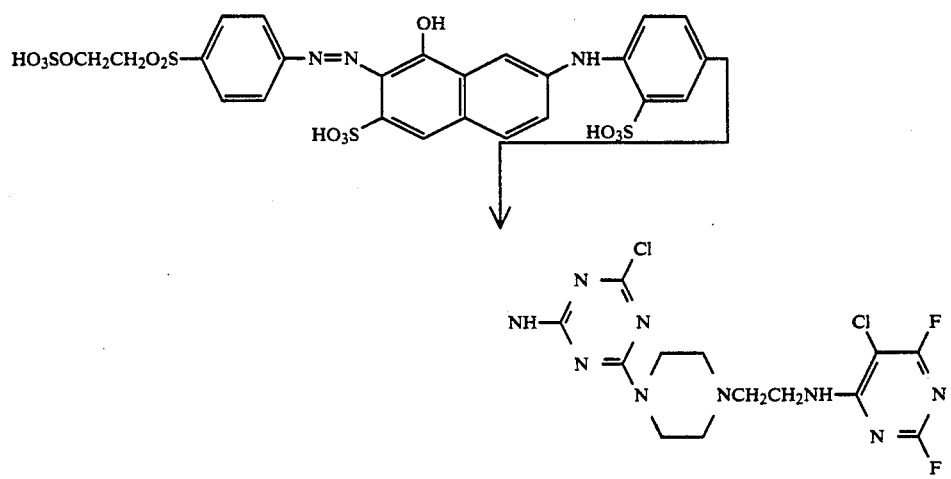

is prepared by bringing the pH to 6 to 7 with sodium carbonate solution. When the coupling has ended, the dyestuff is salted out, isolated, dried and ground. A dark brown powder which is readily soluble in water and dyes cotton brown is obtained.

EXAMPLE 113

If, in Example 112, the diazotization described therein is replaced by the diazotization described in Example 1, the dyestuff of the formula

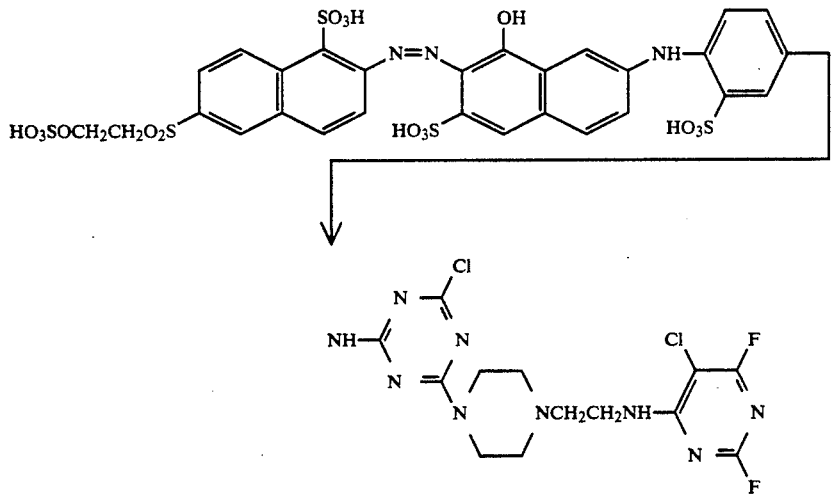

which likewise dyes cotton in brown shades, is obtained by the same procedure.

EXAMPLE 114

0.1 mol of the diazo dyestuff of the formula

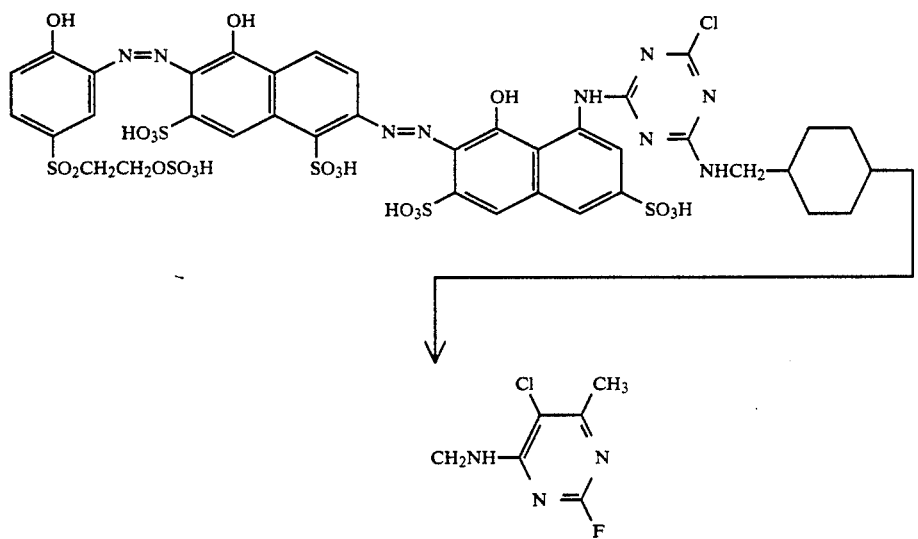

is dissolved in 1 l of water under neutral conditions, 28 g of copper sulphate (CuSO$_4$.5H$_2$O) are added at room temperature and the pH is kept at 5.5.to 6.5 by dropwise addition of sodium carbonate solution. When the coppering has ended, the dyestuff is salted out with sodium chloride, filtered off with suction, dried and ground.

A dark brown powder is obtained that readily dissolves in water and dyes cotton in navy blue shades by one of the dyeing processes customary for reactive dyestuffs. The dyestuff corresponds to the formula

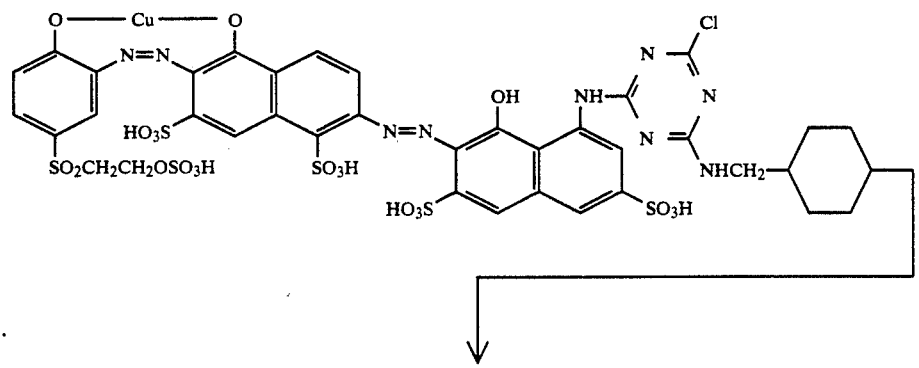

-continued

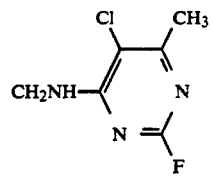

The disazo dyestuff used in this example is obtained by diazotizing 2-amino-4-sulphatoethylsulphonylphenol, coupling the diazotization product to 2-amino-5-hydroxynaphthalene-1,7-disulphonic acid at pH 5.5 to 6.5, diazotizing the resulting aminoazo dyestuff and coupling the diazotization product, at pH 5.5 to 6.5, to the condensation product obtained by acylation of 1-amino-8-hydroxy-npahthalene-3,6-disulphonic acid with 2,4,6-trichlorotriazine, condensation of the acylation product with the corresponding diamine and reaction of the condensation product with 5-chloro-2,4-difluoro-6-methylpyrimidine.

is stirred in water at 10° C. and pH 7.5. The aqueous-hydrochloric acid diazotization mixture of an equivalent amount of 2-amino-6-(2-sulphatoethyl)sulphonyl-1-naphthalenesulphonic acid is added to the mixture, and at the same time the pH is kept constant between 6.5 and 7.5 by metering in potassium bicarbonate solution. When the coupling has ended, the dyestuff is salted out, isolated, dried and ground. A black powder which dyes cotton in navy blue shades is obtained. The dyestuff corresponds to the formula

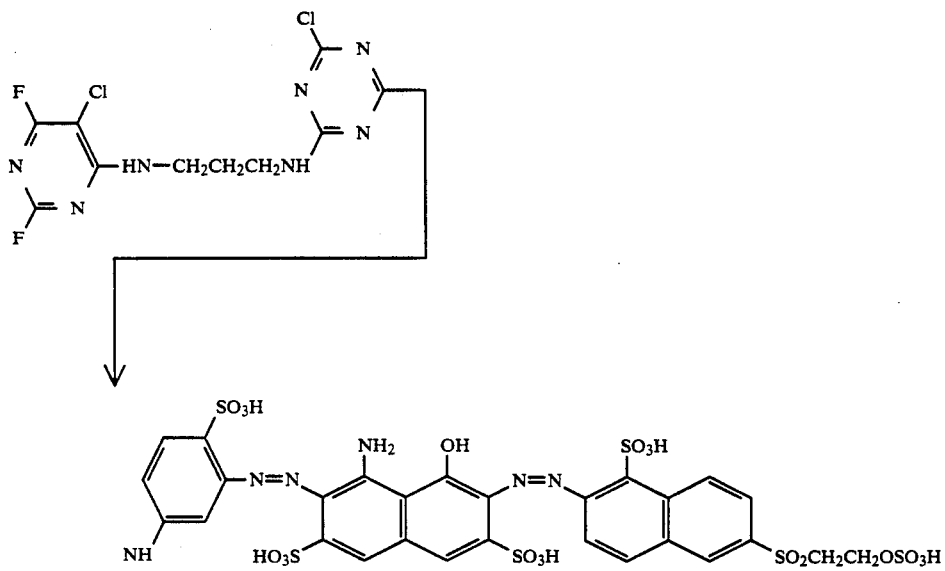

EXAMPLE 115

0.1 mol of the azo dyestuff of the formula

EXAMPLE 116

By varying the diazo compounds, Example 116 is obtained in an analogous procedure:

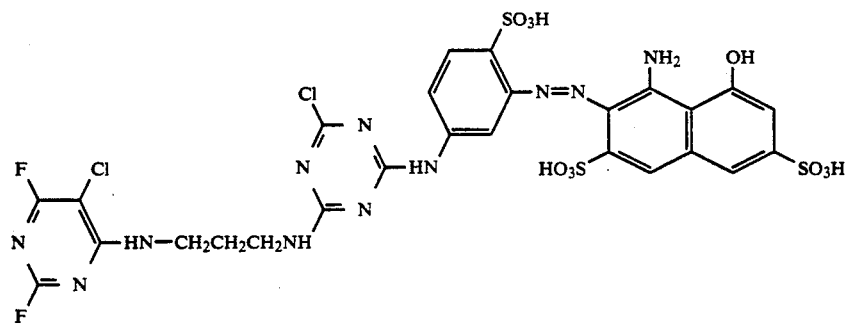

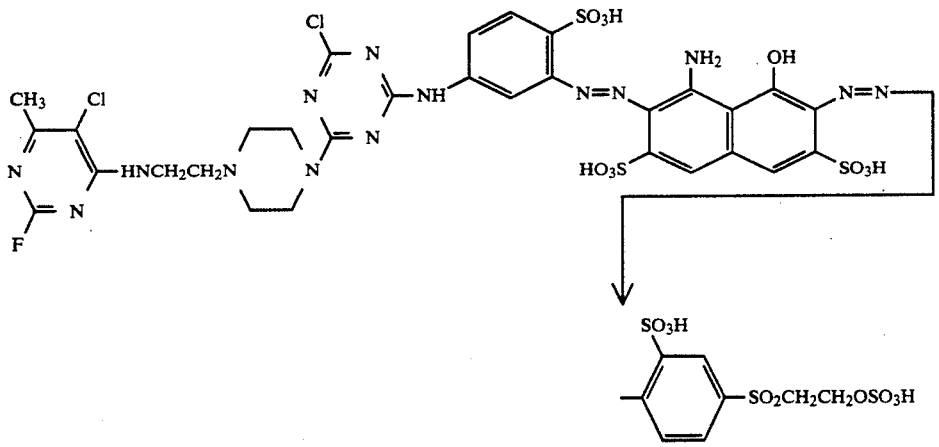

EXAMPLE 117

0.1 mol of 2,4-diaminobenzenesulphonic acid is acylated with 2,4,6-trichlorotriazine in water at pH 4 and 0° C. Reaction with piperazine and renewed condensation with 5-chloro-2,4,6-trifluoropyrimidine gives the diazo component of the formula

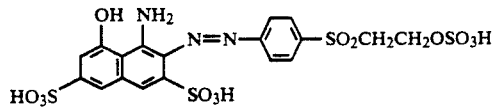

and the pH was kept constant at 6.5 by dropwise addition of sodium carbonate solution. When the coupling had ended, the dyestuff is salted out, isolated, dried and ground. A black powder which dyes cotton in navy blue shades is obtained. The dyestuff corresponds to the formula

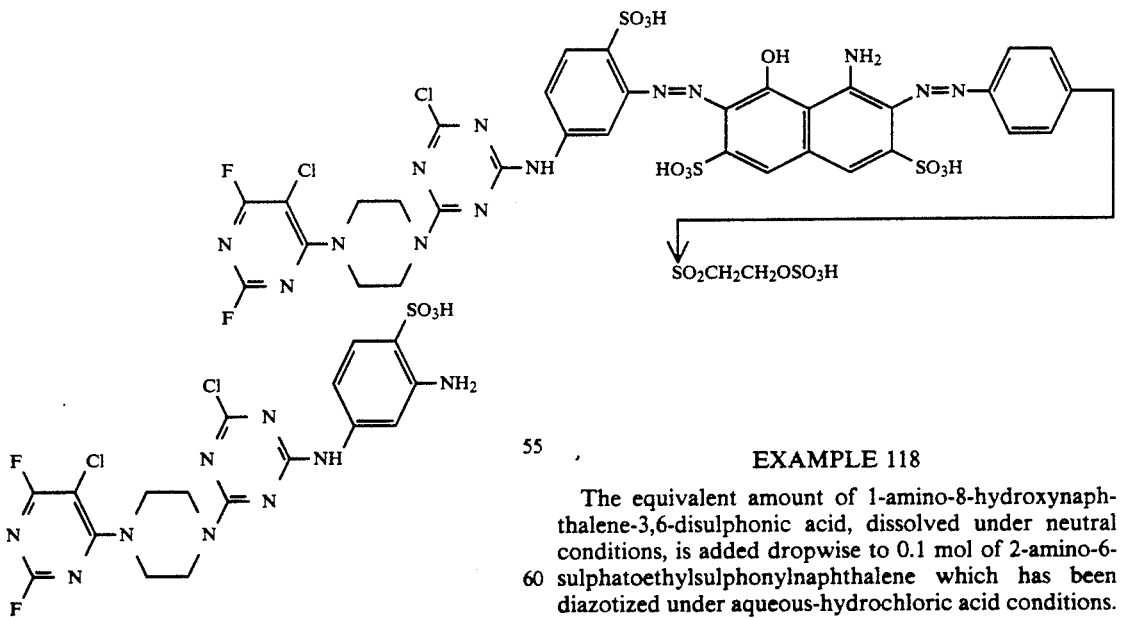

The hydrochloric acid or hydrofluoric acid formed during the condensation is neutralized with sodium carbonate solution.

The aqueous-hydrochloric acid diazotization mixture of this condensation product is added to the azo dyestuff of the formula

EXAMPLE 118

The equivalent amount of 1-amino-8-hydroxynaphthalene-3,6-disulphonic acid, dissolved under neutral conditions, is added dropwise to 0.1 mol of 2-amino-6-sulphatoethylsulphonylnaphthalene which has been diazotized under aqueous-hydrochloric acid conditions. When the acid coupling has ended, the diazotization mixture from Example 117 is added and the pH is brought to 6.5 with sodium carbonate solution. When the coupling had ended the dyestuff is salted out, isolated, dried and ground. A black powder which dyes cotton in navy blue to black shades is obtained. The dyestuff corresponds to the formula

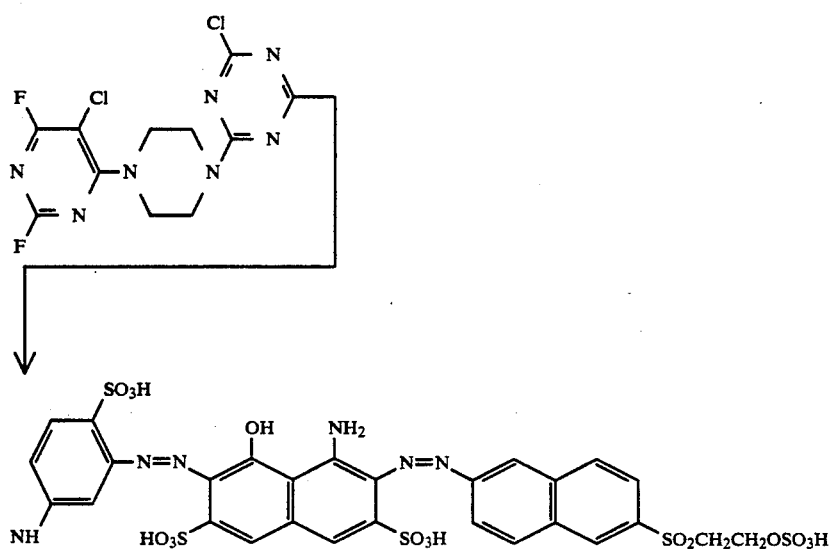
The dyestuffs listed in the following table, which dye cotton in the colour shade shown, can also be prepared analogously to the methods described.

| Example | Dyestuff | Colour shade |
|---|---|---|
| 119 | (structure) | navy blue |
| 120 | (structure) | navy blue |
| 121 | (structure) | navy blue |

-continued
| Example | Dyestuff | Colour shade |
|---|---|---|
| 122 | 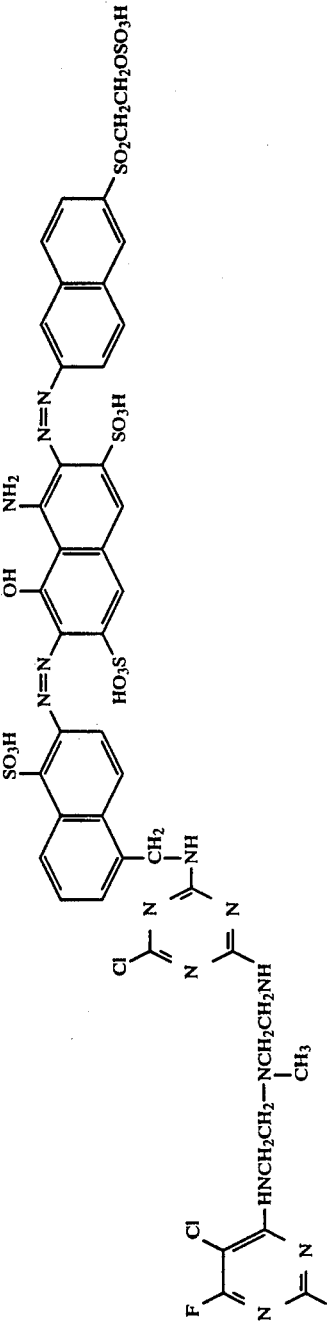 | navy blue |

EXAMPLE 123

The equivalent amount of 5-amino-2-naphthalenesulphonic acid is added to the diazotization mixture, prepared analogously to Example 2, of 1-amino-4-sulphatoethylsulphonylbenzene and the pH is brought to 4.5 by addition of sodium acetate solution. After the mixture has been stirred at 10° to 15° C. for 2 hours, no further diazotization product is detectable. The mixture is cooled to 0° to 5° C. and diazotization is carried out with sodium nitrite solution in the presence of hydrochloric acid. After 1 hour, excess nitrous acid is destroyed with amidosulphonic acid. 8-Amino-1-naphthalenesulphonic acid is introduced into the diazotization mixture, the pH is raised to 4 to 5 with sodium carbonate solution and the mixture is subsequently stirred for 2 hours. When the coupling has ended, the product is acylated with the condensation product of the formula

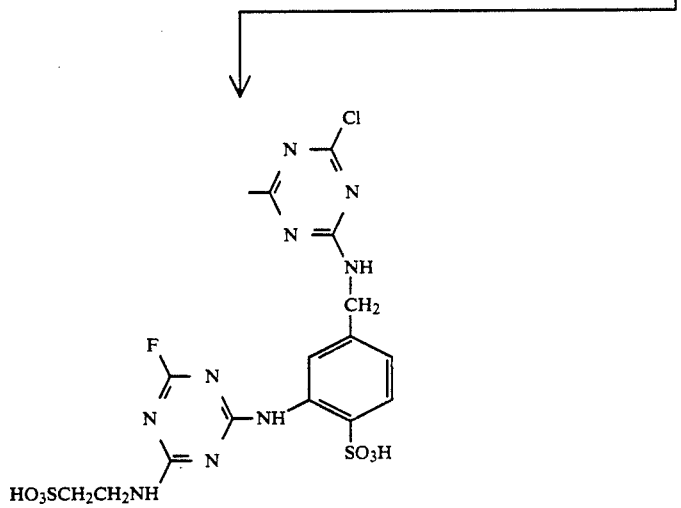

The dyestuff is salted out, isolated, dried and ground. A dark brown dyestuff powder which contains the dyestuff of the formula

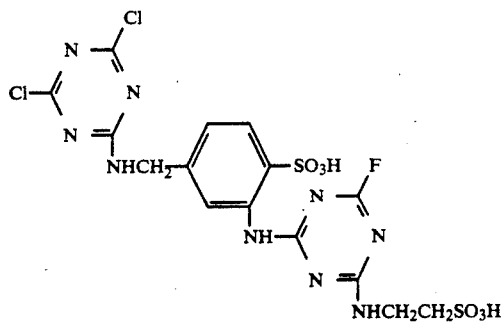

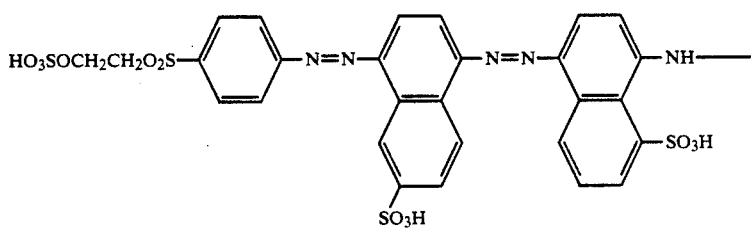

and dyes cotton in brown shades is obtained.

EXAMPLE 124

The dyestuff of the formula

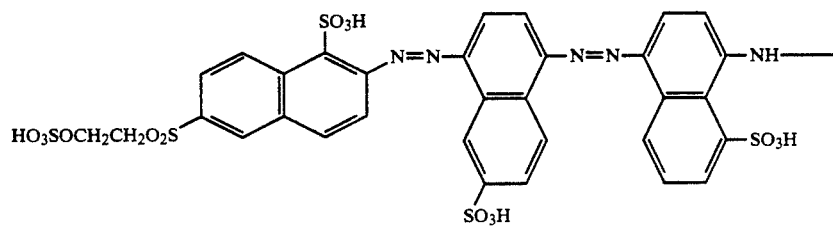

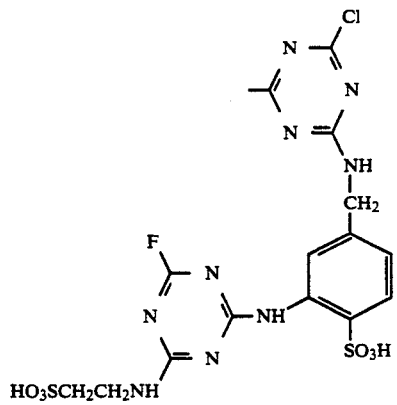

which dyes cotton in brown shades by the application methods customary for reactive dyestuffs, is obtained by the procedure of Example 123, using the diazotization mixture of 2-amino-6-sulphatoethylsulphonyl-naphthalene-1-sulphonic acid.

EXAMPLE 125

The dyestuff of the formula which dyes cotton in brown shades, is obtained by the procedure of Example 123 using the diazotization mixture of 7-amino-3-sulphatoethylsulphonyl-naphthalene-1-sulphonic acid, m-toluidine as the 2nd coupling component and morpholine as the protective amine.

The dyestuffs listed in the following table, which dye cotton in the colour shade shown, can also be prepared analogously to the method described.

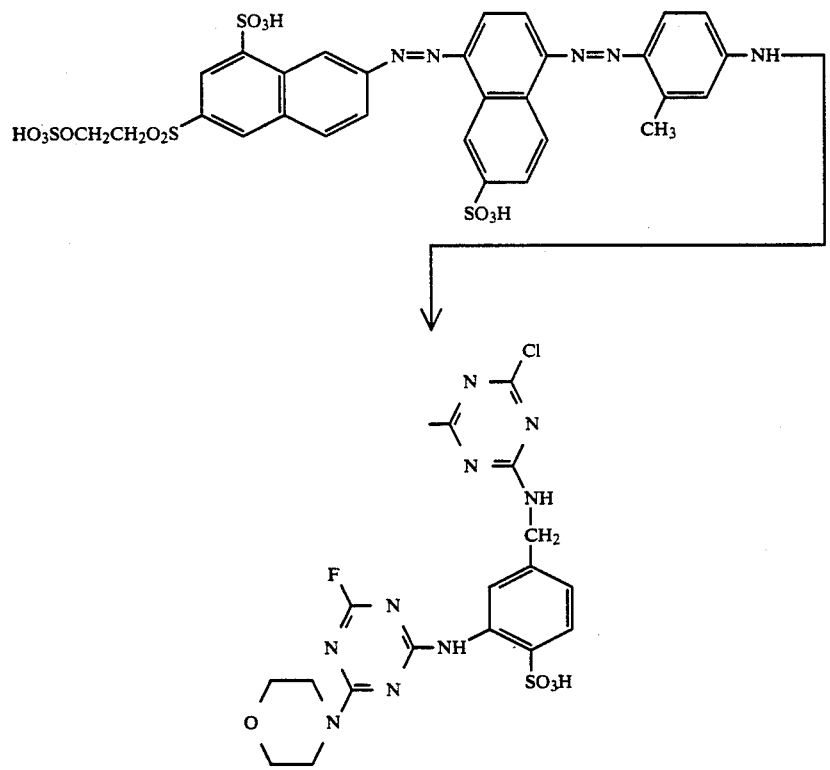

| Example | Colour shade |
| --- | --- |
| 126 | brown |

-continued

| Example | | Colour shade |
|---|---|---|
| | 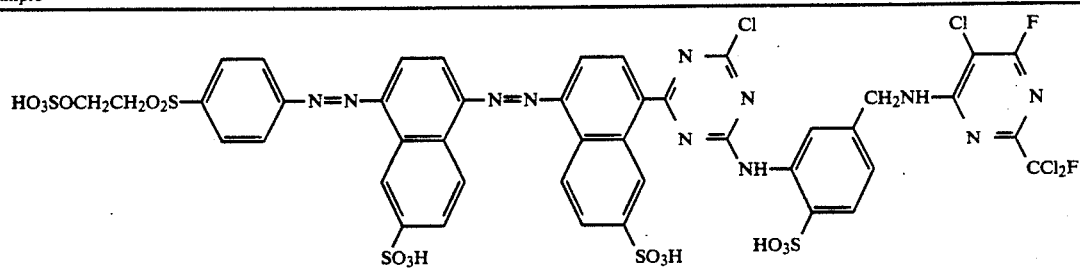 | |
| 127 | 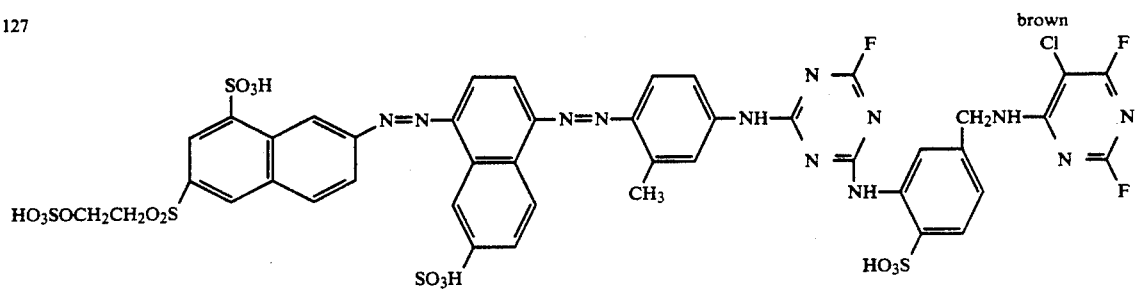 | brown |
| 128 | 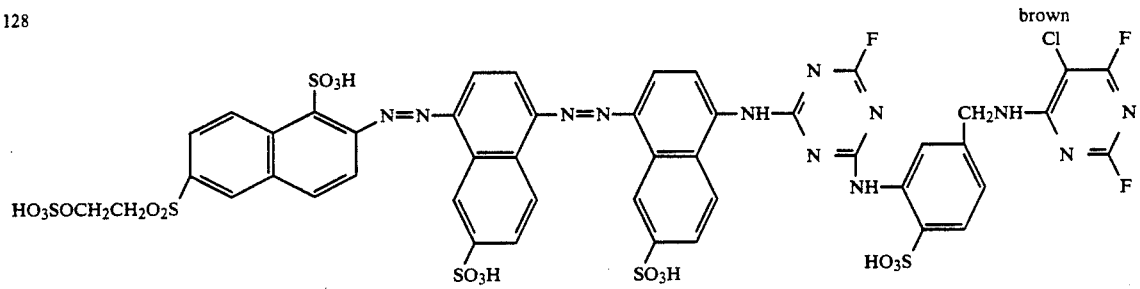 | brown |

EXAMPLE 129

30.3 parts of 2-naphthylamine-4,8-disulphonic acid are suspended in 400 parts by volume of water. 25 parts by weight of concentrated hydrochloric acid are added and diazotization is carried out with 20 parts by volume of 5N sodium nitrite solution. The mixture is subsequently stirred at 0° to 5° C. for a further hour and excess nitrous acid is then destroyed with a little amidosulphonic acid. 33.1 parts of 1-naphthylamine-6-β-sulphatoethyl-sulphone are then added and the pH is slowly increased to 4.5 with sodium acetate. The mixture is subsequently stirred at this pH and at 10° to 15° C. for a further 2 hours, until no further free diazonium compound is detectable. It is then cooled again to 0° to 5° C. and 35 parts of concentrated hydrochloric acid and then 22 parts by volume of 5N sodium nitrite solution are added. The mixture is subsequently stirred at 0° to 5° C. for 1 hour and a little amidosulphonic acid is then added.

22.5 parts of 1-naphthylamine-8-sulphonic acid are then introduced into the solution and the pH is brought to and kept at 4 to 5 with about 15 parts of sodium carbonate, the mixture being subsequently stirred for 2 hours. The dyestuff solution is then brought to pH 5.5 to 6.0 and warmed to 20° C. The equivalent amount of the condensation product from Example 123 is added at this temperature and at this pH, the pH is maintained with sodium carbonate solution and the mixture is then subsequently stirred for 1 hour. The dyestuff is isolated from the solution with potassium chloride and sodium chloride.

After drying at 40° to 50° C. and grinding, a black dyestuff powder of the formula

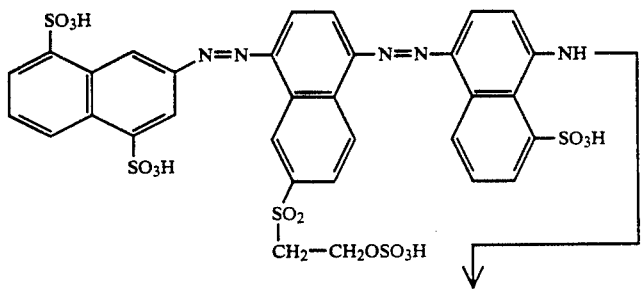

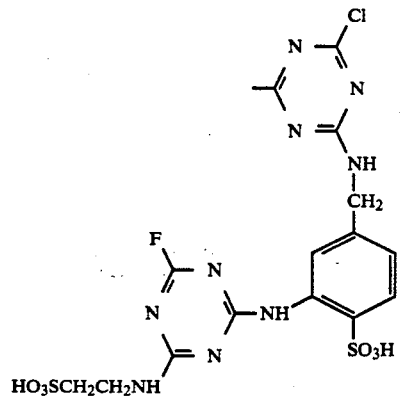

is obtained.

This compound has very good dyestuff properties and dyes cotton and wool in brown shades having very good wet-fastness properties by the customary dyeing and printing methods for reactive dyestuffs.

The following dyestuffs can be prepared by using the diazo components employed in Examples 115 and 119 as coupling components:

prepared by reaction of 1-chloro-2-(β-hydroxyethylsulphonyl)-4-nitrobenzene with the glacial acetic acid adduct of the diamine of the formula

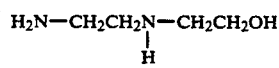

in isopropanol and subsequent catalytic hydrogenation with Raney nickel and hydrogen, is subjected to a con-

|  | Colour shade |
|---|---|
| Example 129 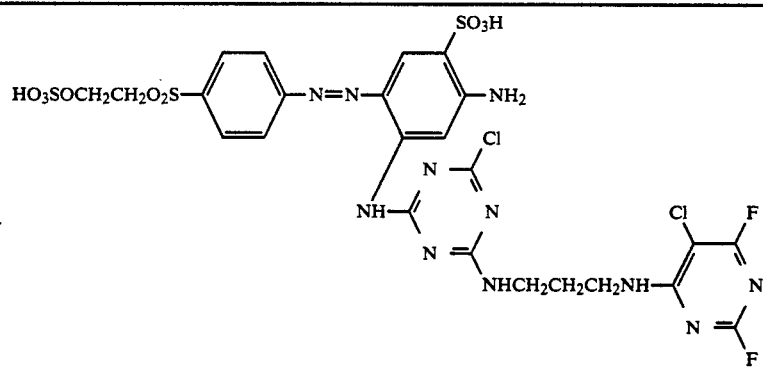 | yellow |
| Example 130 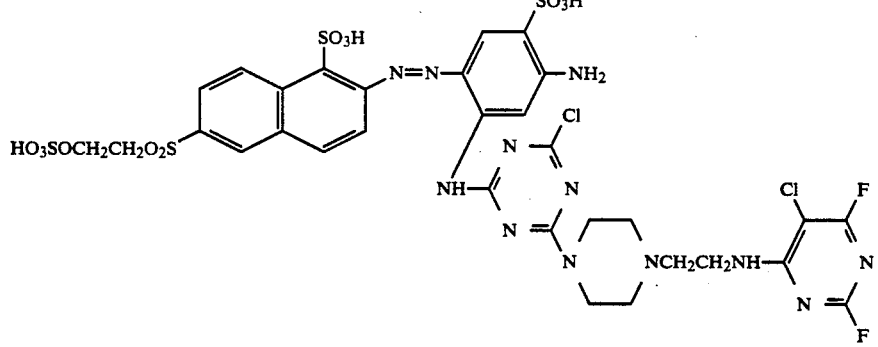 | yellow |
| Example 131  0.2 mol of the compound 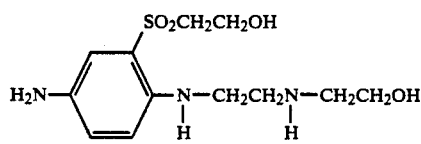 | | densation reaction with 0.1 mol of chloranil in isopropanol in the presence of sodium acetate at 80° C. The dark brown product which has precipitated, of the formula

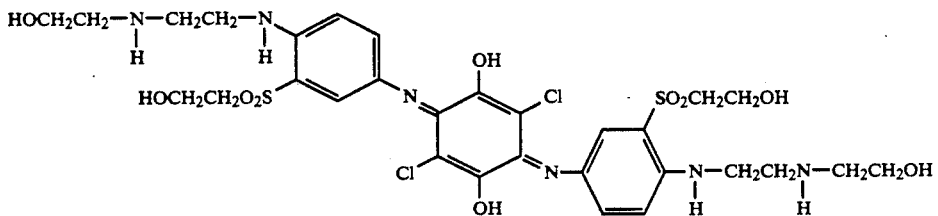

is filtered off with suction, dried and introduced into 250 ml of 20% strength oleum. Potassium peroxodisulphate is added to this batch and the mixture is heated in stages up to 40° to 50° C. It is then poured onto ice and the blue colour base of the structure

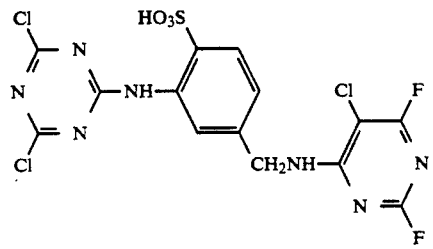

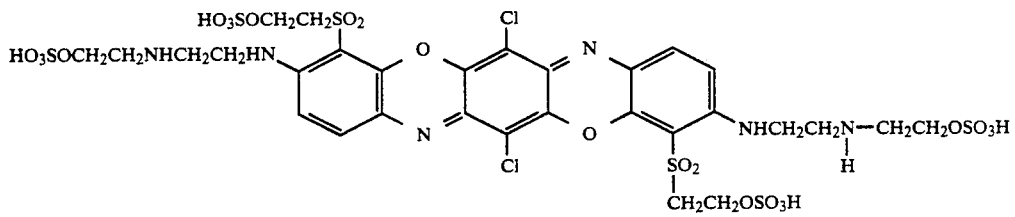

is isolated, beaten in water and subjected to a condensation reaction with 0.2 mol of the condensation product of the formula at 20° C. and pH 6.5 to 7.5.

The dyestuff is salted out with sodium chloride, isolated, dried and ground. A dark dyestuff powder which contains the dyestuff of the formula

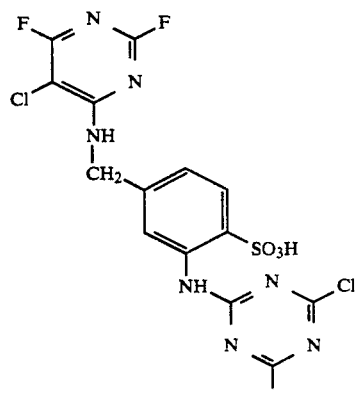

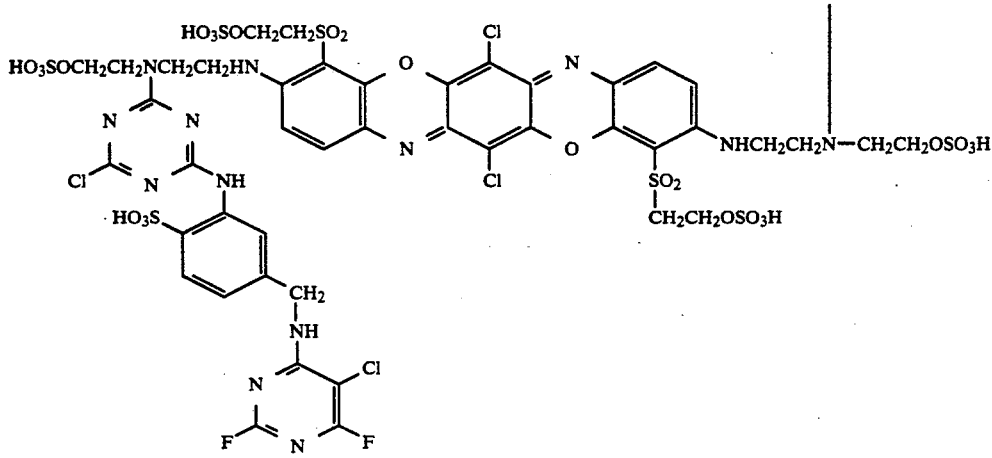

and dyes cotton and wool in blue shades by the dyeing and printing methods customary for reactive dyestuffs, is obtained.

EXAMPLE 132

127 g of the dyestuff (3-amino-4-sulphophenylaminosulphonyl)-(3-β-sulphatoethylsulphonyl-phenylaminosulphonyl)-copper phthalocyanine-disulphonic acid (prepared by mixed condensation of copper phthalocyanine-(3)tetrasulphochloride with 1,3-diaminobenzene-4-sulphonic acid and 3-β-sulphatoethylsulphonyl-aniline in aqueous solution in the presence of pyridine at pH 6 to 7.5) are dissolved in water under neutral conditions, with addition of sodium bicarbonate. The condensation product from Example 129 is added to this solution and the pH is kept between 6 and 6.5, at 20° C., by dropwise addition of sodium carbonate solution.

When the condensation has ended, the mixture is clarified and the dyestuff is separated out from the filtrate by addition of sodium chloride. After filtration with suction, drying and grinding, a blue dyestuff powder which readily dissolves in water giving a turquoise blue-coloured solution is obtained.

The dyestuff corresponds to the formula

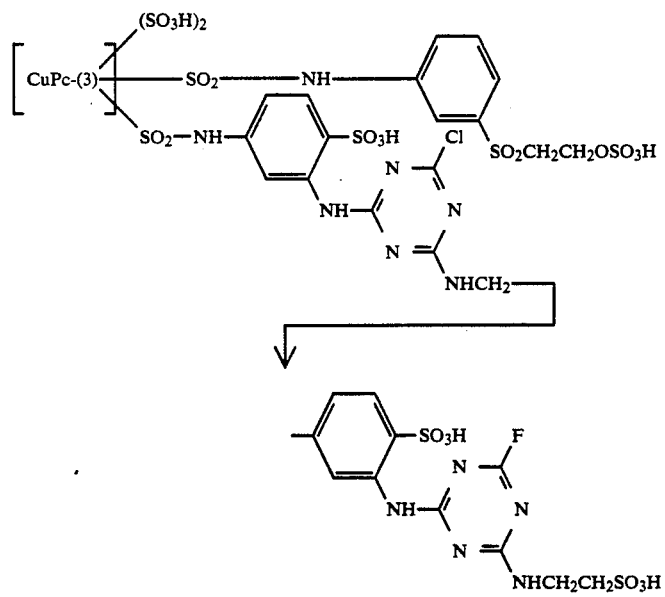

It dyes cotton in a turquoise blue shade.

The dyestuffs listed below, which dye cotton in the colour shade shown, can be prepared analogously to the procedure in Example 132.

| | | Colour shade on cotton |
|---|---|---|
| Example 133 | 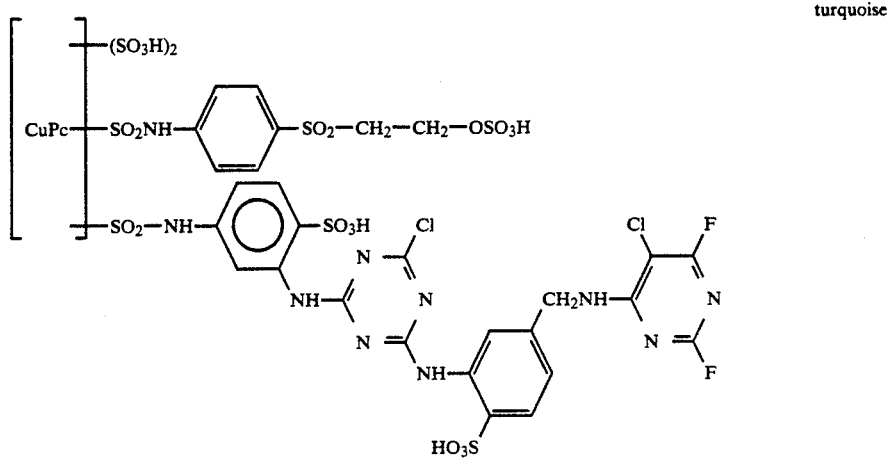 | turquoise |
| Example 134 | 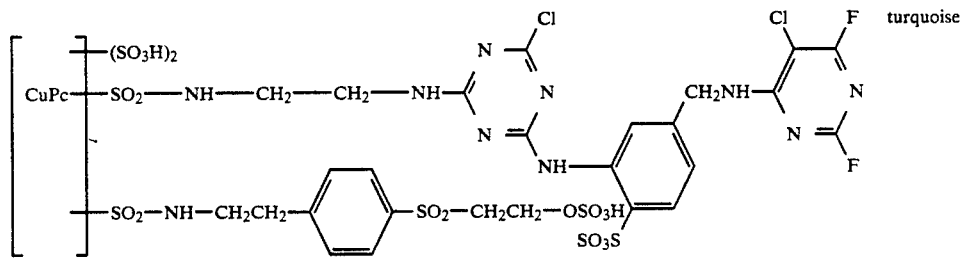 | turquoise |
| Example 135 | 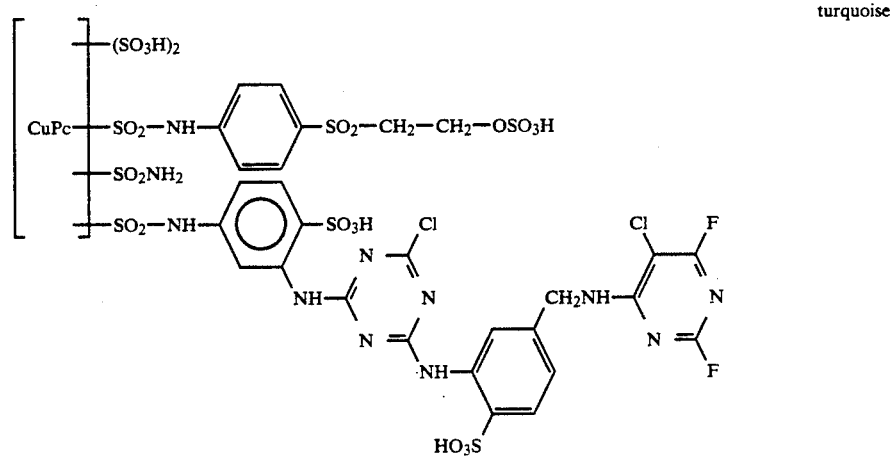 | turquoise |

-continued

|  | Colour shade on cotton |
|---|---|
| Example 136 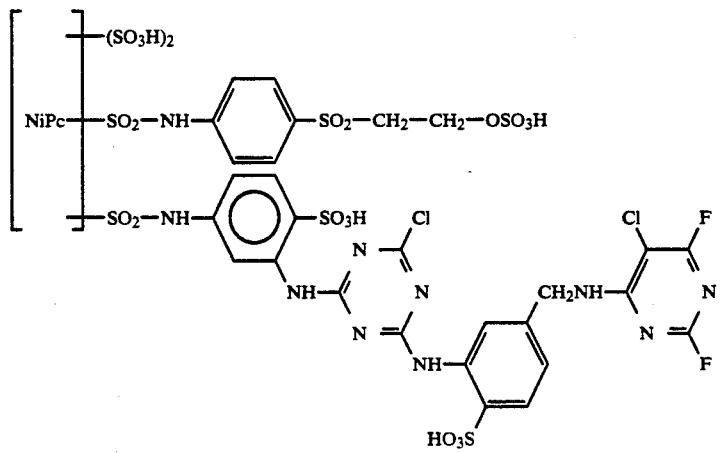 | green |

EXAMPLE 137

135 g of the dyestuff (3-amino-4-β-sulphatoethylsulphonyl-phenylaminosulphonyl)-copper phthalocyaninetrisulphonic acid are dissolved under neutral conditions. The solution is heated to 25° C., the condensation product of the formula

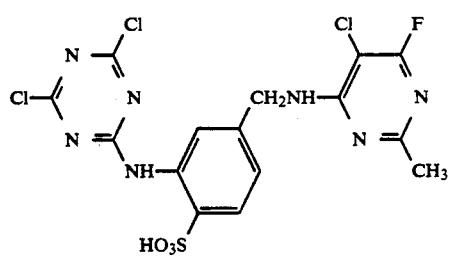

is added and the pH is then kept at 5. to 6.0 by addition of sodium bicarbonate. When the condensation has ended, the dyestuff solution is clarified and the dyestuff is slated out of the filtrate by addition of sodium chloride. After filtration with suction, drying and grinding, a blue dyestuff powder which dissolves in water to give a turquoise blue-coloured solution is obtained. The dyestuff corresponds to the formula

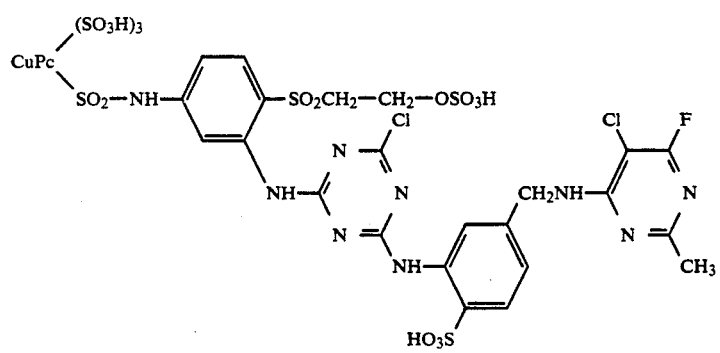

and dyes cotton in fast turquoise blue colour shades.

The compound used as the starting substance is prepared as follows: copper phthalocyanine-trisulphochloride-monosulphonic acid is subjected to a condensation reaction with 1,3-diaminobenzene-4-β-hydroxyethylsulphone in aqueous solution at pH 6 to 7. The condensation product is separated out by addition of sulphuric acid, isolated and dried. After grinding, the substance is esterified in sulphuric acid (monohydrate) by the customary methods. The mixture is then poured onto ice, while stirring, and the compound which has separated out is isolated on a suction filter and dissolved in water under neutral conditions, with addition of sodium bicarbonate.

The following dyestuffs are obtained analogously to the procedure described:

| | | Colour shade on cotton |
|---|---|---|
| Example 138 | 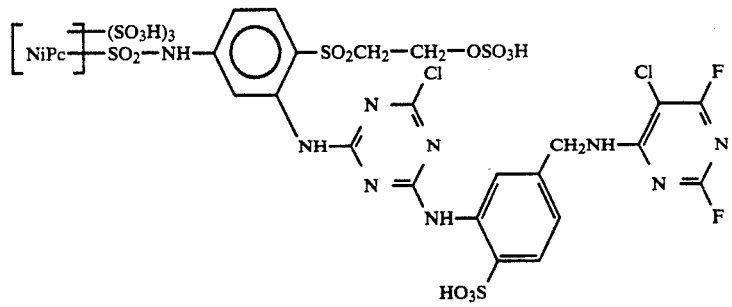 | green |
| Example 139 | 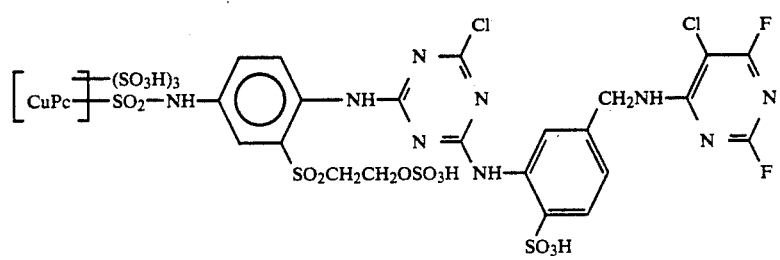 | greenish-tinged turquoise |
| Example 140 | 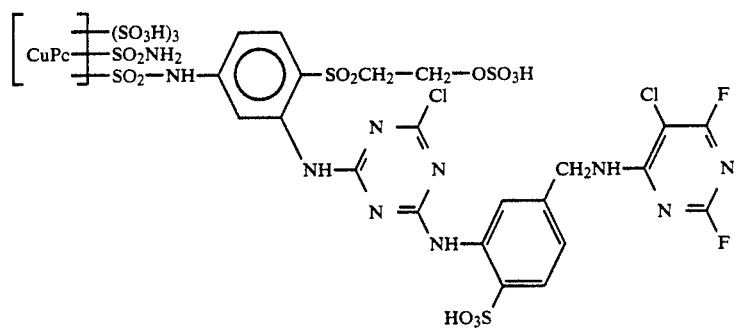 | turquoise |

EXAMPLE 141

52 g of the dyestuff 1-amino-4-(3'-amino-4'-β-hydroxyethylsulphonyl-phenylamino)-anthraquinone-2-sulphonic acid (prepared by condensation of 1,3-diaminobenzene-4-β-hydroxyethyl-sulphone and 1-amino-4-bromoanthraquinone-2-sulphonic acid) are introduced as dry ground goods into 200 g of monohydrate, while stirring. The mixture is stirred overnight at room temperature and the solution is then poured onto a mixture of 500 g of ice and 150 g of potassium chloride, while stirring.

The dyestuff which has separated out is then filtered off with suction, washed with saturated sodium chloride solution and dissolved in 300 parts of water under neutral conditions, with addition of sodium bicarbonate.

After addition of the condensation product of the formula

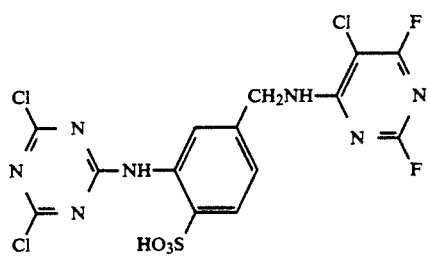

the pH is brought to 6 with sodium carbonate solution and is kept between 5 and 6 by dropwise addition of sodium carbonate solution. When the condensation has ended, the mixture is clarified and the dyestuff is separated out of the filtrate by salting out. A clear blue with good general fastness properties is obtained on cotton by one of the application processes customary for reactive dyestuffs.

The dyestuff corresponds to the formula

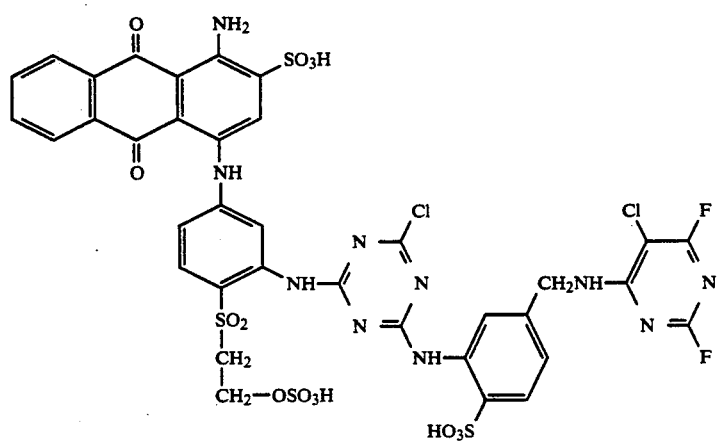

EXAMPLE 142

54 g of the dyestuff 1-amino-4-(2'-methyl-5'-amino-4'-β-hydroxyethylsulphonyl-phenylamino)-anthraquinone-2-sulphonic acid (prepared by condensation of 1-amino-4-bromo-anthraquinone-2-sulphonic acid and 2,4-diaminotoluene-5-β-hydroxyethyl-sulphone) are reacted analogously to Example 141.

The dyestuff of the formula

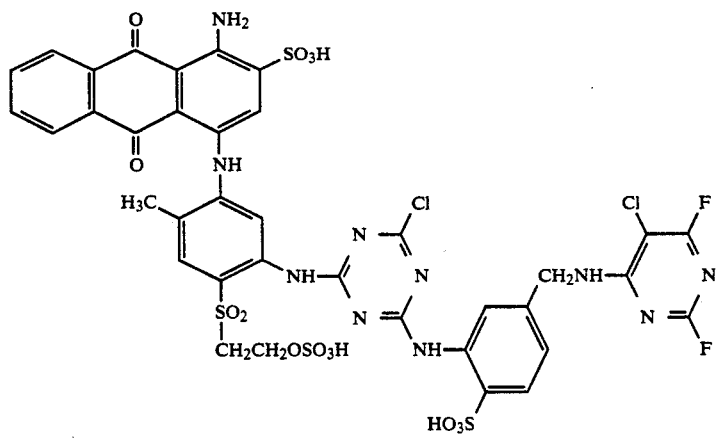

which dyes cotton and wool a fast, clear blue, is obtained.

The following dyestuffs can be prepared by the procedure of Example 141

| | | Colour shade on cotton |
|---|---|---|
| Example 143 | | greenish-tinged blue |

| | Colour shade on cotton |
|---|---|
| Example 144 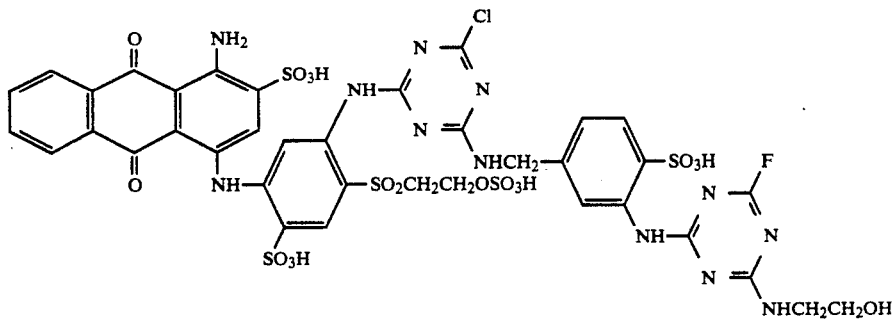 | blue |

EXAMPLE 145

23.3 g of 2-carboxyphenylhydroazine-4-sulphonic acid and 21.3 g of 4-acetaminobenzaldehyde-2-sulphonic acid are subjected to a condensation reaction in aqueous solution and the resulting hydrazone is coupled to the diazonium compound of 22.7 g of 2-aminophenol-4-(β-hydroxyethyl)-sulphone in the presence of sodium carbonate and 25 g of copper sulphate. When the reaction has ended, hydrolysis is carried out at 100° C., with addition of 15 g of sodium carbonate, until complete hydrolysis of the acetyl group can be detected by thin layer chromatography. The dyestuff is then separated out by addition of sodium chloride, isolated and dried. After grinding, the dyestuff powder is introduced into pyridine, while stirring.

The mixture is heated to 80° C. and the same amount of amidosulphonic acid as dyestuff powder is added. During this procedure, the temperature rises to 105° C. The mixture is subsequently stirred at 100° to 105° C. for a further ½ hour. Pyridine is then removed by distilling off and drying in vacuo and the residue is dissolved in water and subjected to a condensation reaction with the condensation product of the formula

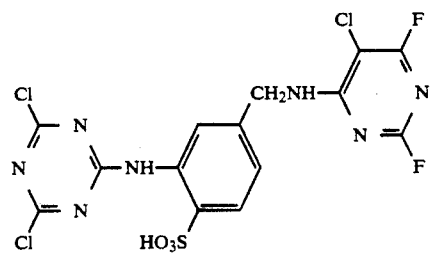

at pH 6 to 6.5. When the reaction has ended, the dyestuff is separated out with sodium chloride, isolated and dried.

After grinding, a dyestuff powder which contains the sodium salt of the compound of the formula

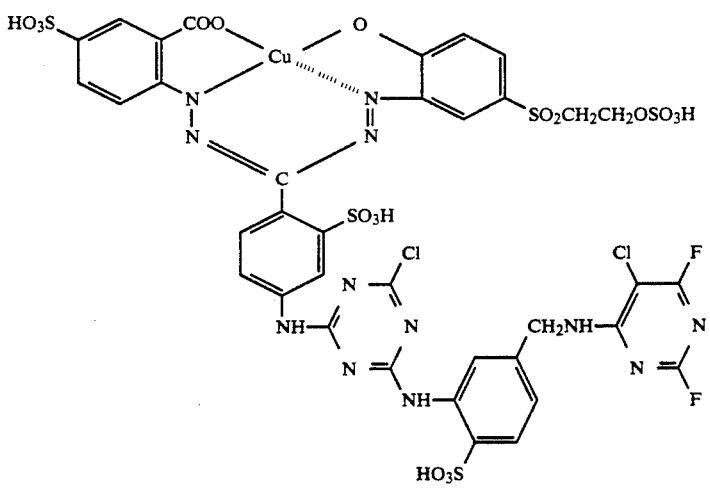

and dyes cotton in a blue shade, is obtained.

Other blue reactive dyestuffs according to the invention are obtained if, as described in Example 145, the following phenylhydrazines and aromatic aldehydes are reacted to give hydrazones, these are coupled with the diazo components likewise shown below in the presence of CuSO₄ and the dyestuffs formed are hydrolysed, sulphated and acylated with

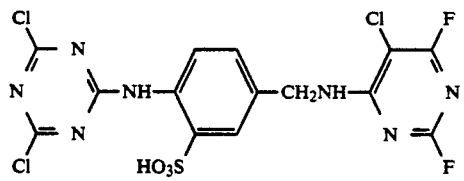

analogously to Example 145.

| Example | Phenylhydrazine | Aldehyde | Diazo component | Color shade on cotton |
|---|---|---|---|---|
| 146 | 2-carboxy-5-(β-hydroxy-ethylsulphonyl)-phenylhydrazine | benz-aldehyde | 3-acetyl-amino-4-hydroxy-5-aminobenzene-sulphonic acid | blue |
| 147 | 2-carboxy-4-acetylamino-phenylhydrazine | benz-aldehyde | 4-β-hydroxy-ethylsulphonyl-2-aminophenol-6-sulphonic acid | blue |

The following dyestuffs according to the invention can be prepared analogously to the dyestuffs described:

| | Colour shade on cotton |
|---|---|
| Example 148 | bluish-tinged red |
| Example 149 | greenish-tinged yellow |
| Example 150 | greenish-tinged yellow |

|  |  | Colour shade on cotton |
|---|---|---|
| Example 151 | 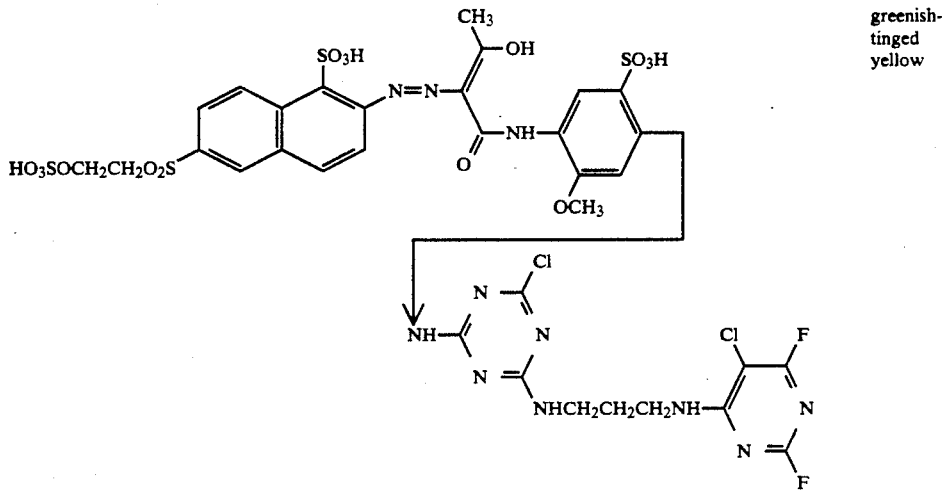 | greenish-tinged yellow |

We claim:

1. A dyestuff of the formula

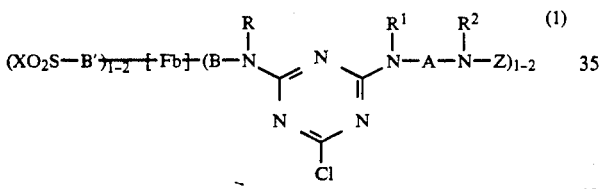

wherein
Fb = the radical of a dyestuff of the mono- or polyazo, metal complex azo, anthraquinone, phthalocyanine, formazan, azomethine, dioxazine, phenazine, xanthene, thioxanthone, naphthoquinone, stilbene or triphenylmethane series, B and B' = a direct bond or bridge member to a ring C atom of an aromatic-carbocyclic or to a ring C or N atom of an aromatic-heterocyclic ring in Fb, X = CH=CH$_2$ or CH$_2$CH$_2$—Y, wherein Y = a radical which can be eliminated under alkaline conditions, R, R$_1$ and R$_2$ = H or C$_1$–C$_4$-alkyl, which is unsubstituted or substituted by halogen, hydroxyl, cyano, C$_1$–C$_4$-alkoxy, carboxyl, sulpho or sulphato and wherein R$_1$–R$_2$ can also represent a C$_1$–C$_4$-alkylene unit,

A = —CH$_2$-C$_2$—, —CH$_2$—CH(CH$_3$)—, —CH$_2$—CH$_2$—CH$_2$—,

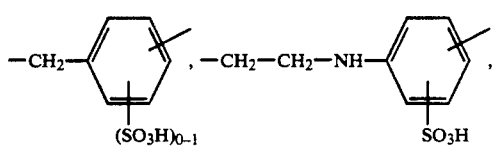

or the radical NFR$^1$—A—NR$^2$— represents

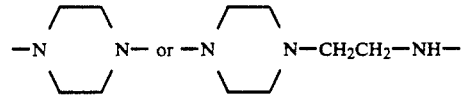

Z = a fibre-reative radical which is free from chromophoric substituents selected from

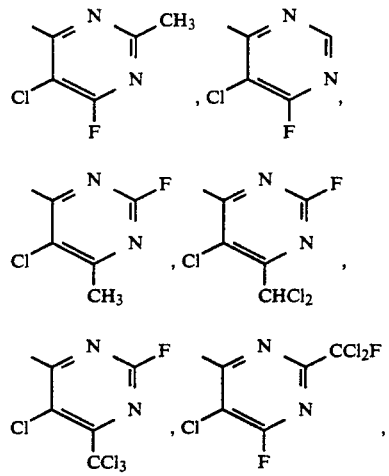

a dichlorotriazinyl-, monochlorotriazinyl- or monofluorotriazinyl radical.

2. A dyestuff according to claim 1 wherein Z is a radical of the structure

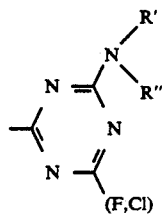 (3e)

wherein
R′=H or a substituted or unsubstituted $C_1$-$C_4$-alkyl or cycloaliphatic radical and R″=R′ or a substituted or unsubstituted phenyl, benzyl, naphthyl or hetaryl radical or a substituted or unsubstituted amino group, wherein the substituents for R′, R″ are OH, Cl, Br, F, CN, $CO_2H$, $SO_3H$, $OSO_3H$, $C_1$-$C_4$-alkoxy, $C_1$-$C_4$-alkyl, $N(CH_3)_2$, $NHCOCH_3$, $SO_2X$ and $C_1$-$C_4$-alkylsulphonyl or, together with the N-atom:

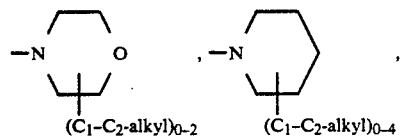

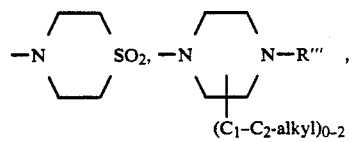

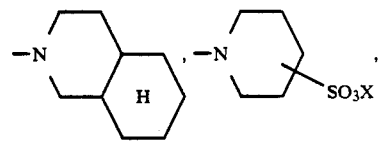

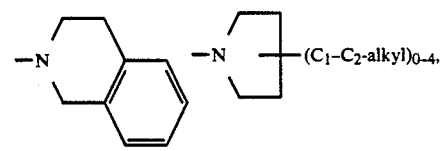

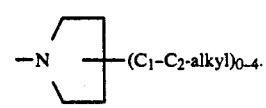

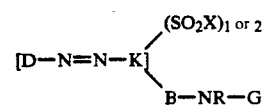

R‴=H, unsubstituted $C_1$-$C_4$-alkyl or $C_1$-$C_4$-alkyl substituted by OH, $OSO_3H$ or $SO_2X$.

3. A dyestuff according to claim 1 of the formula (4) or a metal complex thereof

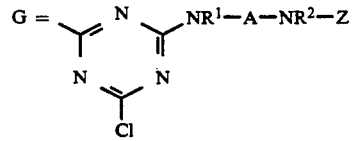 (4)

wherein
D=the radical of a diazo component of the benzene or naphthalene series, K=the radical of a coupling component of the benzene, naphthalene, acetoacetic acid arylide or heterocyclic series.

4. A dyestuff according to claim 3 of the formulae (5a) or (5b)

 (5a)

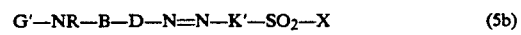 (5b)

where
X=—CH=$CH_2$ or $CH_2CH_2OSO_3H$,

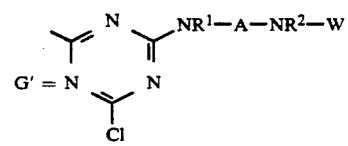 (3e)

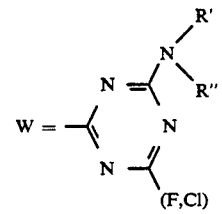

wherein
R′=H or a substituted or unsubstituted $C_1$-$C_4$-alkyl or cycloaliphatic radical and R″=R′ or a substituted pheny, benzyl, naphthyl or hetaryl radical or a substituted or unsubstituted amino group, wherein the substituents R′ and R″ are OH, Cl, Br, F, CN, $CO_2H$, $SO_3H$, $OSO_3H$, $C_1$-$C_4$-alkoxy, $C_1$-$C_4$-alkyl, $N(CH_3)_2$, $NHCOCH_3$, $SO_2X$ and $C_1$-$C_4$-alkylsulphonyl or, together with the N atom:

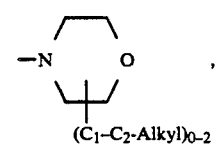

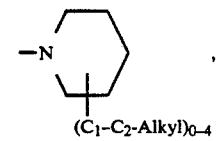

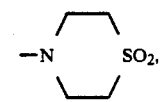

-continued

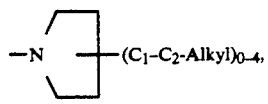

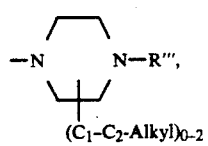

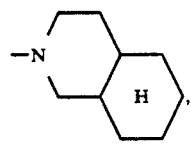

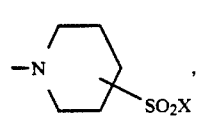

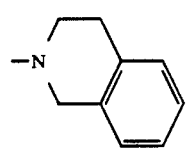

wherein X has the abovementioned meaning and R'''=H, unsubstituted $C_1$-$C_4$-alkyl, or $C_1$-$C_4$-alkyl substituted by OH, $OSO_3H$ or $SO_2X$, K'=the radical of a coupling component of the pyrazolone, pyridone or acetoacetic acid arylide series and D, K, R and B have the meaning given in claim 3.

5. A dyestuff according to claim 1, of the formulae

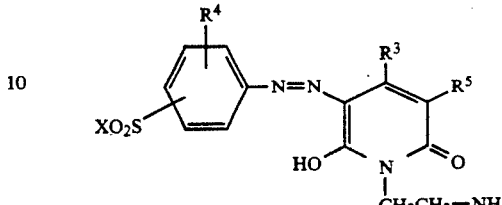
(6)

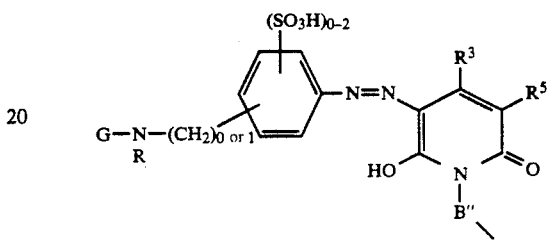
(7)

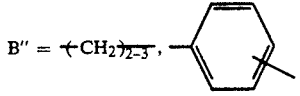

wherein
$R^3$=H, $C_1$-$C_4$-alkyl, $CH_2SO_3H$ or COOH,
$R^4$=H, $C_1$-$C_4$-alkyl, $C_1$-$C_4$-alkoxy, Cl, Br, COOH, or $SO_3H$ and
$R^5$=H, $SO_3H$, $CH_2SO_3H$, Cl, $C_1$-$C_4$-alkylsulphonyl, or carboxamide,

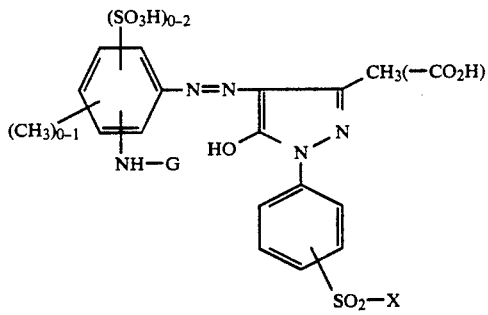
(9)

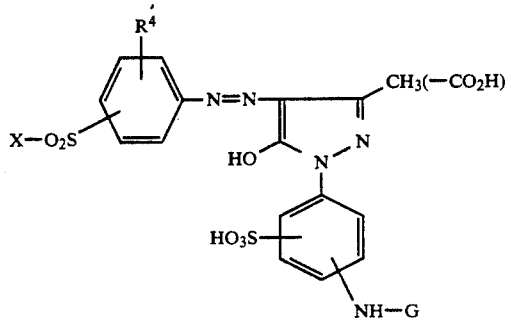
(10)

-continued
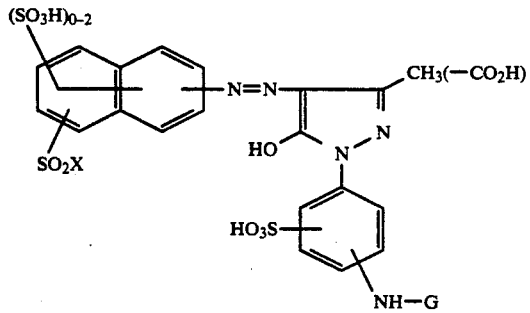 (11)
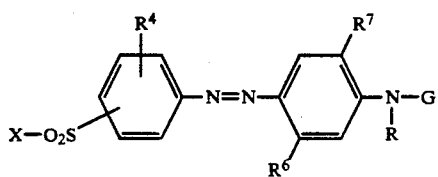 (12)
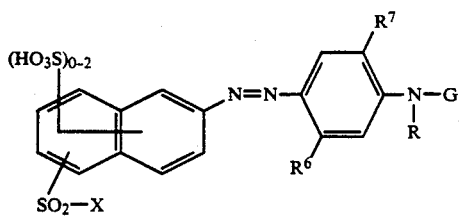 (13)
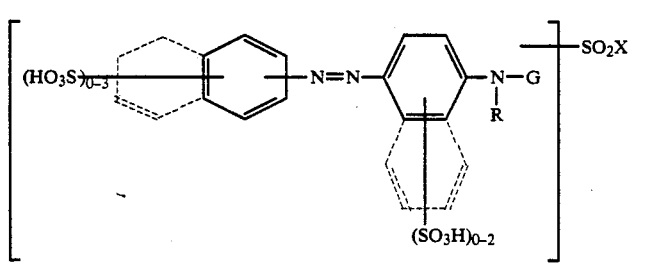 (14)
wherein
$R^6$ = H, $C_1$–$C_4$-alkyl, $C_1$–$C_4$-alkoxy, $C_1$–$C_4$-alkylcarbonylamino, substituted or unsubstituted phenylcarbonylamino, Cl, Br, aminocarbonylamino, $C_1$–$C_4$-alkylsulphonylamino or arylsulphonylamino, and
$R^7$ = H, $C_1$–$C_4$-alkyl, $C_1$–$C_4$-alkoxy, OH or $SO_3H$
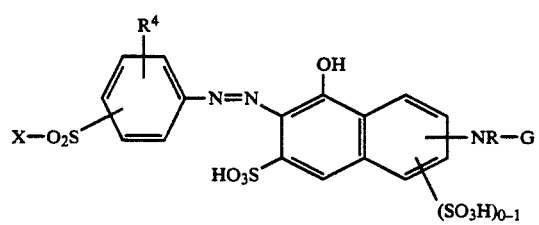 (15)
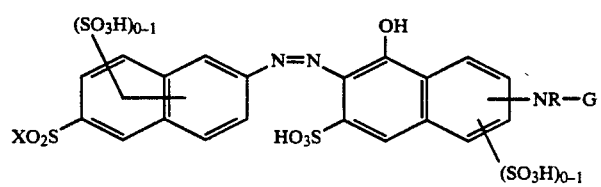 (16)

-continued
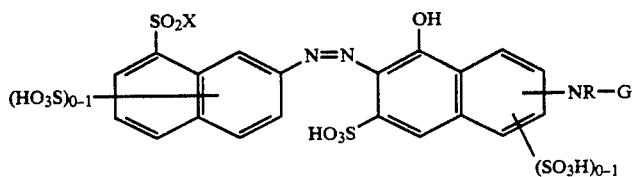 (17)
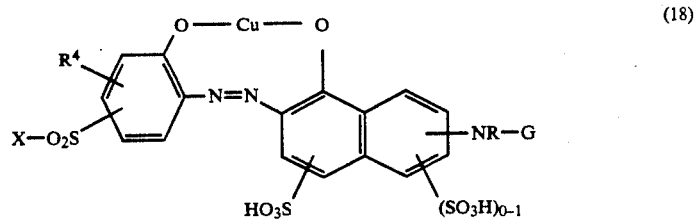 (18)
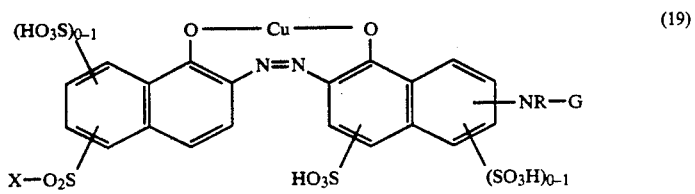 (19)
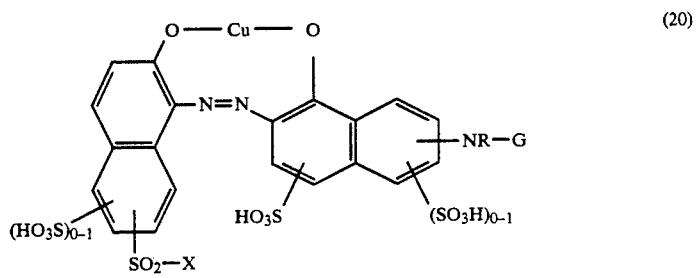 (20)
1:2-metal complexes of dyestuffs
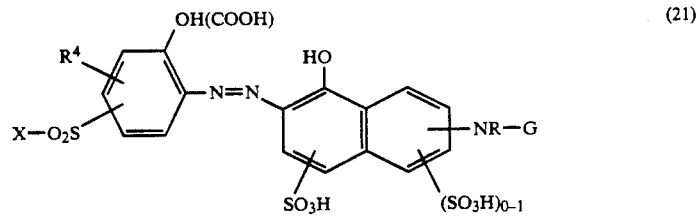 (21)
which contain two dyestuffs (21) or one dyestuff (21) and any other dyestuff which forms metal complexes,
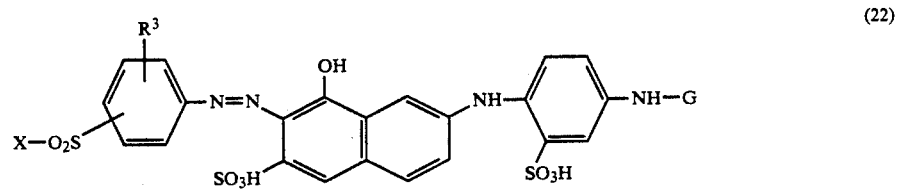 (22)
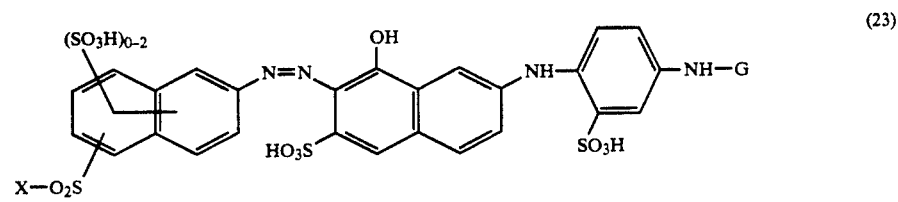 (23)

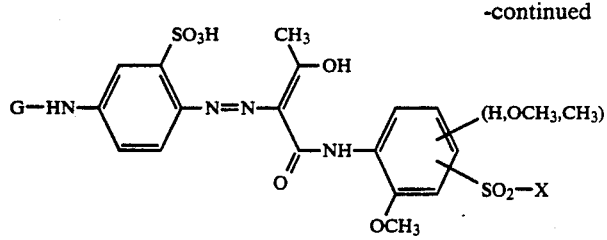
(24)
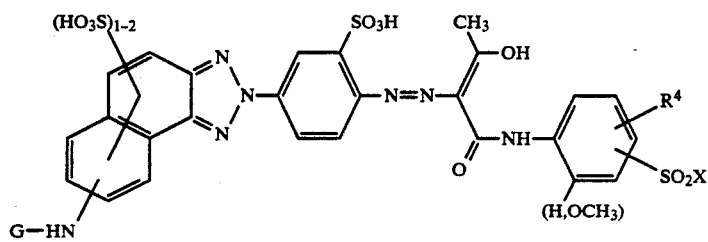
(25)
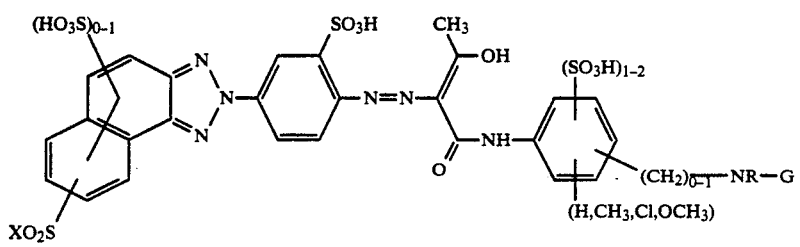
(26)
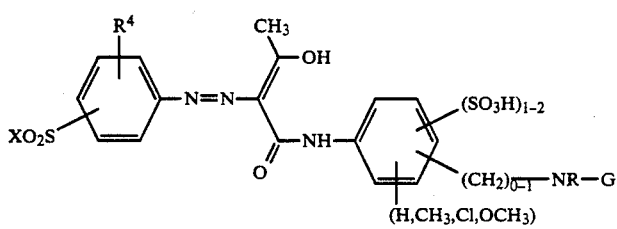
(27)
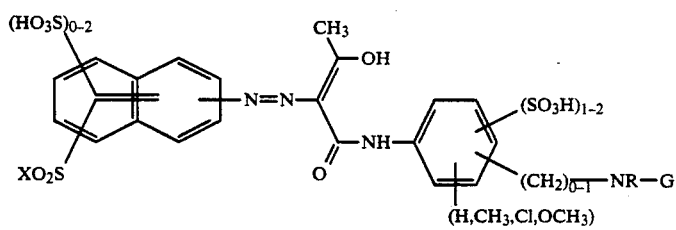
(28)
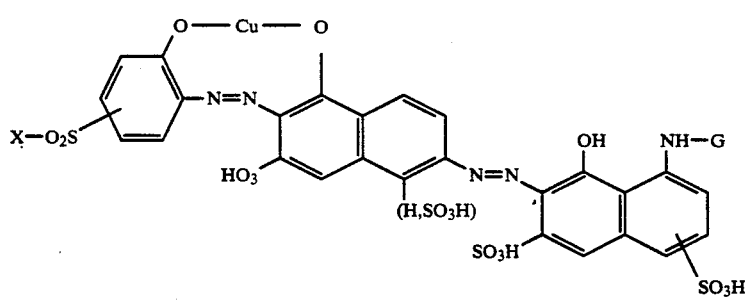
(29)
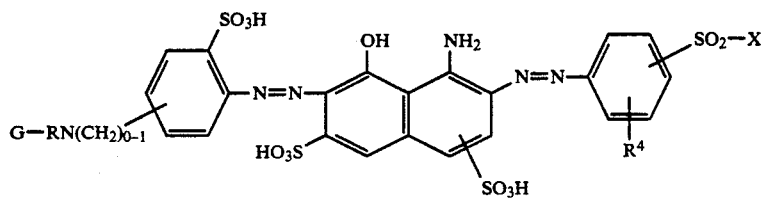
(30)

-continued
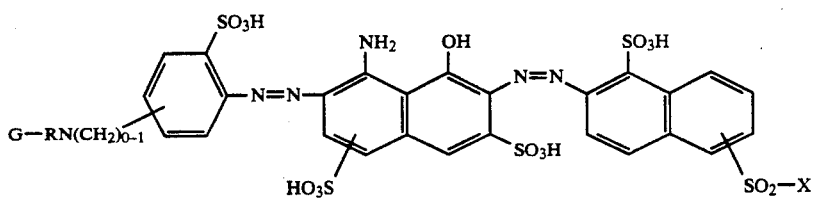 (31)
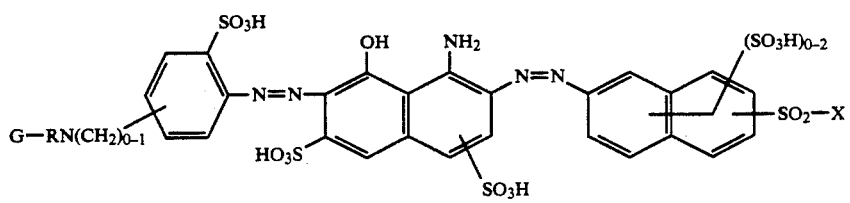 (32)
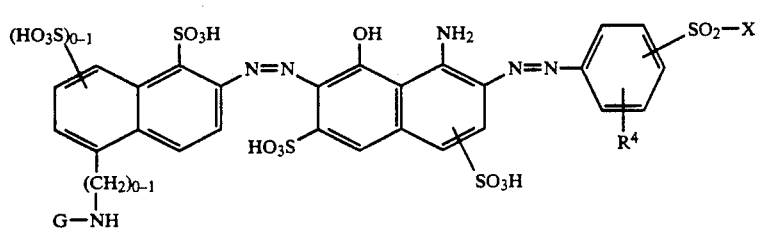 (33)
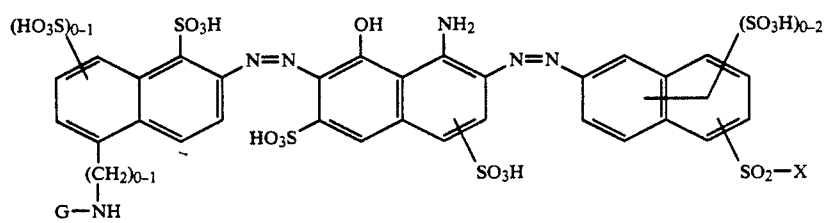 (34)
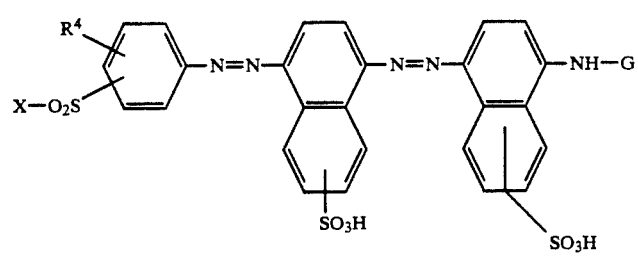 (35)
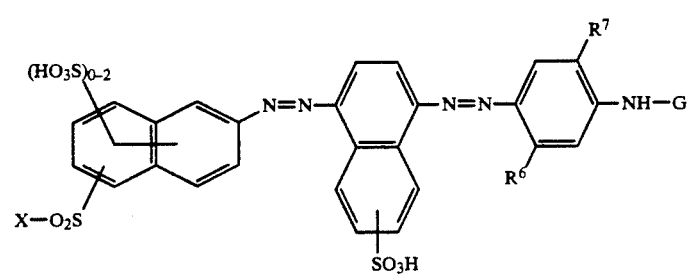 (36)

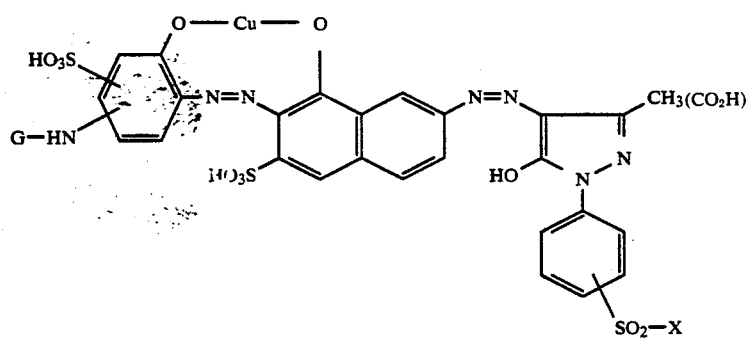
(37)
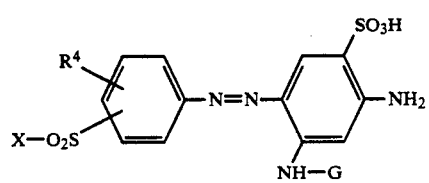
(38)
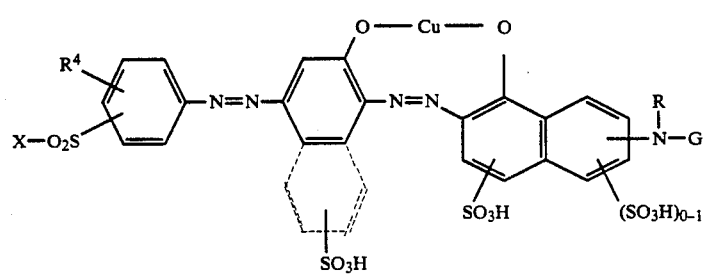
(39)
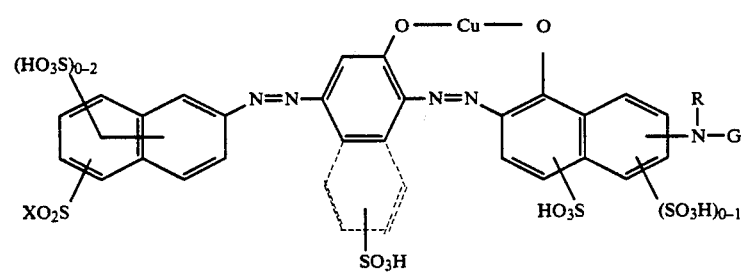
(40)
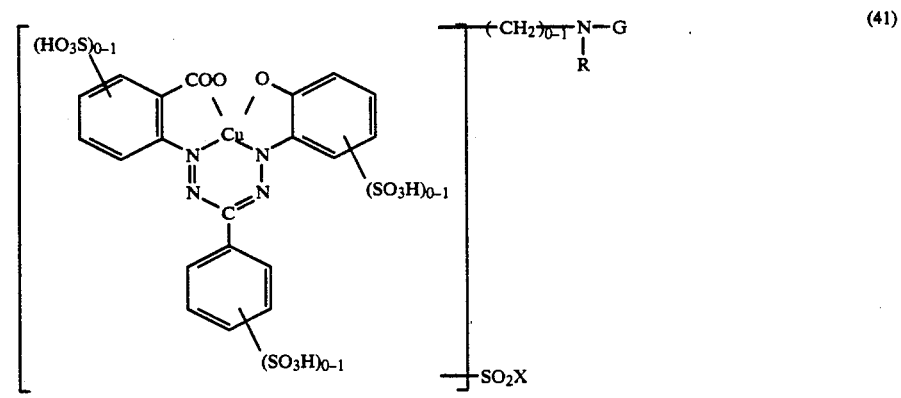
(41)

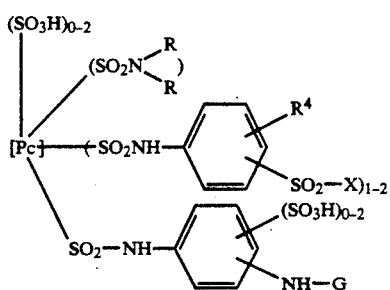

wherein Pc represents a Cu or Ni phthalocyanine radical and the total number of substituents on the Pc structure is not more than 4; or

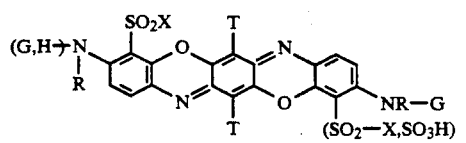
(43)

wherein T=Cl, Br or OCH$_3$ and X and R have the meaning given in claim 1 and

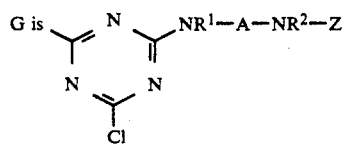

6. A dyestuff according to claim 3, wherein K=a pyrazolone or pyridone radical.

7. A dyestuff according to claim 5, wherein R$^5$=is CONH$_2$, or carboxylic acid mono- or di-C$_1$-C$_4$-alkylamide.

8. A dyestuff according to claim 1, wherein B=a direct bond or $-\overset{*}{C}OCH_2-$, $-CH_2-$, $-CH_2-CH_2-$, $-CH_2-CH_2-CH_2-$, $-\overset{*}{S}O_2-CH_2-CH_2-$, $-\overset{*}{C}ONHCH_2CH_2-$, $-\overset{*}{S}O_2NH-CH_2CH_2-$, $-\overset{*}{N}H-CH_2CH_2-$, $-\overset{*}{O}-CH_2CH_2-$, or

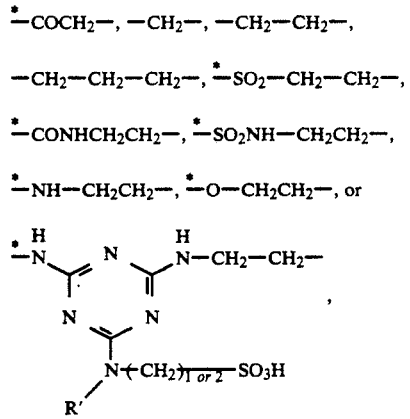

wherein R' = H or CH$_3$

9. A dyestuff according to claim 1, wherein B'=direct bond or

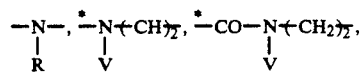

-continued $-\overset{*}{N}H-CH_2-CH_2CH_2-$, $-\overset{*}{S}O_2N-(CH_2)_2-$,
$\phantom{xxxxxxxxxxxxxxxxxxxxxxxxxxxxxx}|$
$\phantom{xxxxxxxxxxxxxxxxxxxxxxxxxxxxxx}V$

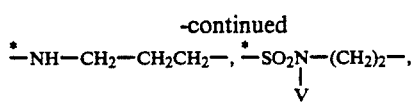

$-\overset{*}{O}-CH_2CH_2-$, $-\overset{*}{N}HCO-CH_2CH_2-$, $-\overset{*}{N}H-CO-CH_2CH_2CH_2-$, $-\overset{*}{C}O-NH-$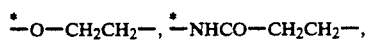, $-\overset{*}{S}O_2-NH-$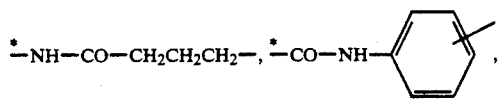, $-\overset{*}{C}O-NH-$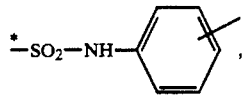, (SO$_3$H) 0 or 1

$-\overset{*}{S}O_2-NH-$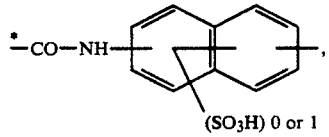, (SO$_3$H) 0 or 1

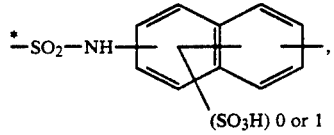 or

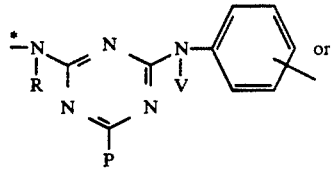, wherein
P=F, Cl or substituted or unsubstituted amino
V=H, CH$_3$ or —CH$_2$CH$_2$SO$_2$—X,
R'=H or CH$_3$.

10. A dyestuff according to claim 9, wherein

P is $-\underset{R}{\underset{|}{N}}-(CH_2)_{1-2}-SO_3H$.
11. A dyestuff according to claim 1, of the formulae
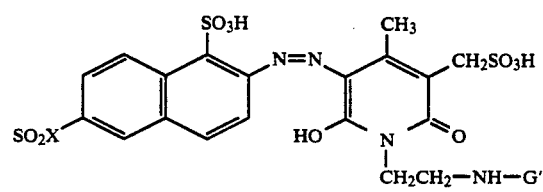 (44)
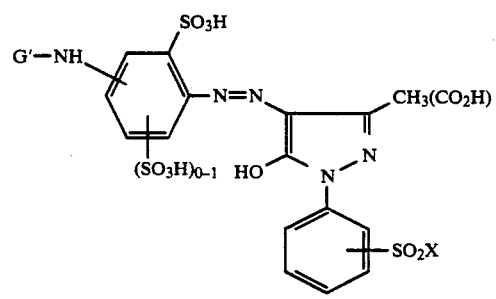 (45)
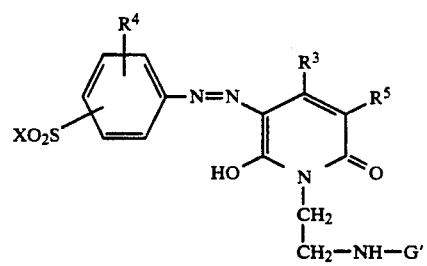 (46)
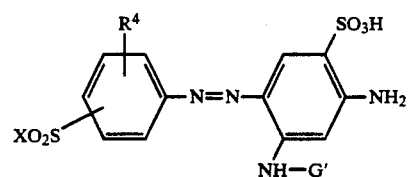 (47)
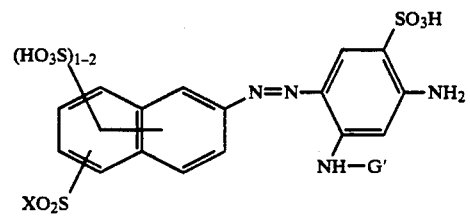 (48)

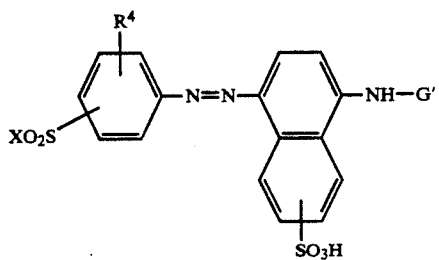
(49)
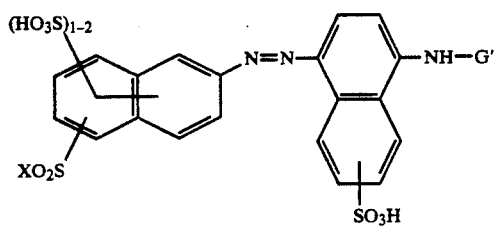
(50)
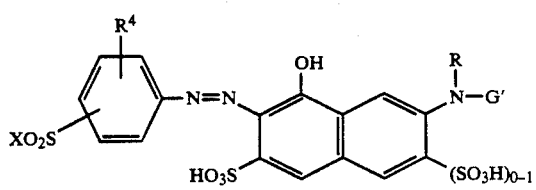
(51)
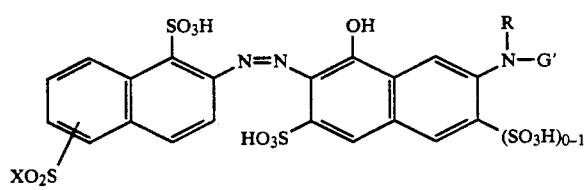
(52)
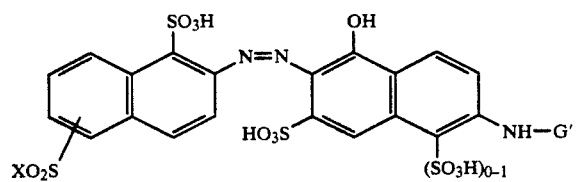
(53)
(54)
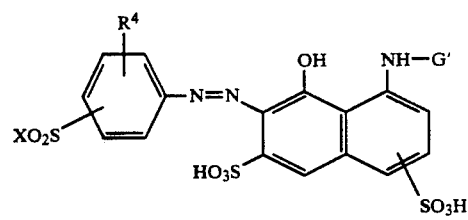
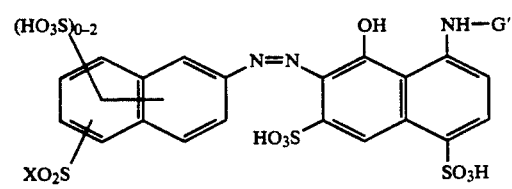
(55)
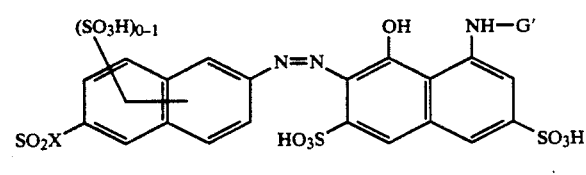
(56)

-continued
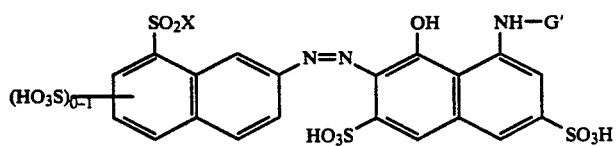
(57)
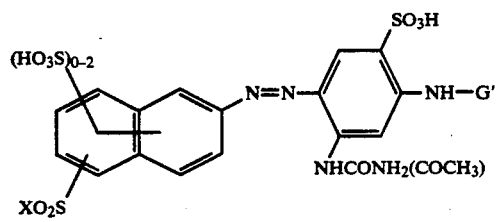
(58)
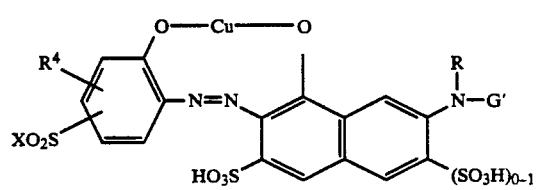
(59)
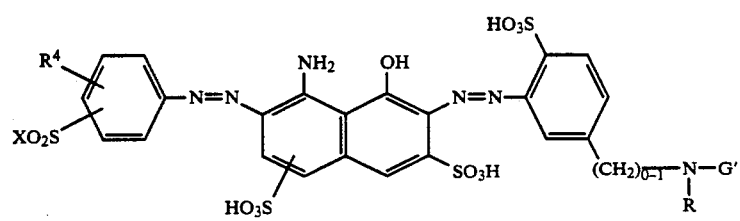
(60)
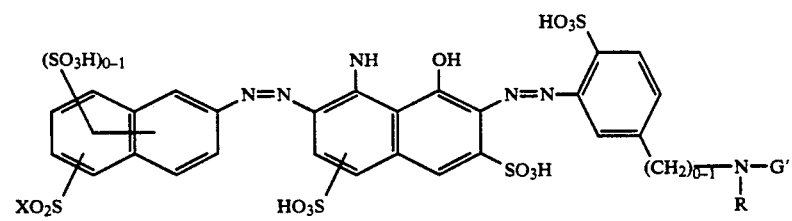
(61)
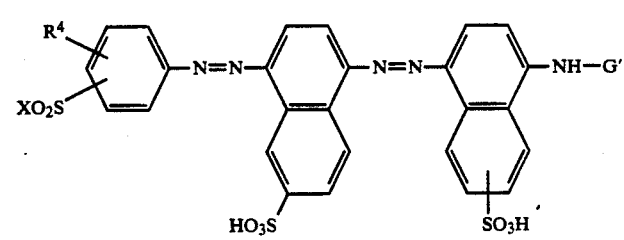
(62)
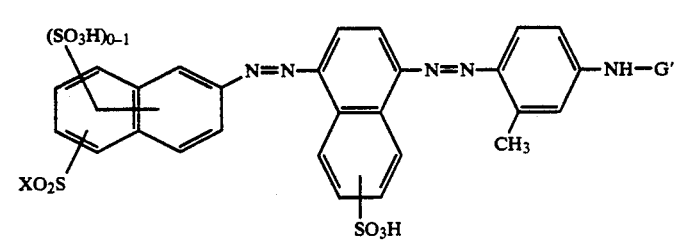
(63)

-continued
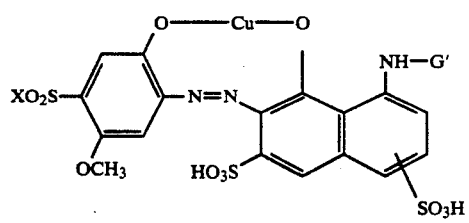  (64)
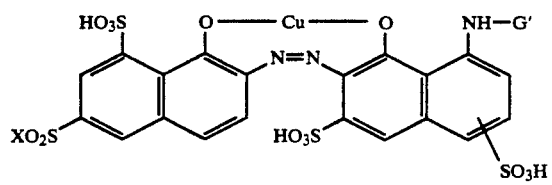  (65)
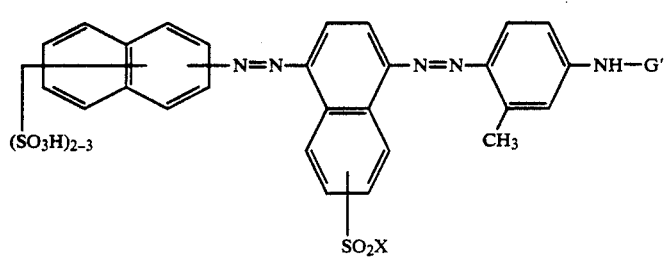  (66)
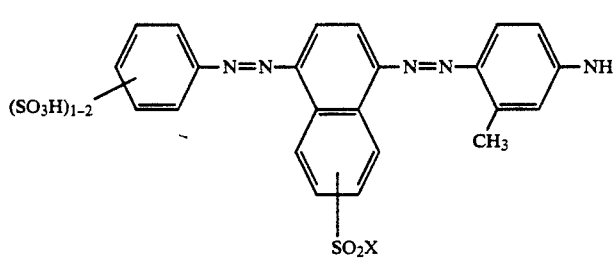  (67)
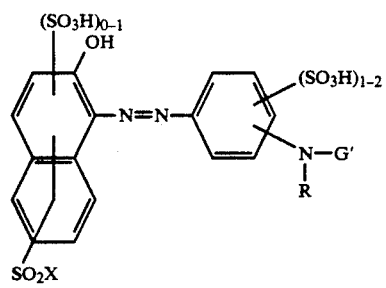  (68)
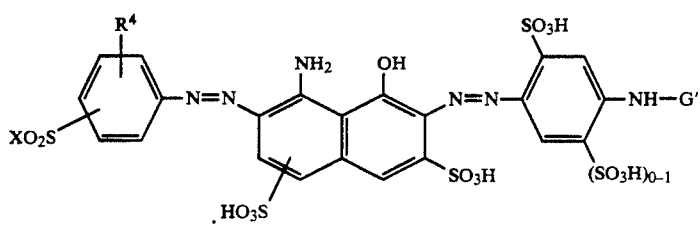  (69)

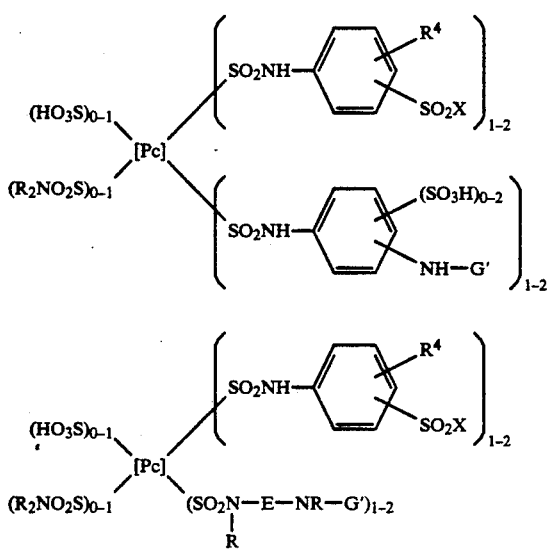

wherein Pc represents a Cu or Ni phthalocyanine radical and the total number of substituents on the Pc skeleton is not more than 4; E = an aliphatic bridge member, including $C_2$-$C_4$-alkylene, or

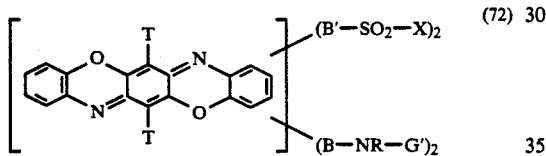

wherein R, B, B', and X have the meaning given in claim 1, and

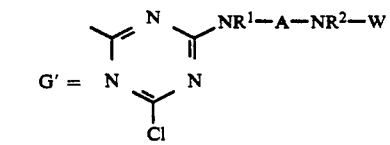

T = Cl, Br, or $OCH_3$,
$R^3$ = H, $C_1$-$C_4$-alkyl, $CH_2SO_3H$ or COOH,
$R^4$ = H, $C_1$-$C_4$-alkyl, $C_1$-$C_4$-alkoxy, Cl, Br, COOH, or $SO_3H$ and
$R^5$ = H, $SO_3H$, $CH_2SO_3H$, Cl, $C_1$-$C_4$-alkylsulphonyl, or carboxamide.

* * * * *